United States Patent
Akutsu et al.

(10) Patent No.: US 10,906,429 B2
(45) Date of Patent: Feb. 2, 2021

(54) SEAT SLIDE STRUCTURE

(71) Applicant: TS TECH CO., LTD., Asaka (JP)

(72) Inventors: Takeshi Akutsu, Shioya-gun (JP); Tsukasa Meguro, Shioya-gun (JP); Yuya Adachi, Shioya-gun (JP); Masaki Nagayama, Shioya-gun (JP); Chikara Hishinuma, Shioya-gun (JP); Yuta Sugaya, Shioya-gun (JP); Richard Orr, Reynoldsburg, OH (US); Jonathan Osborne, Reynoldsburg, OH (US)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 16/540,115

(22) Filed: Aug. 14, 2019

(65) Prior Publication Data

US 2020/0055425 A1    Feb. 20, 2020

Related U.S. Application Data

(60) Provisional application No. 62/719,207, filed on Aug. 17, 2018, provisional application No. 62/719,215, (Continued)

(51) Int. Cl.
*B60N 2/02* (2006.01)
*B60N 2/08* (2006.01)
*B60N 2/07* (2006.01)

(52) U.S. Cl.
CPC ......... *B60N 2/0284* (2013.01); *B60N 2/0727* (2013.01); *B60N 2/08* (2013.01)

(58) Field of Classification Search
CPC ....... B60N 2/0284; B60N 2/0727; B60N 2/08
(Continued)

(56) References Cited

U.S. PATENT DOCUMENTS

| 6,220,642 B1 * | 4/2001 | Ito ........................ B60N 2/0232 |
| | | 248/429 |
| 6,260,922 B1 * | 7/2001 | Frohnhaus ............. B60N 2/067 |
| | | 248/424 |

(Continued)

FOREIGN PATENT DOCUMENTS

| JP | H02-87625 U | 7/1990 |
| JP | H05-46547 U | 6/1993 |

(Continued)

OTHER PUBLICATIONS

Oct. 8, 2019 International Search Report issued in International Patent Application No. PCT/JP2019/032024.
(Continued)

*Primary Examiner* — Mark R Wendell
(74) *Attorney, Agent, or Firm* — Oliff PLC

(57) ABSTRACT

A seat slide structure includes a cushion frame, a slide rail including lower and upper rails, a movement mechanism, and a lock mechanism. The movement mechanism slides the cushion frame along a length direction of the slide rail. The lock mechanism includes a lock body engaging with the slide rail, and places or lifts a restriction on movement of the slide rail. The movement mechanism includes a lead screw, a gear part, and a shake absorber. The lead screw is provided in parallel with the slide rail, and is supported by the upper rail. The gear part transmits power from a power source to the lead screw to slide the lead screw and the upper rail along the lower rail. The shake absorber allows the cushion frame and the lead screw to move relative to one another in a moving direction of the upper rail along the lower rail.

13 Claims, 52 Drawing Sheets

Related U.S. Application Data filed on Aug. 17, 2018, provisional application No. 62/719,222, filed on Aug. 17, 2018, provisional application No. 62/719,326, filed on Aug. 17, 2018.

(58) Field of Classification Search
USPC .......................................................... 297/337
See application file for complete search history.

(56) References Cited

U.S. PATENT DOCUMENTS

| | | | | |
|---|---|---|---|---|
| 7,325,851 | B2* | 2/2008 | Ito | B60N 2/067 248/429 |
| 8,820,694 | B2* | 9/2014 | Tarusawa | B60N 2/067 248/429 |
| 9,463,716 | B2* | 10/2016 | Hayashi | B60N 2/08 |
| 9,499,073 | B2* | 11/2016 | Tsuji | B60N 2/067 |
| 9,586,500 | B2* | 3/2017 | Shimizu | B60N 2/067 |
| 2006/0289717 | A1* | 12/2006 | Ito | B60N 2/067 248/419 |
| 2007/0108360 | A1* | 5/2007 | Ito | B60N 2/067 248/424 |
| 2008/0078908 | A1* | 4/2008 | Koga | B60N 2/0705 248/298.1 |
| 2011/0095160 | A1 | 4/2011 | Kimura et al. | |

FOREIGN PATENT DOCUMENTS

| | | |
|---|---|---|
| JP | 2010-6098 A | 1/2010 |
| JP | 2010-285011 A | 12/2010 |
| JP | 2014-125046 A | 7/2014 |
| JP | 2017-114291 A | 6/2017 |

OTHER PUBLICATIONS

Oct. 8, 2019 Written Opinion issued in International Patent Application No. PCT/JP2019/032024.

* cited by examiner

FIG.12
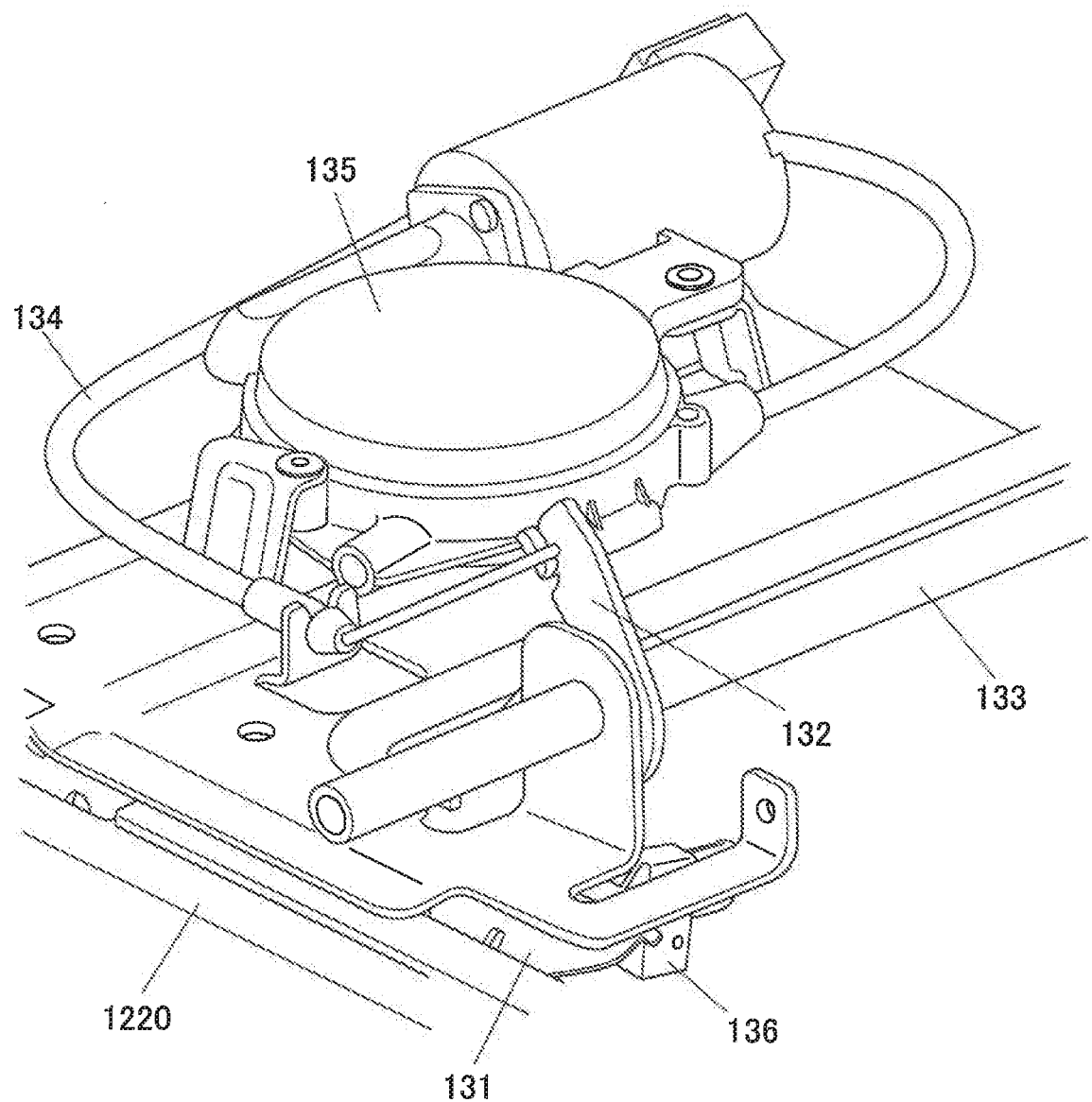
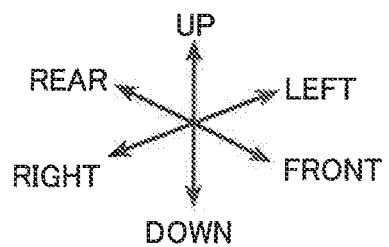

FIG.13
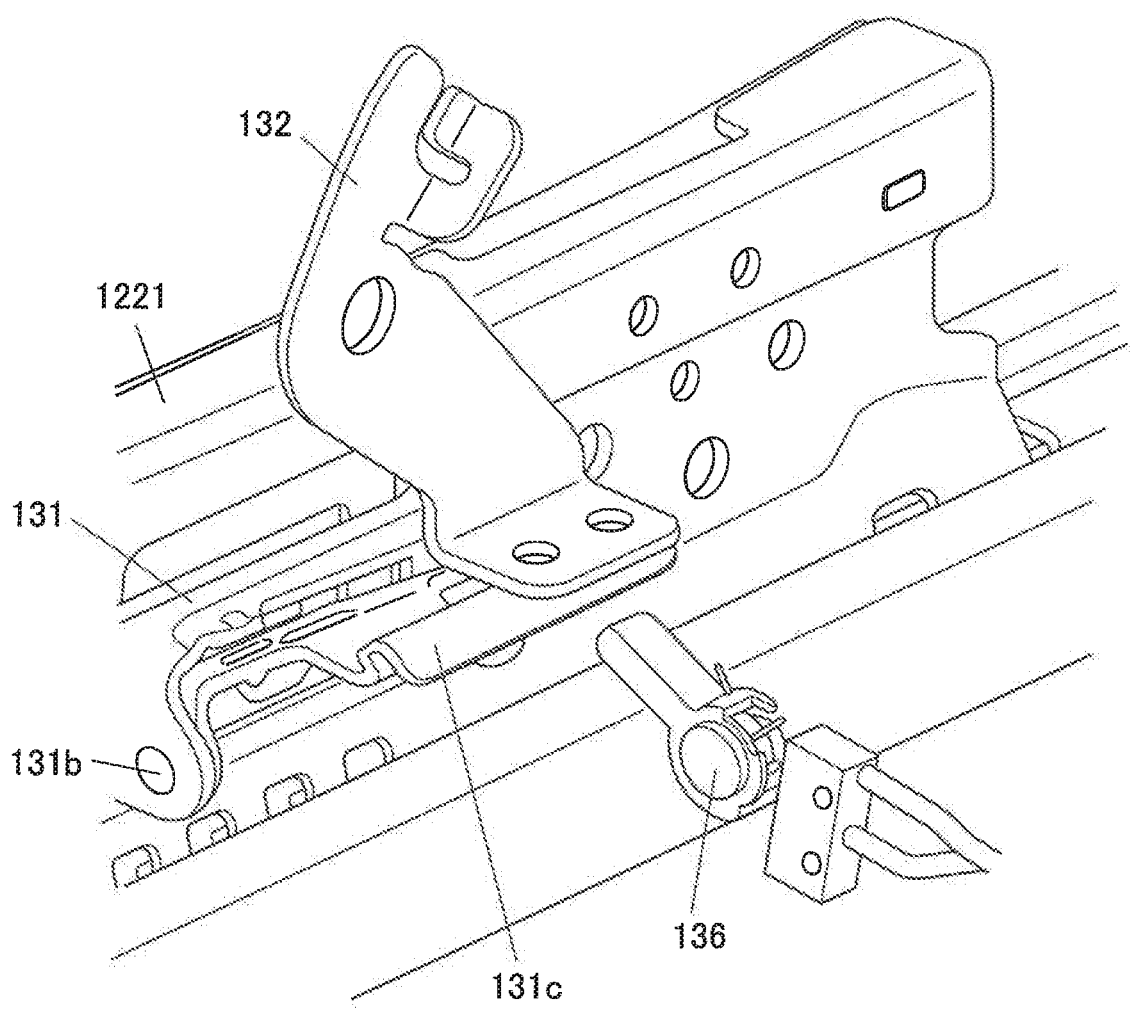
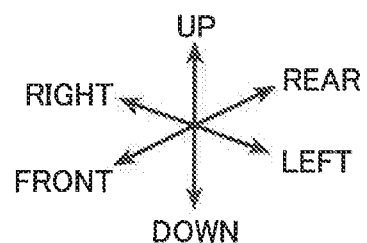

FIG.14
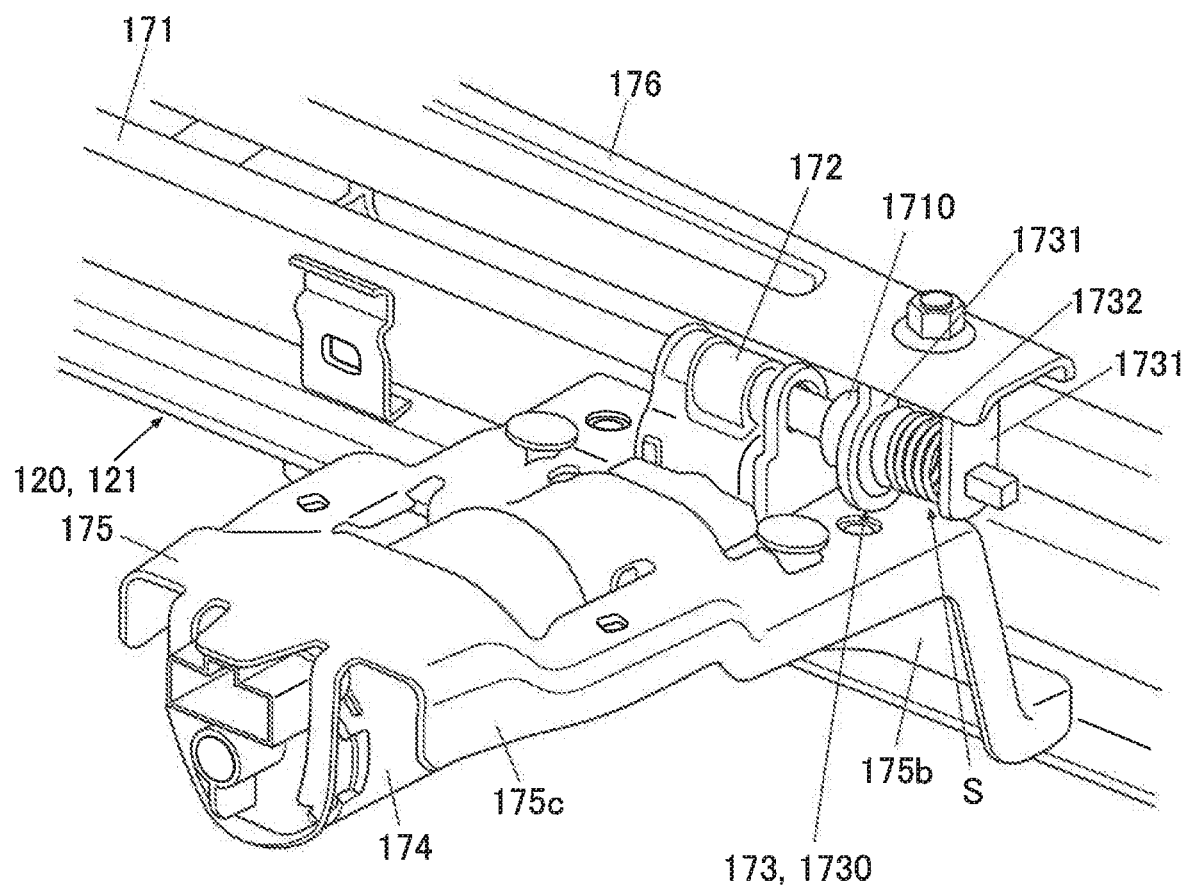
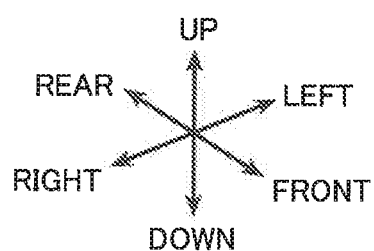

FIG.29
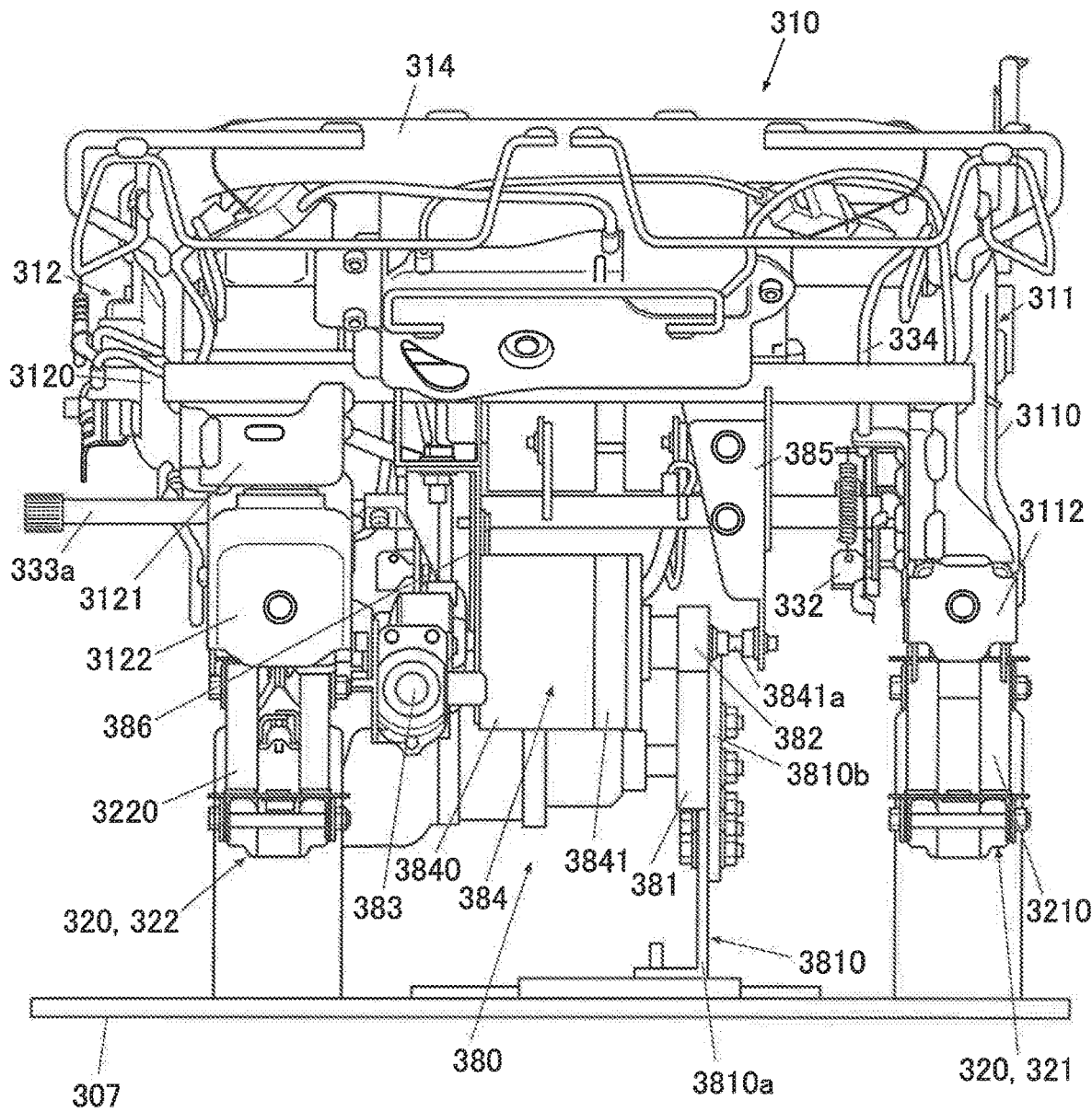
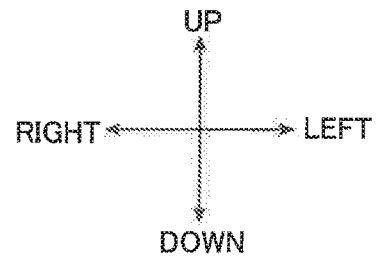

FIG.30
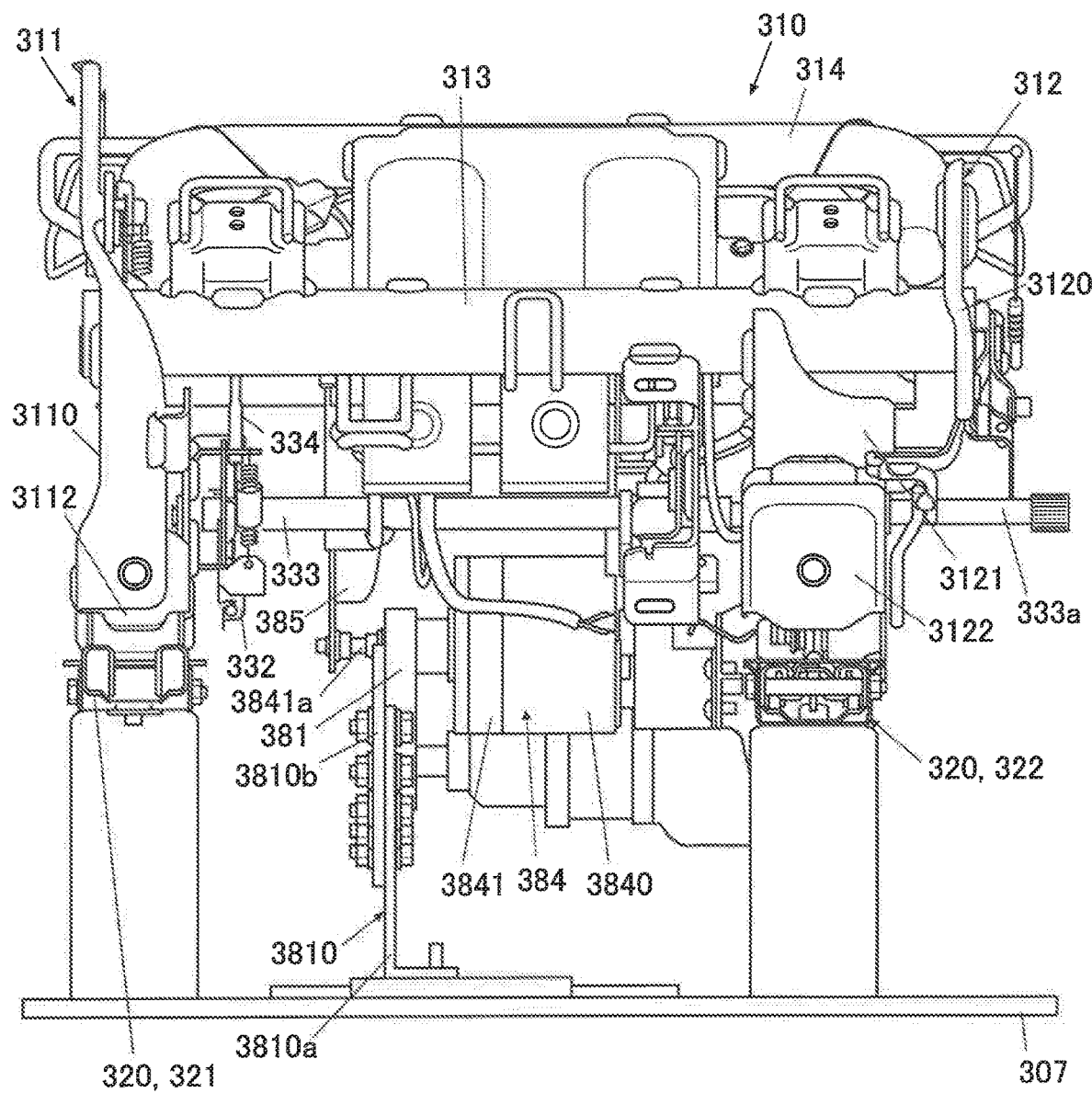
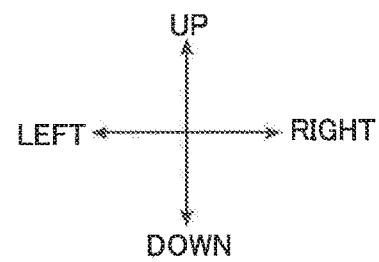

SEAT SLIDE STRUCTURE

CROSS-REFERENCE TO RELATED APPLICATIONS

This application is based upon and claims the benefit of priority from the prior U.S. provisional patent applications U.S. 62/719,207, U.S. 62/719,215, U.S. 62/719,222 and U.S. 62/719,326, all filed Aug. 17, 2018, the entire contents of which are incorporated herein by reference.

BACKGROUND

Technical Field

The present disclosure relates to a seat slide structure that slides a vehicle seat installed in a vehicle, such as an automobile, an airplane, a vessel, or a train.

Background Art

There is disclosed, for example, in JP 2017-114291 A a vehicle seat including: slide rails having lower rails and upper rails; a seat that is attached to the upper rails and where an occupant sits; a movement mechanism that slides the upper rails and the seat along the lower rails; and a lock mechanism that places or lifts restrictions on movement of the upper rails along the lower rails.

In such a vehicle seat, nail members (lock bodies) that constitute a seat lock mechanism operate in accordance with rotation of an unlocking link that also constitutes the seat lock mechanism. Thus, a seat lock mechanism is not linked with a seat movement mechanism.

There is also disclosed, for example, in JP 2014-125046 A a seat slide device that uses, as a movement mechanism that slides a seat, (i) a lead screw being long in a sliding direction of the seat and having a male screw formed on the outer circumferential surface and (ii) a fastening member having a female screw screwed with the male screw formed on the outer circumferential surface of the lead screw.

In recent years, there has been demand for a structure in which a lock body(ies) as a lock mechanism and a lead screw as a movement mechanism are linked.

SUMMARY

Objects of the present disclosure include realizing a structure in which a lock body(ies) as a lock mechanism and a lead screw as a movement mechanism are linked.

According to an aspect of the present disclosure, there is provided a seat slide structure including:

a cushion frame that forms a framework of a seat cushion that supports a femoral region and buttocks of a person;

a slide rail that is connected to a lower end of the cushion frame; and a movement mechanism that slides the cushion frame along a length direction of the slide rail.

Further, the seat slide structure includes a lock mechanism that includes a lock body engaging with the slide rail, and places or lifts a restriction on movement of the slide rail, wherein the slide rail includes:
a lower rail; and
an upper rail that is provided so as to be slidable along the lower rail, and is connected to the cushion frame, and the movement mechanism includes:

a lead screw that is provided in parallel with the slide rail, and is supported by the upper rail;

a gear part that transmits power from a power source to the lead screw to slide the lead screw and the upper rail along the lower rail; and a shake absorber that allows the cushion frame and the lead screw to move relative to one another in a moving direction of the upper rail along the lower rail.

BRIEF DESCRIPTION OF THE DRAWINGS

The accompanying drawings are not intended as a definition of the limits of the present invention but illustrate embodiments of the present invention, and together with the general description given above and the detailed description of the embodiments given below, serve to explain the principles of the present invention, wherein:

FIG. 12 is an illustration to explain the procedure for sliding a seat according to the first embodiment;

FIG. 13 is an illustration to explain the procedure for sliding a seat according to the first embodiment;

FIG. 14 is an illustration to explain the procedure for sliding a seat according to the first embodiment;

FIG. 29 is a front view showing the seat slide structure according to the third embodiment;

FIG. 30 is a rear view showing the seat slide structure according to the third embodiment;

DESCRIPTION OF EMBODIMENTS

Figure 1:
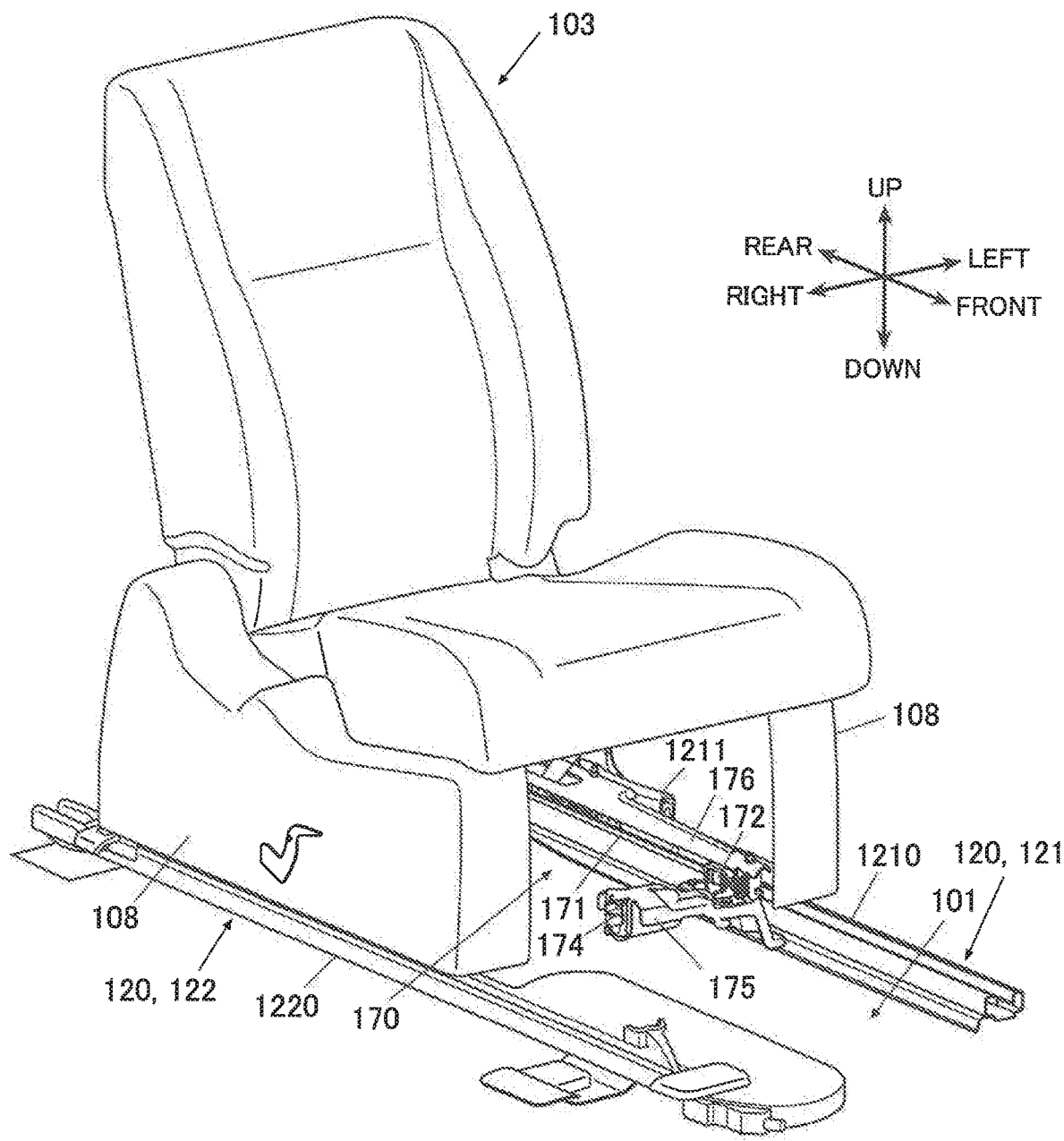
FIG. 1 is a perspective view showing a seat slide structure according to a first embodiment.
Figure 2:
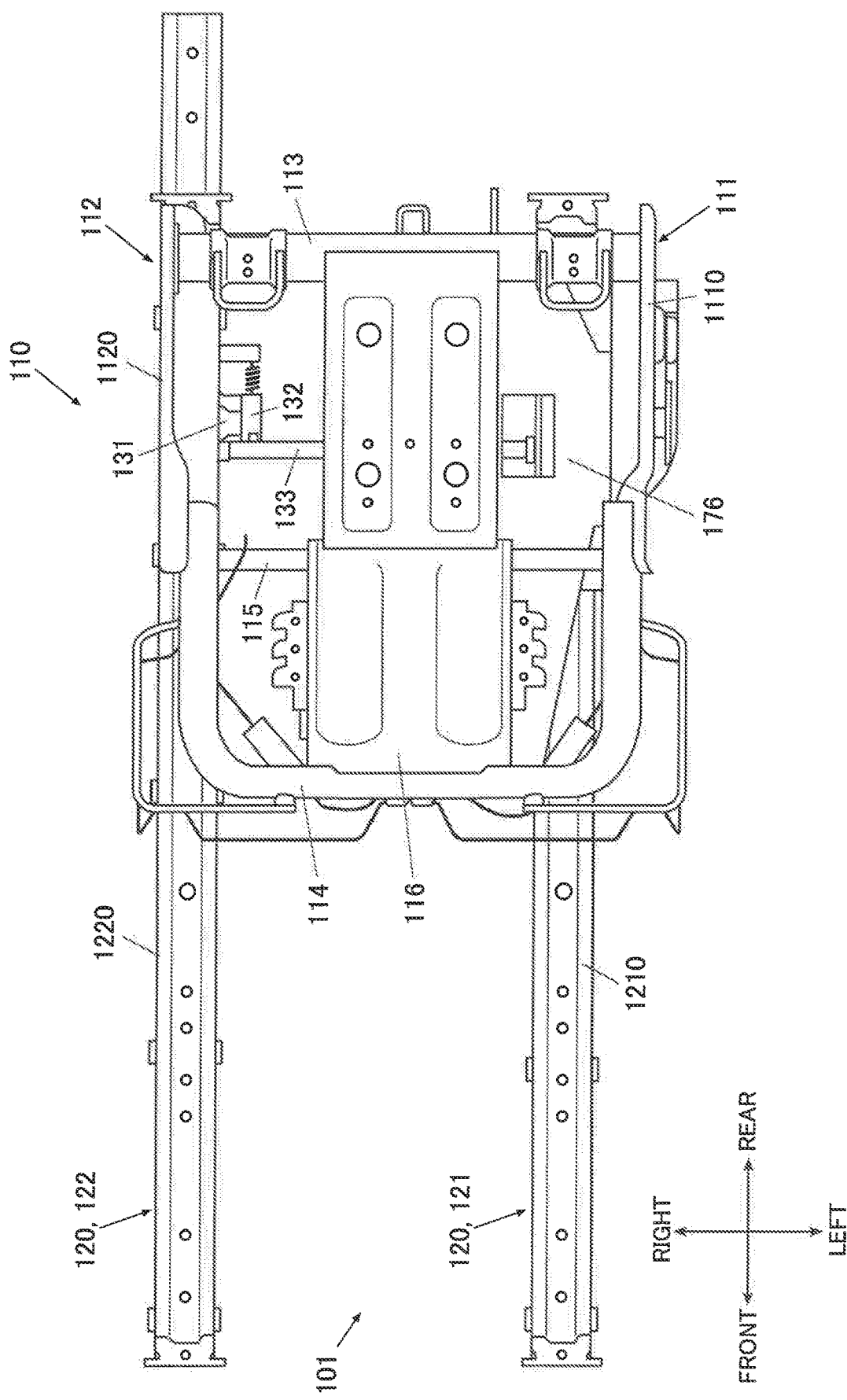
FIG. 2 is a plan view schematically showing a cushion frame and slide rails according to the first embodiment.
Figure 3:
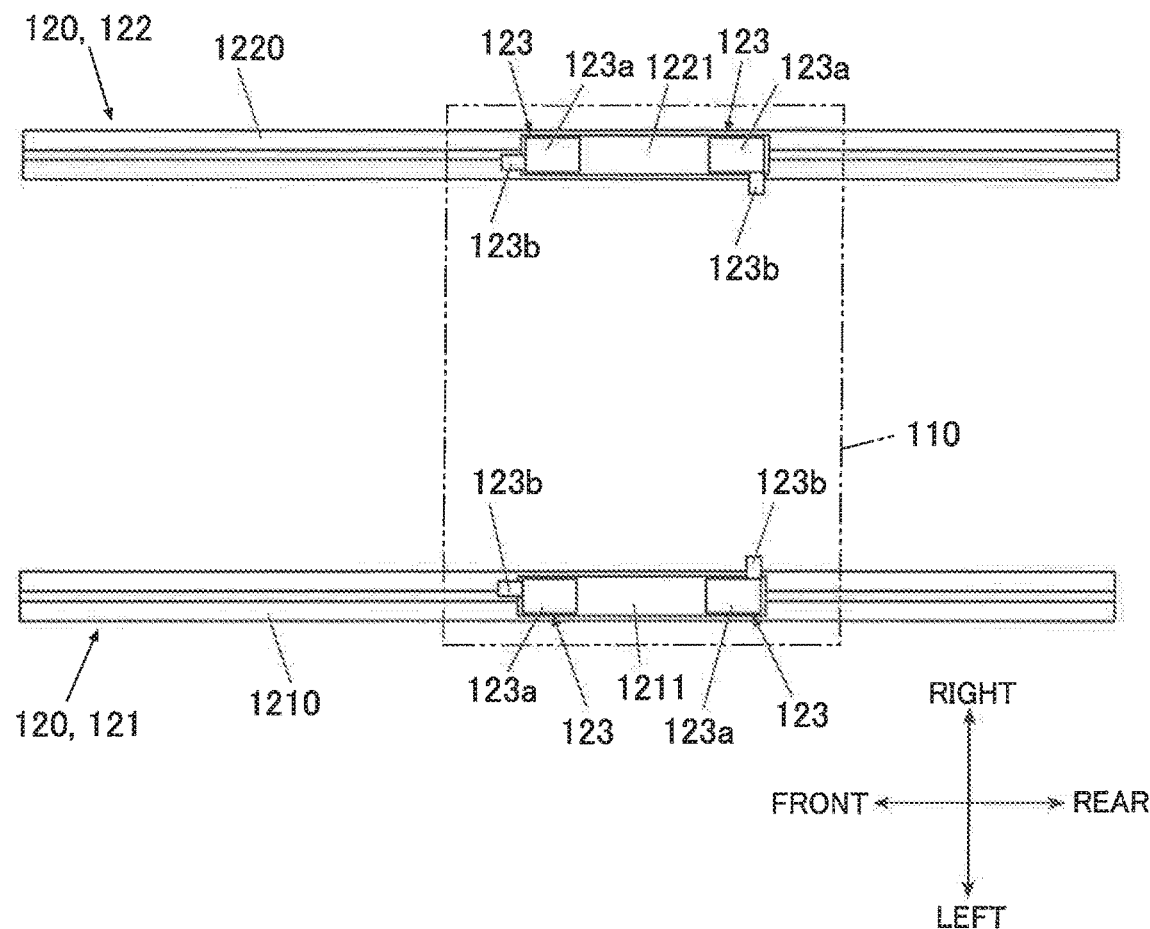
FIG. 3 is a schematic view to explain arrangement of seat weight sensors according to the first embodiment.

Hereinafter, embodiments of the present invention will be described with reference to the drawings. Although a variety of limitations that are technically favorable for carrying out the present invention are put on the following embodiments, the scope of the present invention is not limited to the following embodiments or illustrated examples.

First Embodiment

A seat slide structure according to this embodiment slides a vehicle seat 103 installed in an automobile as a passenger car, or installed, for example, in another type of automobiles, such as a bus or a truck, or in a vehicle other than automobiles, such as a train, a vessel, or an airplane.

The vehicle seat 103 (hereinafter "seat 103" or "seat") at least includes: a seat cushion that supports the femoral region and the buttocks of a person; and a seat back the lower end of which is supported by the seat cushion and that serves as a backrest. The seat 103 optionally includes a head rest that supports the head of a person, arm rests that support the arms of a person, and an ottoman that supports the legs of a person.

As shown in FIG. 1 to FIG. 14, the seat slide structure includes a cushion frame 110 that forms the framework of the seat cushion, slide rails 120 that are connected to the lower end of the cushion frame 110, a lock mechanism 130 that places or lifts restrictions on movement of the slide rails 120, and a movement mechanism 170 that slides the cushion frame 110 along the length direction of the slide rails 120.

The cushion frame 110 includes a first cushion side frame 111, a second cushion side frame 112, a back pipe frame 113, a front pipe frame 114, a connecting member 115, and a pressure receiving member 116.

The first cushion side frame 111 is arranged so as to leave a space from the second cushion side frame 112 in the right-left direction, and has: a sheet-shaped side plate 1110; a support leg (not shown) that is integrated with the lower end of the side plate 1110 and supports the side plate 1110; and a connecting leg 1112 that is provided at the lower end of the support leg and connected to one of the slide rails 120.

Although not shown, to the first cushion side frame 111, a seat back frame constituting the seat back is connected through a reclining mechanism.

The second cushion side frame 112 is arranged so as to leave a space from the first cushion side frame 111 in the right-left direction, and has: a sheet-shaped side plate 1120; and a connecting leg 1122 that is integrated with the lower end of the side plate 1120 and connected to the other of the slide rails 120.

Although not shown, to the second cushion side frame 112, the seat back frame constituting the seat back is connected through the reclining mechanism.

The back pipe frame 113 is a straight pipe frame, and connects the rear end of the first cushion side frame 111 and the rear end of the second cushion side frame 112 to one another.

The front pipe frame 114 is a U-shaped pipe frame, and connects the front end of the first cushion side frame 111 and the front end of the second cushion side frame 112 to one another.

The connecting member 115 is a straight pipe frame, and is put over the front end of the side plate 1110 of the first cushion side frame 111 and the front end of the side plate 1120 of the second cushion side frame 112, thereby connecting the first cushion side frame 111 and the second cushion side frame 112 to one another.

The connecting member 115 is positioned lower than the front pipe frame 114, and inserted into notch parts formed at the front ends of the side plate 1110 of the first cushion side frame 111 and the side plate 1120 of the second cushion side frame 112, and fixed thereto.

The pressure receiving member 116 receives the weight of a person (with clothes, personal belongings, etc., the same applies hereinafter) who sits on the seat (occupant), and, in this embodiment, is sheet/plate-shaped. The rear end and the front end of the pressure receiving member 116 are fixed to the back pipe frame 113 and the front pipe frame 114, respectively.

The pressure receiving member 116 is formed by being bent so as to be convex downward to fit the shapes of the femoral region and the buttocks of a person, and a part of the pressure receiving member 116, the part receiving the buttocks of a person, is a hip-point (not shown).

The hip-point is positioned, in the pressure receiving member 116, closest to the upper end of the slide rails 120.

The slide rails 120 are a first slide rail 121 and a second slide rail 122 that are arranged so as to leave a space in between in the right-left direction.

The first slide rail 121 is connected to the lower end of the first cushion side frame 111, and the second slide rail 122 is connected to the lower end of the second cushion side frame 112.

In this embodiment, the first slide rail 121 and the second slide rail 122 are provided on a floor 101 of an automobile as a passenger car.

The first slide rail 121 includes: a lower rail 1210; and an upper rail 1211 that is provided so as to be slidable along the lower rail 1210 and is connected to the cushion frame 110.

The lower rail 1210 has a side wall 1210a where lock holes 1210b are formed, on the side of the lower rail 1210 closer to the center of the seat, and the upper rail 1211 has a side wall 1211a where lock holes 1211b are formed, on the side of the upper rail 1211 closer to the center of the seat. The side wall 1211a of the upper rail 1211 is formed so as to have a U-shaped section, and the side wall 1210a of the lower rail 1210 is inserted therein, so that the side walls 1210a, 1211a face one another.

Into the lock holes 1210b, 1211b, nails 131a of a lock body 131 of the lock mechanism 130 are inserted (described below).

The lock holes 1210b of the side wall 1210a of the lower rail 1210 are formed at intervals in the length direction of the lower rail 1210. The number of the lock holes 1210b formed in the lower rail 1210 can cover a movable region in which the upper rail 1211 can move along the lower rail 1210.

The lock holes 1211b of the side wall 1211a of the upper rail 1211 are formed in accordance with the number of the nails 131a of the lock body 131.

The second slide rail 122 includes: a lower rail 1220; and an upper rail 1221 that is provided so as to be slidable along the lower rail 1220 and is connected to the cushion frame 110.

The lower rail 1220 has a side wall 1220a where lock holes 1220b are formed, on the side of the lower rail 1220 closer to the center of the seat, and the upper rail 1221 has a side wall 1221a where lock holes 1221b are formed, on the side of the upper rail 1221 closer to the center of the seat. The side wall 1221a of the upper rail 1221 is formed so as to have a U-shaped section, and the side wall 1220a of the lower rail 1220 is inserted therein, so that the side walls 1220a, 1221a face one another.

Into the lock holes 1220b, 1221b, nails 131a of a lock body 131 of the lock mechanism 130 are inserted (described below).

The lock holes 1220b of the side wall 1220a of the lower rail 1220 are formed at intervals in the length direction of the lower rail 1220. The number of the lock holes 1220b formed in the lower rail 1220 can cover a movable region in which the upper rail 1221 can move along the lower rail 1220.

The lock holes 1221b of the side wall 1221a of the upper rail 1221 are formed in accordance with the number of the nails 131a of the lock body 131.

Figure 4:
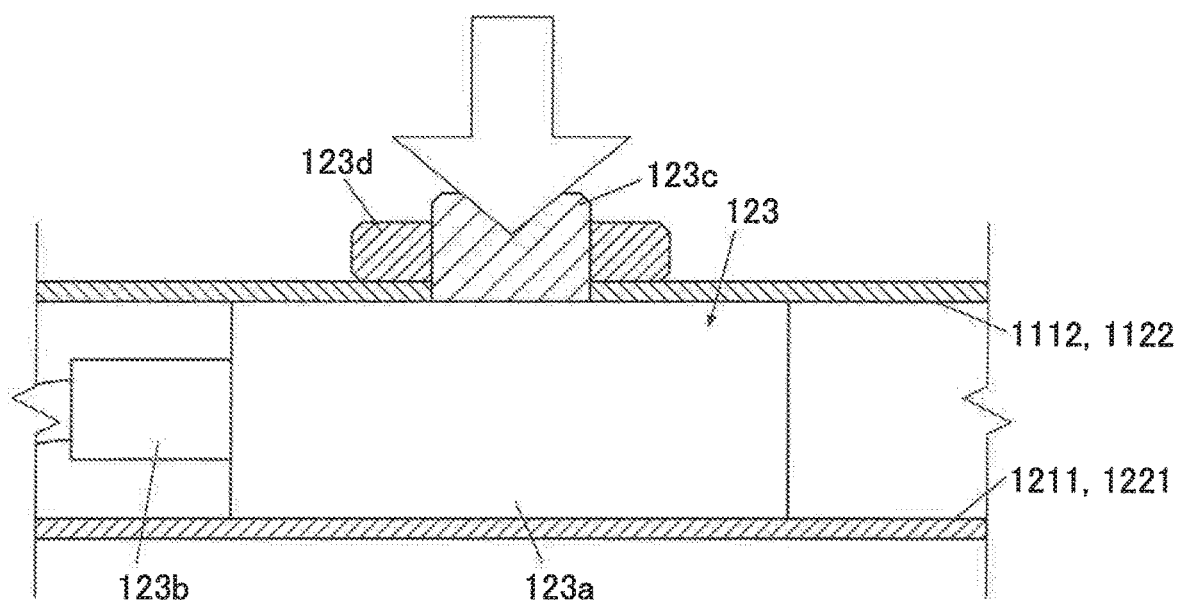
FIG. 4 is a schematic view showing the seat weight sensor(s) according to the first embodiment.

Between the cushion frame 110 and the slide rails 120, weight detectors 123 are provided. The weight detectors 123 measure the weight of each person who sits on the seat as one type of information for controlling inflation of an air bag. An arrow (different from leader lines) in FIG. 4 represents the weight of the sitting person.

The weight detectors 123 are provided at four corners of the seat. That is, in this embodiment, the weight detectors 123 are provided between the connecting leg 1112 of the first cushion side frame 111 and the upper rail 1211 of the first slide rail 121 at the front end and the rear end of the connecting leg 1112, and provided between the connecting leg 1122 of the second cushion side frame 112 and the upper rail 1221 of the second slide rail 122 at the front end and the rear end of the connecting leg 1122.

With the weight detectors 123, an ECU (Electronic Control Unit), which functions as the center in performing comprehensive electric control, calculates the total weight and the center of gravity and hence can determine whether the sitting person is an adult or a child. More specifically, in the case of an adult, the ECU can determine whether he/she is an adult of standard build or an adult of small build (difference in build), and in the case of a child, the ECU can determine whether he/she is a one-year-old child (infant seat), a three-year-old child, or a six-year-old child. On the basis of the determination result, inflation of an air bag is controlled.

The weight detectors 123 are often provided for the seat as the front passenger seat, but may be provided for the seat as the driver's seat or for the seat as any other seat provided with an air bag.

The weight detectors 123 each include a detector body 123a, a power-source-connecting connector 123b, a fixing bolt 123c, and a nut 123d.

The detector body 123a has a built-in sensor (e.g. strain gauge) that detects the weight of the sitting person.

The power-source-connecting connector 123b is a connector for transmitting power from a power source (not shown) to the detector body 123a.

The fixing bolt 123c and the nut 123d are used for fixing the detector body 123a (and built-in sensor) to the cushion frame 110. Another bolt and another nut (not shown) are used for fixing the detector body 123a to the slide rail 120.

The power-source-connecting connectors 123b face in different directions depending on where the weight detectors 123 are arranged. That is, in the case of the weight detectors 123 positioned on the front side, the power-source-connecting connectors 123b are attached to the front ends of the detector bodies 123a, whereas in the case of the weight detectors 123 positioned on the rear side, the power-source-connecting connectors 123b are attached to the sides of the detector bodies 123a closer to the center of the seat.

Connectors for communications (not shown) may be attached to the detector bodies 123a in the same manner as the power-source-connecting connectors 123b.

The lock mechanism 130 functions for both the first slide rail 121 and the second slide rail 122 to place or lift restrictions on movement of the first slide rail 121 and the second slide rail 122. More specifically, the lock mechanism 130 places or lifts restrictions on movement of the upper rails 1211, 1221 of the first and second slide rails 121, 122 along the lower rails 1210, 1220 thereof.

The lock mechanism 130 includes a pair of left and right lock bodies 131, a pair of left and right press levers 132, a connecting pipe 133, a cable 134, a cable's power unit 135, and a limit switch 136.

The lock bodies 131 are used as a left-and-right pair for the first slide rail 121 and the second slide rail 122. Each lock body 131 includes: the nails 131a, which are inserted into the lock holes 1210b, 1211b or 1220b, 1221b; a rotational shaft 131b; and a press receiving part 131c.

Figure 5:
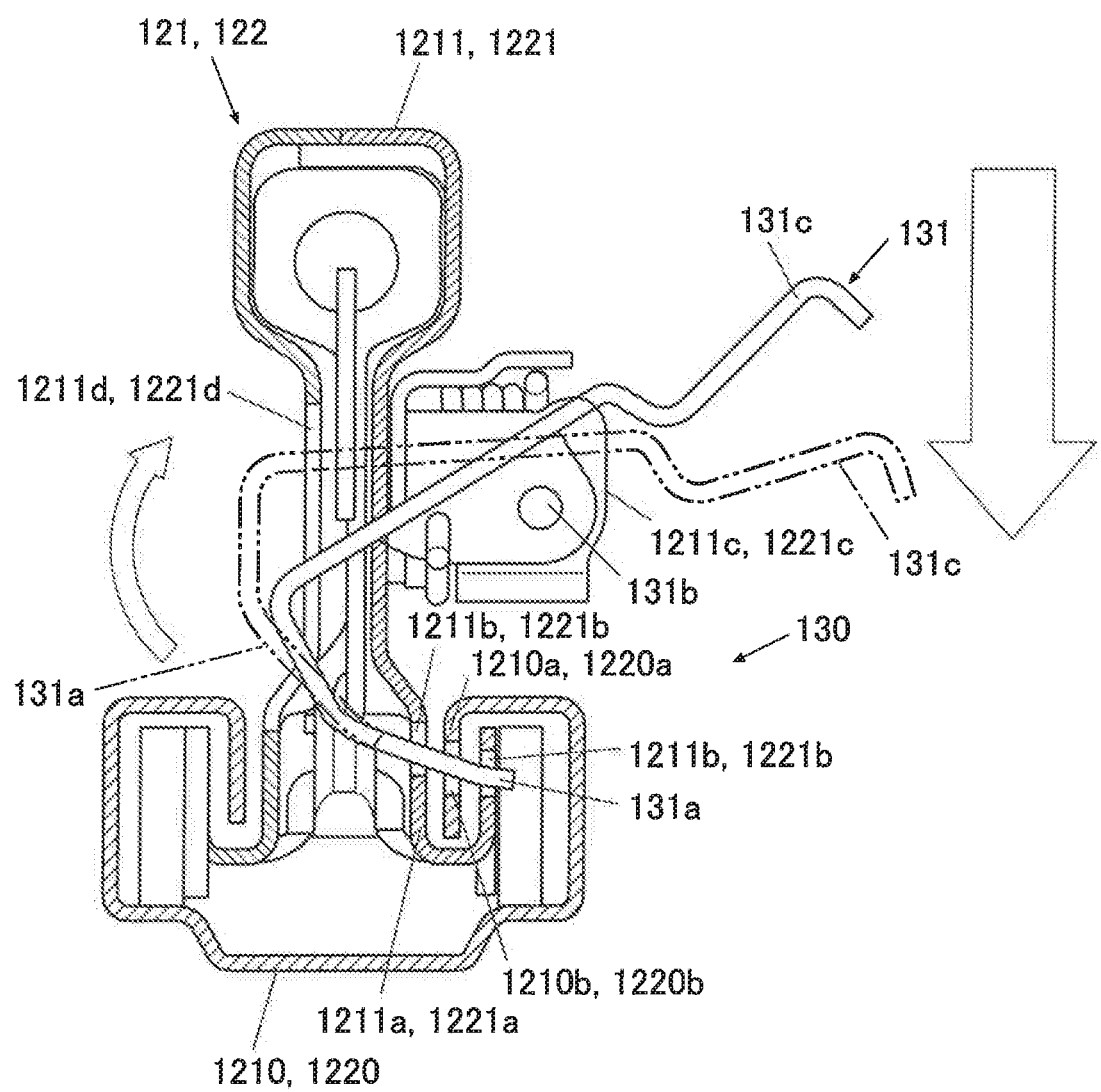
FIG. 5 is a cross sectional view to explain a lock mechanism according to the first embodiment.
Figure 6:
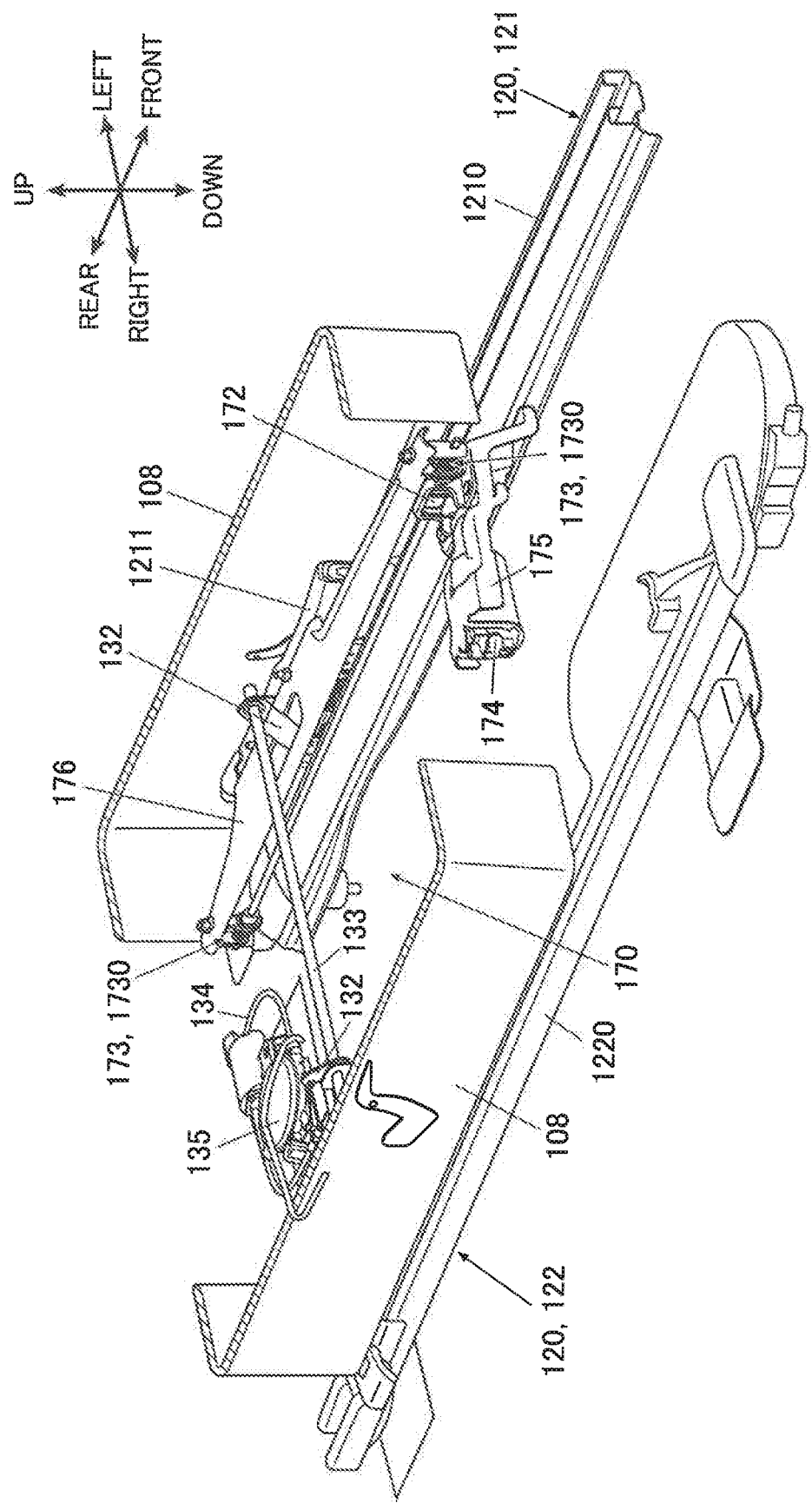
FIG. 6 is a perspective view showing a movement mechanism and its vicinity in the seat slide structure according to the first embodiment.
Figure 7:
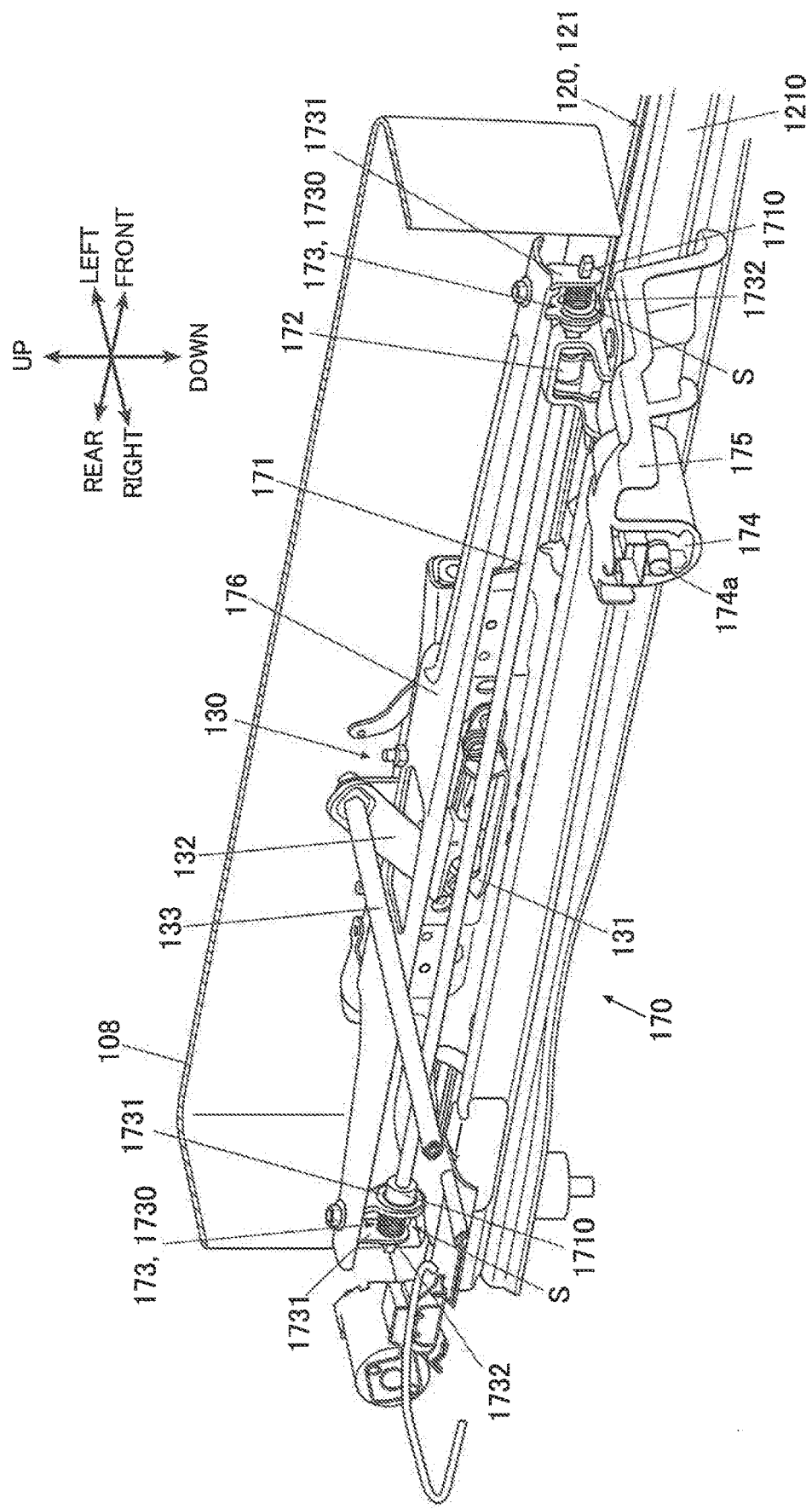
FIG. 7 is an enlarged perspective view showing the movement mechanism and its vicinity in the seat slide structure according to the first embodiment.
Figure 8:
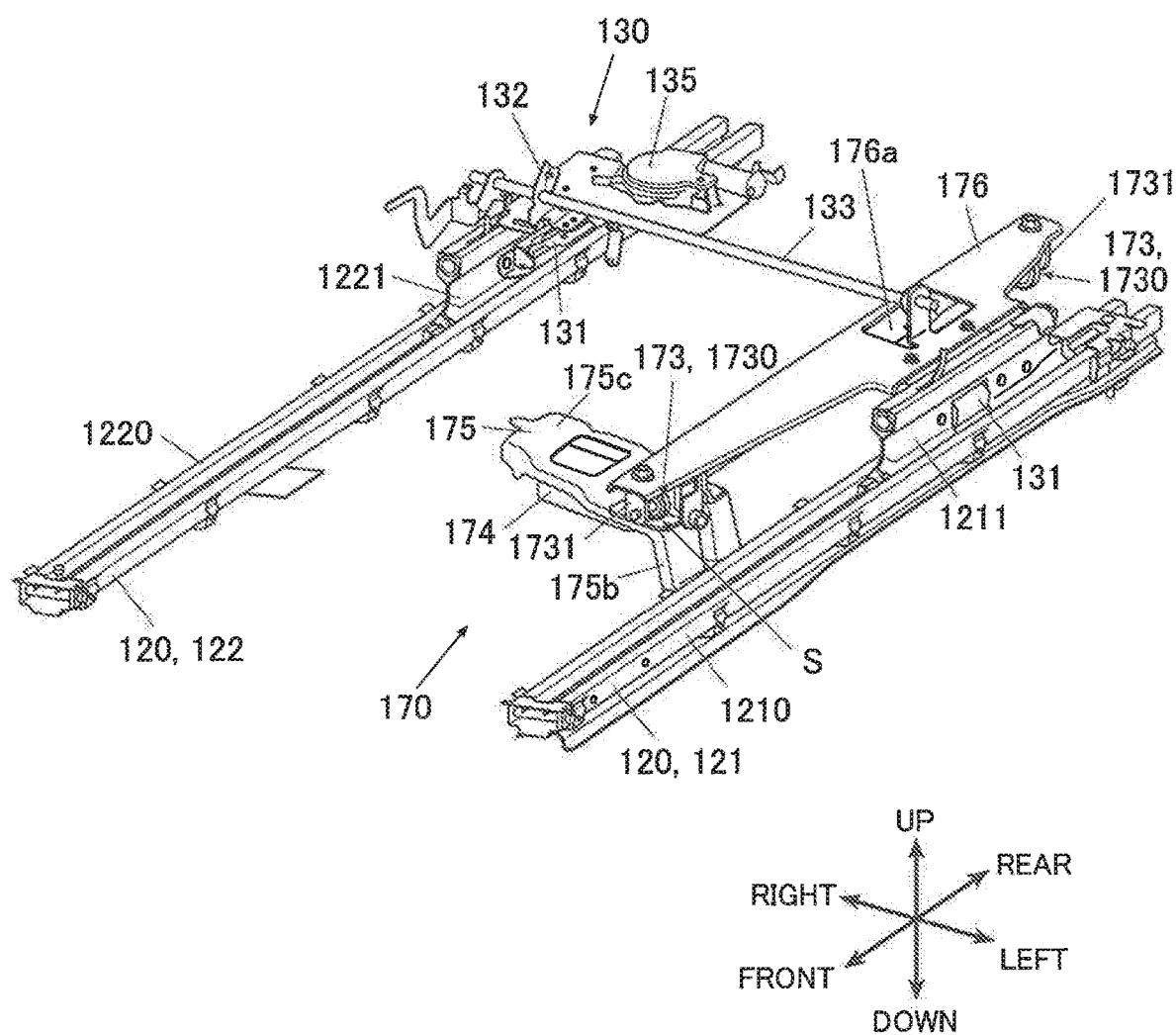
FIG. 8 is a perspective view showing the movement mechanism in the seat slide structure according to the first embodiment.
Figure 9:
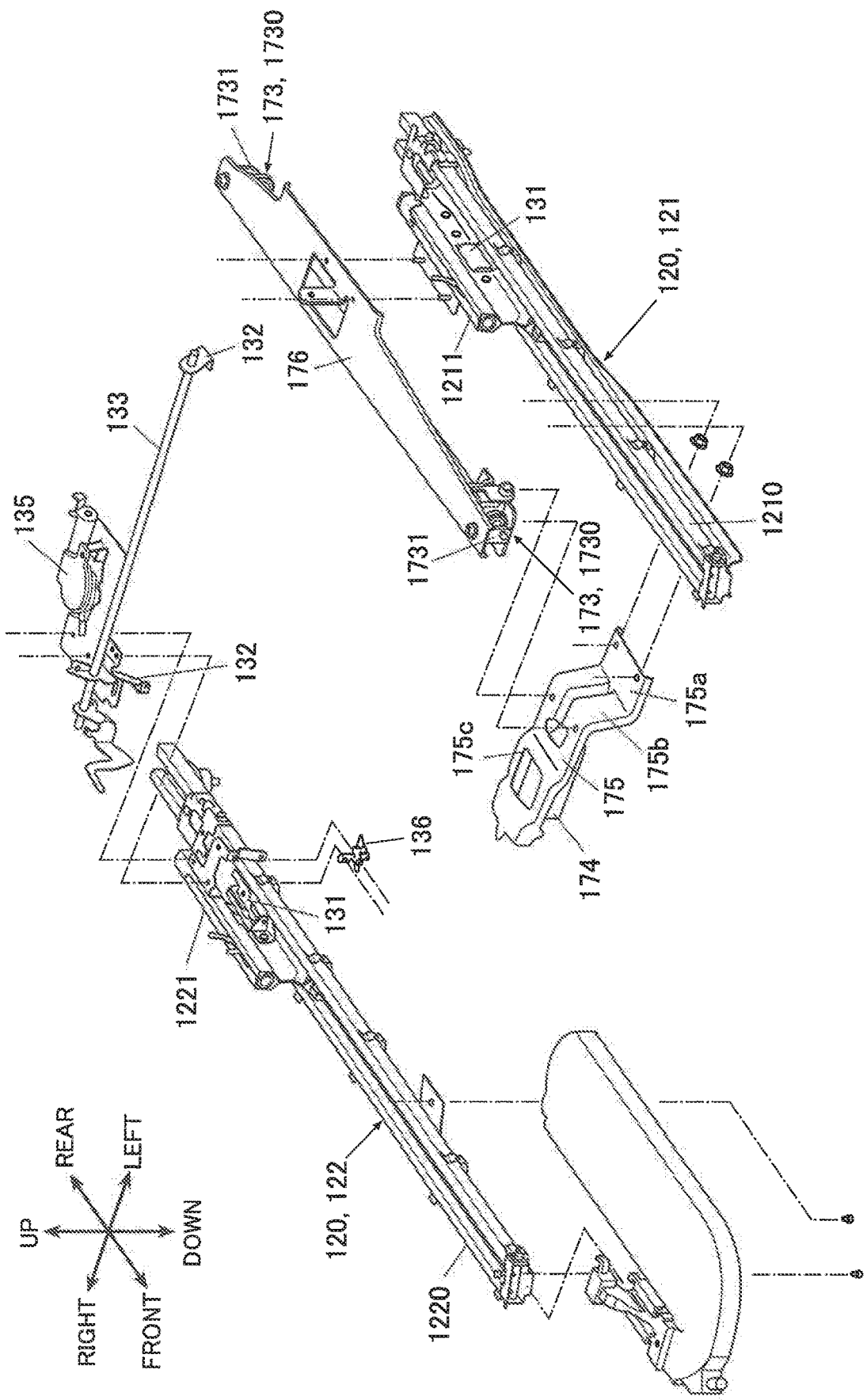
FIG. 9 is an exploded perspective view showing the movement mechanism in the seat slide structure according to the first embodiment.

The nails 131a and the press receiving part 131c are positioned exactly opposite to one another with the rotational shaft 131b as the center. The lock body 131 is configured such that when the press receiving part 131c is pressed, the nails 131a rotate upward. A down arrow (different from leader lines) in FIG. 5 represents pressing force applied to the press receiving part 131c, and an arc-shaped up arrow (different from leader lines) in FIG. 5 represents rotation of the nails 131a.

The lock body 131 is further configured such that when the press of the press receiving part 131c is released, the nails 131a rotate downward.

The number of the nails 131a provided in each lock body 131 is two or more (four in this embodiment), and the nails 131a are arranged at equal intervals.

The rotational shafts 131b are provided in brackets 1211c, 1221c that project from the upper rails 1211, 1221, and arranged in parallel with the first and second slide rails 121, 122.

In the upper rails 1211, 1221, openings 1211d, 1221d are formed on rotational trajectories of the lock bodies 131.

The press levers 132 press the press receiving parts 131c of the lock bodies 131, and are used as a left-and-right pair for the lock bodies 131, which are a left-and-right pair.

The connecting pipe 133 is put over the first cushion side frame 111 and the second cushion side frame 112, and supported thereby so as to be rotatable.

The left and right press levers 132 are fixed to the connecting pipe 133, and rotate in sync with rotation of the connecting pipe 133, namely rotate as the connecting pipe 133 rotates.

The cable 134 is hitched to one of the left and right press levers 132 (right press lever 132 in this embodiment) to cause the one of the left and right press levers 132 to rotate by power transmitted from the cable's power unit 135 fixed to the cushion frame 110. That is, the cable 134 causes one press lever 132 to rotate, which causes the connecting pipe 133 to rotate on its axis and consequently causes the other press lever 132 to rotate.

The limit switch 136 is connected to the movement mechanism 170, and used for linking operation of the lock mechanism 130 with operation of the movement mechanism 170.

More specifically, the limit switch 136 is turned on when the lock mechanism 130 performs unlocking, and at this timing, for example, the ECU controls and causes a motor 174 (described below) of the movement mechanism 170 to operate, so that the upper rails 1211, 1221 slide along the lower rails 1210, 1220.

On the other hand, the limit switch 136 is turned off when the lock mechanism 130 performs locking, and at this timing, for example, the ECU controls and causes the motor 174 (described below) of the movement mechanism 170 to stop, so that the upper rails 1211, 1221 stop sliding along the lower rails 1210, 1220.

The movement mechanism 170 includes a lead screw 171 that is provided in parallel with the first and second slide rails 121, 122 and supported by the upper rail 1211 of the first slide rail 121.

The movement mechanism 170 also includes a gear part 172 that transmits power from a power source to the lead screw 171 to cause the lead screw 171 and the upper rail 1211 to slide along the lower rail 1210, and shake absorbers 173 that allow the cushion frame 110 and the lead screw 171 to move relative to one another in the moving direction of the upper rail 1211 along the lower rail 1210.

The power source is the motor 174 fixed to the lower rail 1210. The movement mechanism 170 also includes: a motor-attaching bracket 175 that fixes the motor 174 to the lower rail 1210; and a support bracket 176 that supports the lead screw 171 and the shake absorbers 173 and is connected to the cushion frame 110.

The movement mechanism 170, which includes the shake absorbers 173 and so forth, is covered with a cover 108. The cover 108 is attached to the cushion frame 110 and slides together with the cushion frame 110.

The lead screw 171 defines the sliding distance of the seat 103. The length of the lead screw 171 is approximately equal to the distance, for which the seat 103 can slide.

On the outer circumferential surface of the lead screw 171, a screw (not shown) is formed so as to function as a male screw.

To both ends of the lead screw 171 in the length direction, end-attachment members 1710 are attached. The end-attachment members 1710 are each formed so as to have a convex section.

The gear part 172 has a female screw inside that meshes with the screw formed on the outer circumferential surface of the lead screw 171. Power from the motor 174 as the power source causes the female screw to operate, which moves the lead screw 171 along the length direction of itself.

The shake absorbers 173 are, in this embodiment, provided at both the front end and the rear end of the lead screw 171 in the length direction. In other words, the shake absorber(s) 173 may be provided at one of the front end and the rear end of the lead screw 171 in the length direction.

The shake absorbers 173 are configured to form spaces S for the cushion frame 110 and the lead screw 171 to move relative to one another. The spaces S are play, and presence of the spaces S as the play allows the cushion frame 110 to slide for more than the length of the lead screw 171.

Each shake absorber 173 includes a U-shaped holding bracket 1730 having a pair of projecting holders 1731 that project to the lead screw 171 and through which one of the ends of the lead screw 171 passes.

More specifically, of the pair of the projecting holders 1731, the projecting holder 1731 positioned on the inner side, which is the side closer to the center of the lead screw 171 in the length direction, is a part through which a thick shaft part of one of the end-attachment members 1710, which are attached to the respective ends of the lead screw 171, passes, whereas the other projecting holder 1731 positioned on the outer side is a part through which a thin shaft part of the one of the end-attachment members 1710 passes. Space between the projecting holders 1731 functions as the space S.

In the space S, a biasing member 1732 that biases the cushion frame 110 along the length direction of the lead screw 171 is provided. The biasing member 1732 is a compression spring, and provided so as to cover/wrap the thin shaft part of the end-attachment member 1710. Both ends of the biasing member 1732 touch the projecting holders 1731, which are a pair, so that repulsive force of the compression spring works efficiently.

The front-side shake absorber 173, which is provided at the front end of the lead screw 171 in the length direction, is arranged in front of and lower than the connecting member 115, which connects the cushion side frames 111, 112 provided on the left and the right to one another.

The rear-side shake absorber 173 is arranged near the rear end of the first slide rail 121 at the same height/level as the front-side shake absorber 173.

The motor 174 is held by the motor-attaching bracket 175, and the motor-attaching bracket 175 is fixed to the first slide rail 121.

The motor 174 has a shaft 174a through which power is transmitted to the lead screw 171, and rotates the shaft 174a to operate the female screw built in the gear part 172 and consequently operate the lead screw 171.

The motor-attaching bracket 175 has a fixed part 175a fixed to the lower surface of the first slide rail 121, a rising part 175b that rises upward from the fixed part 175a, and a motor holder 175c that extends from the upper end of the rising part 175b toward the second slide rail 122 and holds the motor 174. The motor 174 is held on the lower surface of the motor holder 175c. That is, thanks to the rising part 175b, a space for the motor 174 to be held is ensured under the motor holder 175c.

The shaft 174a of the motor 174 is arranged lower than the shake absorbers 173. Further, the shaft 174a of the motor 174 is arranged behind the front-side shake absorber 173 when the cushion frame 110 reaches the forefront of the first slide rail 121, and arranged in front of the rear-side shake absorber 173 when the cushion frame 110 reaches the rearmost position of the first slide rail 121.

The front end of the motor-attaching bracket 175 is arranged at the same position as the front-side shake absorber 173 in the front-rear direction when the cushion frame 110 reaches the rearmost position of the first slide rail 121.

The support bracket 176 extends in a direction parallel to the length direction of the lead screw 171, and is fixed to the upper rail 1211 of the first slide rail 121. Under the support bracket 176, the lead screw 171 is arranged. To both ends on the lower surface of the support bracket 176 in the length direction, the holding brackets 1730, which form the spaces S, are fixed.

In the center of the support bracket 176, an opening 176a is formed not to obstruct rotation of the press lever 132 that is provided under the support bracket 176.

Figure 10:
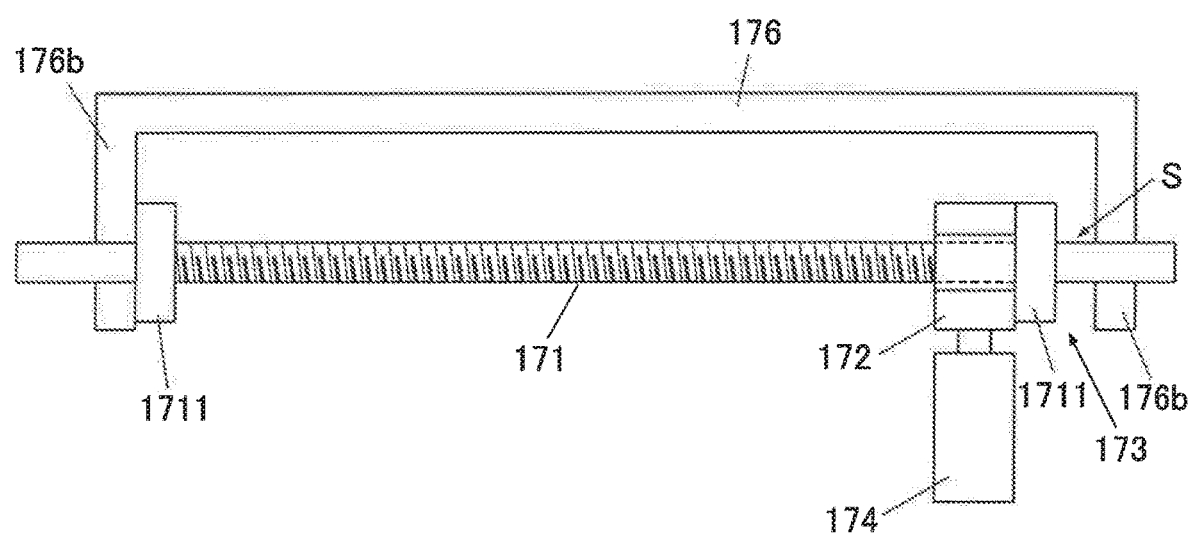
FIG. 10 is an illustration to explain another example of the movement mechanism in the seat slide structure according to the first embodiment.
Figure 11:
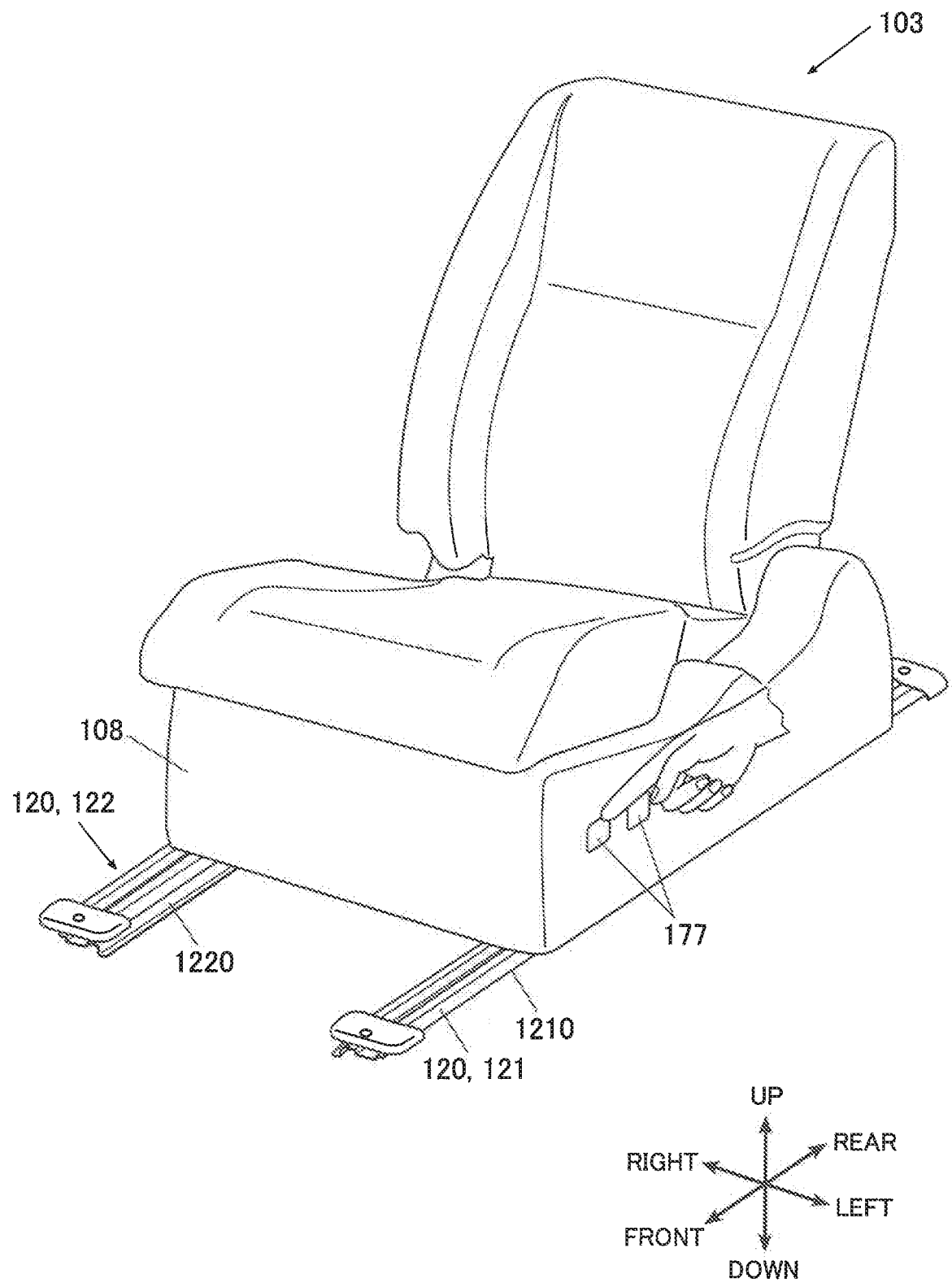
FIG. 11 is an illustration to explain a procedure for sliding a seat according to the first embodiment.
Figure 15:
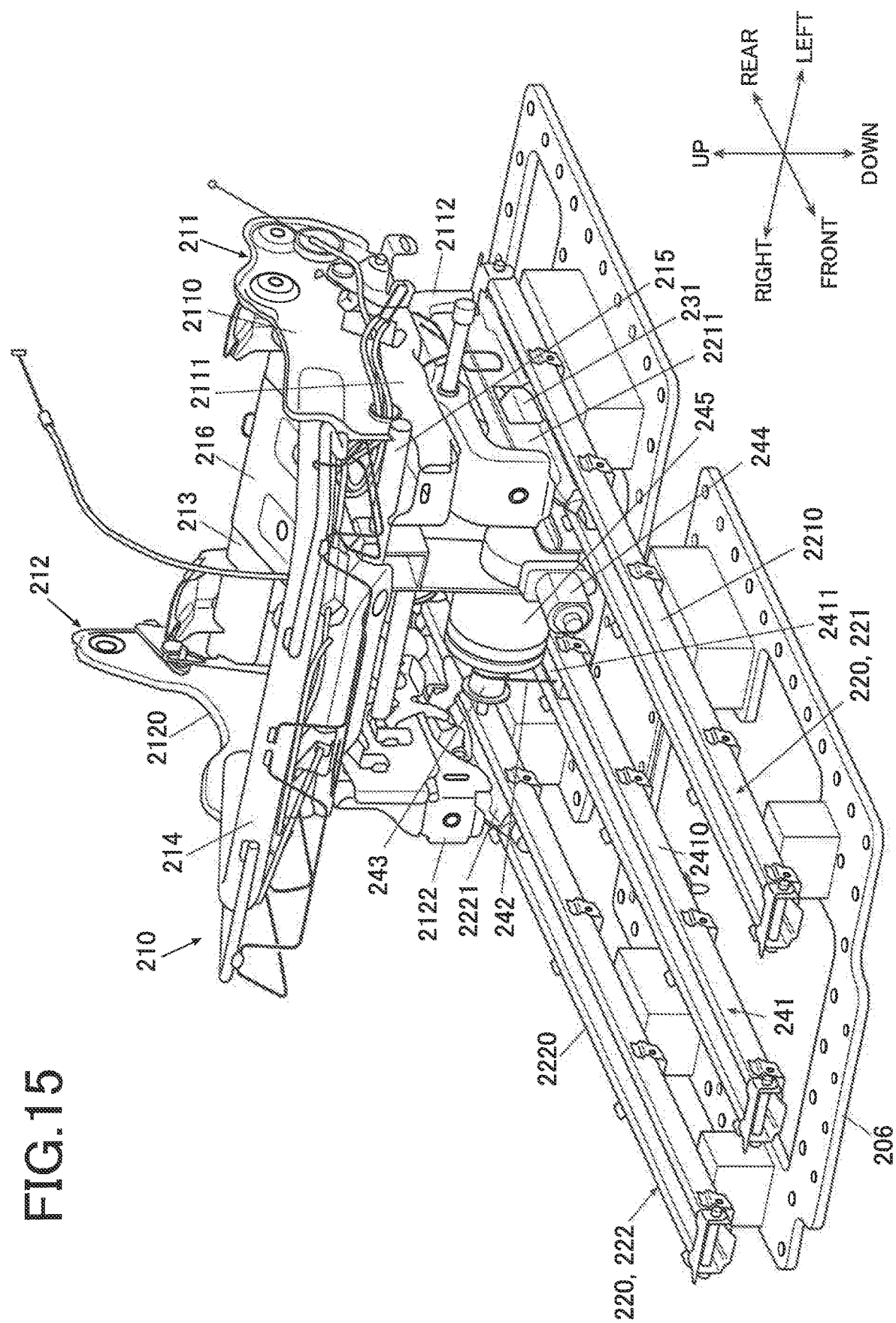
FIG. 15 is a perspective view showing a seat slide structure according to a second embodiment.
Figure 16:
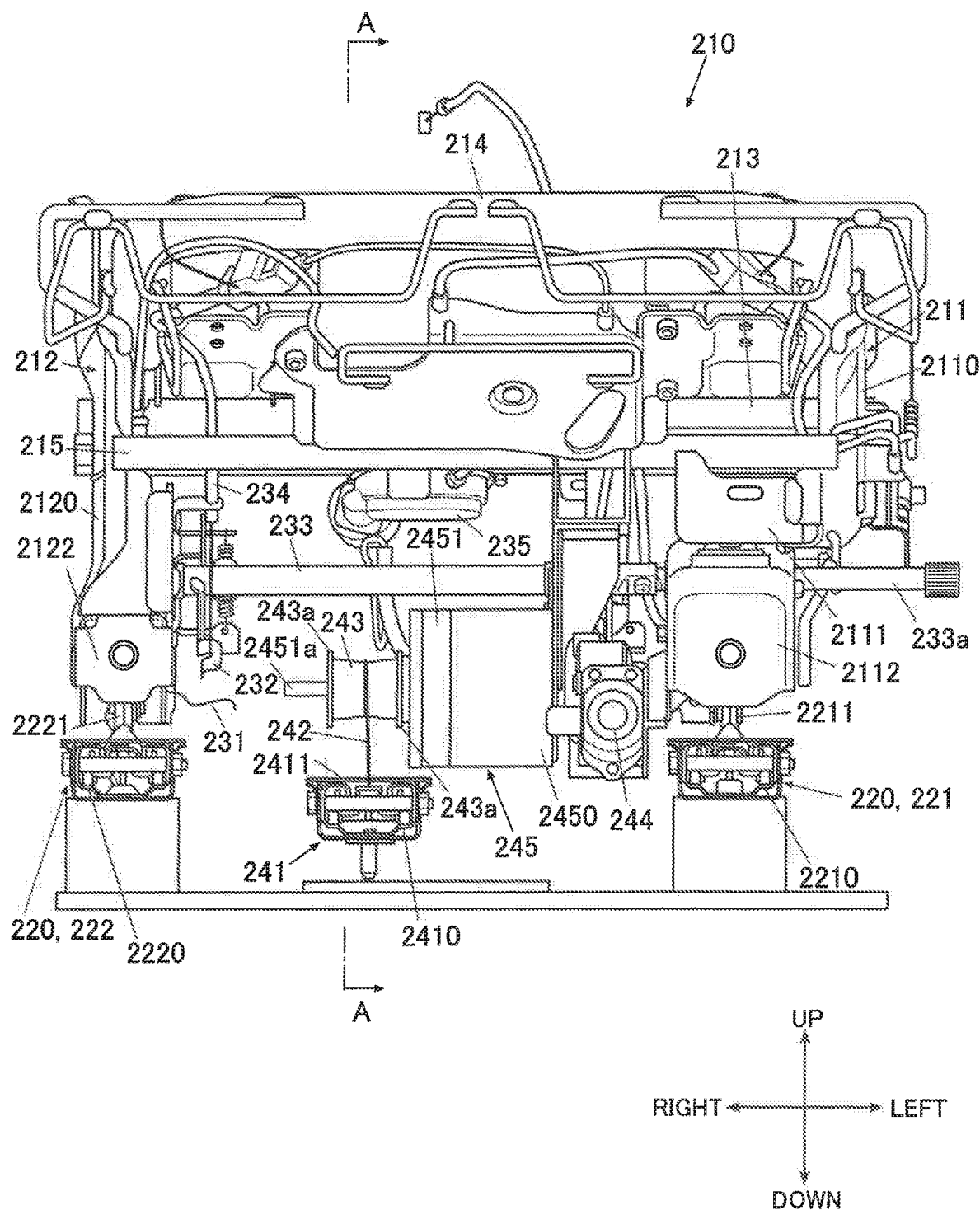
FIG. 16 is a front view showing the seat slide structure according to the second embodiment.
Figure 17:
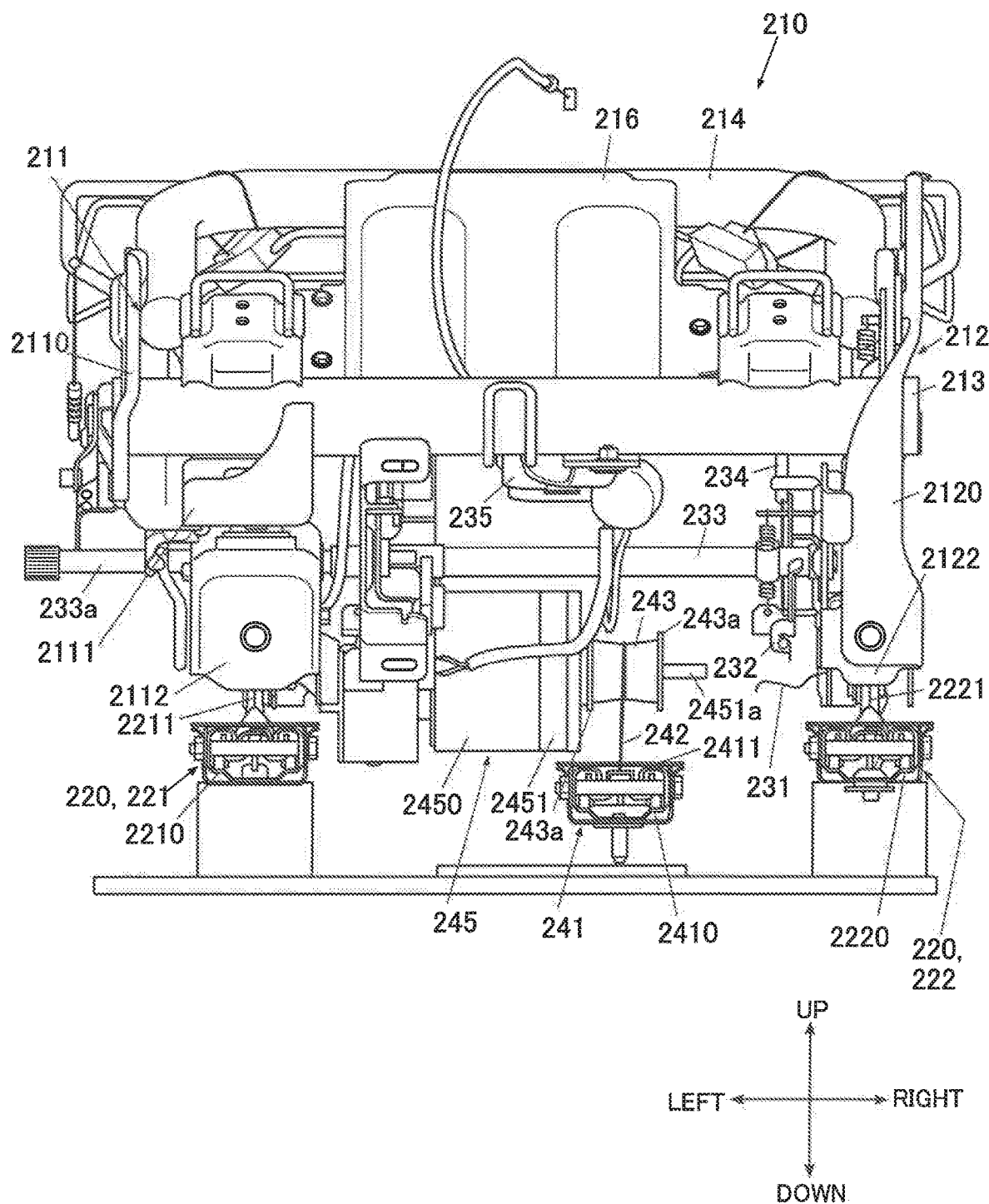
FIG. 17 is a rear view showing the seat slide structure according to the second embodiment.
Figure 18:
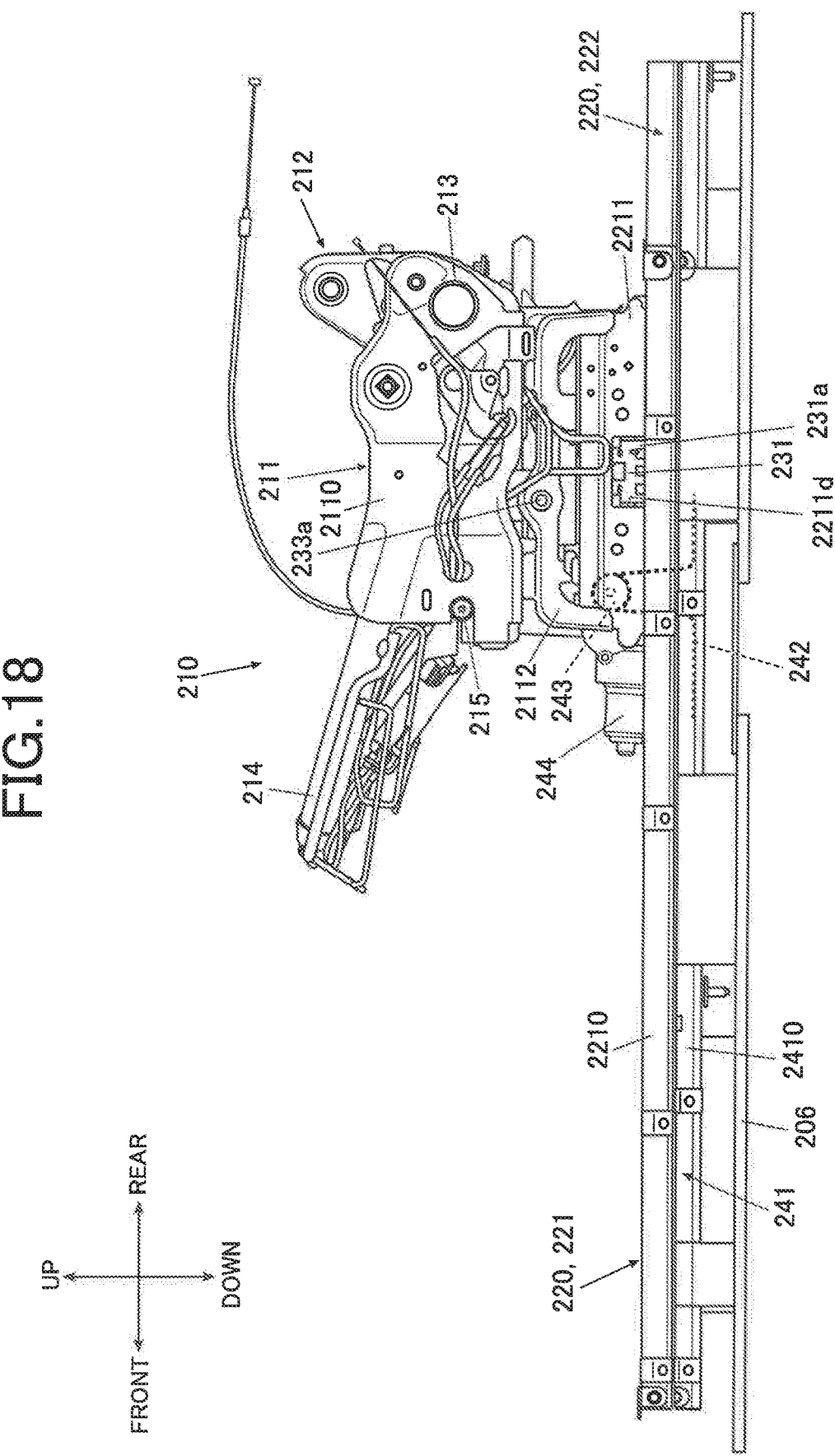
FIG. 18 is a left side view showing the seat slide structure according to the second embodiment.
Figure 19:
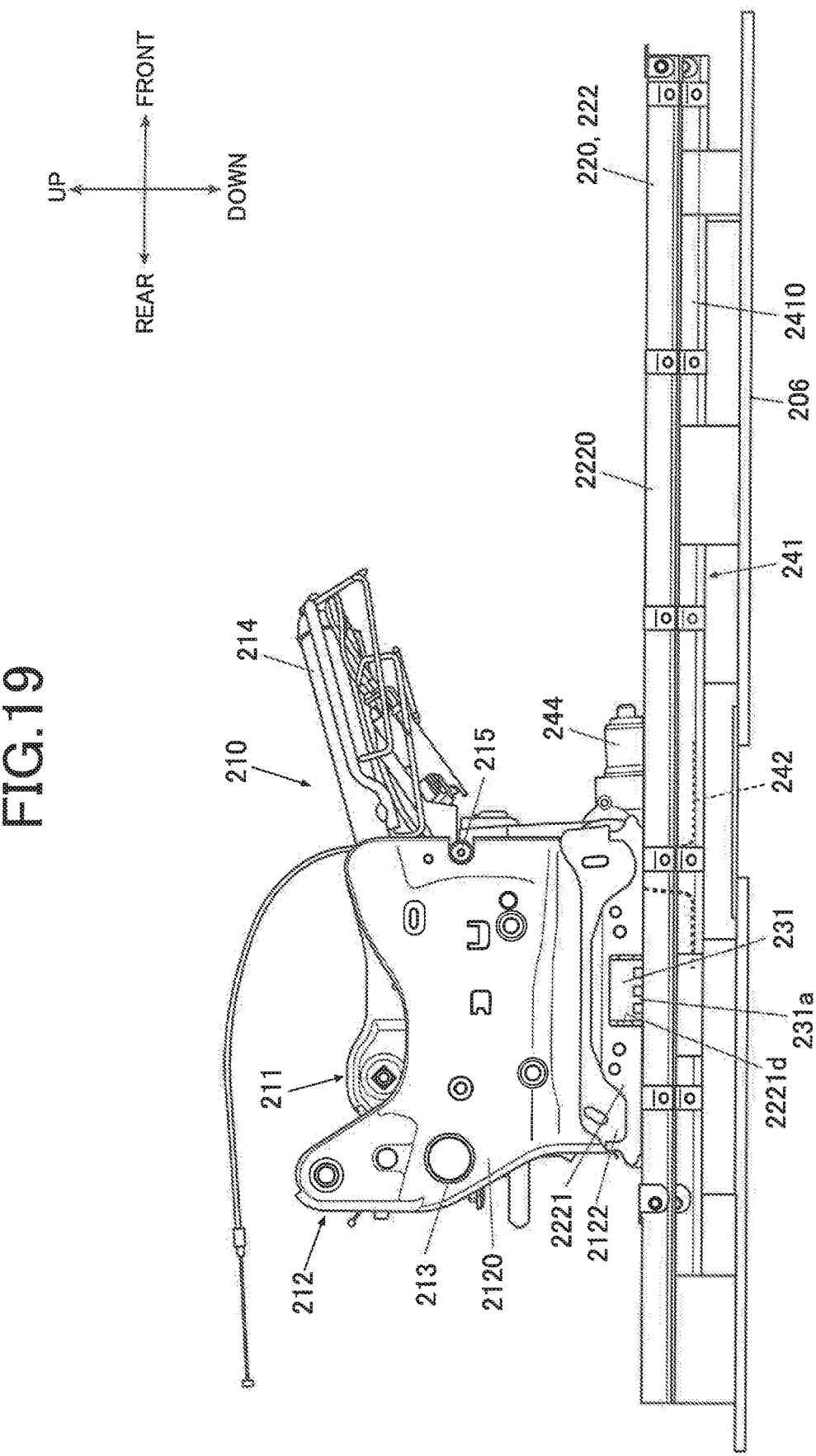
FIG. 19 is a right side view showing the seat slide structure according to the second embodiment.

In this embodiment, the spaces S are ensured by the shake absorbers 173 each having the holding bracket 1730 and the biasing member 1732, but may be ensured, for example, by stoppers 1711 provided at both ends of the lead screw 171 in the length direction as shown in FIG. 10.

In other words, the lead screw 171 has, at both ends in the length direction, the stoppers 1711 that limit the movement distance of the lead screw 171 with respect to the gear part 172 and ensure the space(s) S in the shake absorber(s) 173.

The support bracket 176 has holders 176b at both ends in the length direction to form the space(s) S between the stopper(s) 1711 and themselves/itself. The holders 176b project to the lead screw 171. The lead screw 171 pass through the holders 176b provided at both ends of the support bracket 176.

The seat 103 (cover 108 in this embodiment) is provided with a switch(es) 177 for making an input to slide the seat 103 forward or rearward. Operating the switch 177 causes the lock mechanism 130 and the movement mechanism 170 to operate to slide the seat 103 forward or rearward.

Operation of the seat slide structure thus configured will be described. Each control necessary for sliding the seat 103 is performed by the ECU described above.

First, an occupant chooses whether to slide the seat 103 forward or rearward by operating the switch 177. When receiving an input from the switch 177, the ECU controls the cable's power unit 135 of the lock mechanism 130 to pull the cable 134. This causes the press lever 132 to which the cable 134 is hitched to rotate. As this takes place, the connecting pipe 133 rotates on its axis, and the other press lever 132 rotates in sync therewith.

Successively, the left and right press levers 132 press the press receiving parts 131c of the left and right lock bodies 131, so that the left and right lock bodies 131 rotate on their rotational shafts 131b. This pulls out the nails 131a of the lock bodies 131 from the lock holes 1210b, 1211b, 1220b, 1221b of the first and second slide rails 121, 122, thereby performing unlocking.

Pulling out the nails 131a of the lock bodies 131 from the lock holes 1210b, 1211b, 1220b, 1221b turns on the limit switch 136. When the limit switch 136 is turned on, the ECU causes the motor 174 to operate and consequently causes the gear part 172 to operate.

When the gear part 172 operates, the lead screw 171 moves forward or rearward while rotating. As this takes place, in the first and second slide rails 121, 122, the upper rails 1211, 1221 slide along the lower rails 1210, 1220.

Thus, the seat 103 can be made to slide forward or rearward.

When the seat 103 slides to a position desired by the occupant, the occupant stops operating the switch 177. When operation on the switch 177 stops, the cable's power unit 135 stops, and consequently the cable 134 goes back to its initial position, and also the left and right press levers 132 rotate to go back to their initial positions.

As these take place, the lock bodies 131 also rotate to go back to their initial positions. However, the nails 131a of the lock bodies 131 may not be inserted into the lock holes 1210b, 1220b of the lower rails 1210, 1220 because the seat sliding is stopped at the occupant's desired position. In such a case, the occupant moves his/her body to move the seat forward or rearward while keeping sitting on the seat. This inserts the nails 131a of the lock bodies 131 into their nearby lock holes 1210b, 1220b of the lower rails 1210, 1220, thereby performing locking.

Inserting the nails 131a of the lock bodies 131 into their nearby lock holes 1210b, 1220b of the lower rails 1210, 1220 turns off the limit switch 136. Then, the ECU stops the motor 174 and consequently stops the gear part 172.

Thus, the seat 103 can be stopped at a position desired by the occupant.

According to this embodiment, the movement mechanism 170 includes: the lead screw 171 that is provided in parallel with the first slide rail 121 and the second slide rail 122, and is supported by the upper rail 1211 of the first slide rail 121; the gear part 172 that transmits power from the motor 174 as the power source to the lead screw 171 to slide the lead screw 171 and the upper rail 1211 along the lower rail 1210; and the shake absorber(s) 173 that allows the cushion frame 110 and the lead screw 171 to move relative to one another in the moving direction of the upper rail 1211 along the lower rail 1210. Hence, if, before the lock bodies 131 engage with the first slide rail 121 and the second slide rail 122, the gear part 172 stops and the lead screw 171 is in the state of not operating, the shake absorbers 173 allow the cushion frame 110 and the lead screw 171 to move relative to one another in the moving direction of the upper rail 1211 along the lower rail 1210 so that the lock bodies 131 can engage with the first slide rail 121 and the second slide rail 122. Thus, the structure in which the lock bodies 131 as the lock mechanism 131 and the lead screw 171 as the movement mechanism 170 are linked is realized.

Further, the shake absorber(s) 173 is configured to form the space(s) S for the cushion frame 110 and the lead screw 171 to perform the relative movement. The space(s) S can be used as the play for the cushion frame 110 and the lead screw 171 to move relative to one another in the moving direction of the upper rail 1211 along the lower rail 1210.

Further, in the space(s) S, the biasing member(s) 1732 that biases the cushion frame 110 along the length direction of the lead screw 171 is provided. The biasing members 1732 bias the cushion frame 110 along the length direction of the lead screw 171, and consequently can prevent shakes of the cushion frame 110 with respect to the lead screw 171.

Further, at each of both ends of the lead screw 171 in the length direction of the lead screw 171, the stopper 1711 that limits the movement distance of the lead screw 171 with respect to the gear part 172 and ensures the space S in the shake absorber 173 is provided. Thus, the stoppers 1711 limit the movement distance of the lead screw 171 with respect to the gear part 172 and ensure the space(s) S in the shake absorber(s) 173.

Further, the shake absorber(s) 173 include the U-shaped holding bracket 1730 including the pair of the projecting holders 1731 that project to the lead screw 171 and through which an end of the lead screw 171 passes. The holding brackets 1730 as the shake absorbers 173 can hold the ends of the lead screw 171 each by double holding, and hence can enhance support stiffness of the lead screw 171.

Further, the shake absorber 173 is provided at each of the front end and the rear end of the lead screw 171 in the length direction of the lead screw 171 as the front-side shake absorber 173 and the rear-side shake absorber 173. Hence, actions in the shake absorbers 173 can be stably performed at the front end and the rear end of the lead screw 171 in the length direction.

Further, the cover 108 that covers the shake absorber(s) 173 is provided. This can make substances hardly touch the shake absorbers 173, and also make the shake absorbers 173 invisible from the outside and accordingly make external appearance look better.

Further, the shaft 174a of the motor 174 as the power source is arranged behind the front-side shake absorber 173 when the cushion frame 110 reaches the forefront of the first slide rail 121 and the second slide rail 122, and arranged in front of the rear-side shake absorber 173 when the cushion frame 110 reaches the rearmost position of the first slide rail 121 and the second slide rail 122. Thus, when the cushion frame 110 reaches the forefront and also when the cushion frame 110 reaches the rearmost position, the shaft 174a of the motor 174 and the shake absorbers 173 provided at the front end and the rear end of the lead screw 171 in the length direction are not overlapped. This makes it more likely that the front-side and rear-side shake absorbers 173 function normally.

Further, the front end of the motor-attaching bracket 175 that fixes the motor 174 to the lower rail 1210 is at the same position in the front-rear direction as the front-side shake absorber 173 when the cushion frame 110 reaches the rearmost position of the first slide rail 121. Hence, the front end of the motor-attaching bracket 175 and the front-side shake absorber 173 are overlapped in the up-down direction. This can move the cushion frame 110 to the rearmost position of the first slide rail 121, and also can ensure the space S in the shake absorber 173.

Further, the shaft 174a of the motor 174 is arranged lower than the front-side shake absorber 173 and the rear-side shake absorber 173. Thus, the shaft 174a of the motor 174 and the shake absorbers 173 can be arranged at different positions in the up-down direction.

Further, the front-side shake absorber 173 is arranged in front of the connecting member 115 that is put over the front ends of the left cushion side frame 111 and the right cushion side frame 112, thereby connecting the left cushion side frame 111 and the right cushion side frame 112 to one another. Thus, the front-side shake absorber 173 and the connecting member 115 are not overlapped in the front-rear direction. This makes it easy to see the front-side shake absorber 173 from the front side, and also makes it more likely that the front-side shake absorber 173 functions normally.

Further, the front-side shake absorber 173 is arranged lower than the connecting member 115. Thus, the front-side shake absorber 173 and the connecting member 115 are not overlapped in the up-down direction. This makes it easy to see the front-side shake absorber 173 from the lower side, and also makes it more likely that the front-side shake absorber 173 functions normally.

Further, the support bracket 176 that (i) supports the lead screw 171 and the shake absorber(s) 173 and (ii) is connected to the cushion frame 110 extends in the direction parallel to the length direction of the lead screw 171, and the lead screw 171 is arranged under the support bracket 176.

This makes it more likely to convey actions in the lead screw 171 and the shake absorbers 173 to the cushion frame 110 through the support bracket 176.

Second Embodiment

Both the seat lock mechanism and the seat movement mechanism in the conventional vehicle seat mentioned above are simpler in structure than earlier ones.

In such a conventional vehicle seat, as part of the movement mechanism that slides a seat, a wire is used. However, this wire is arranged on a side of the seat, which is wider than a space between slide rails. This increases seat size in the width direction. Further, if the lock mechanism or the movement mechanism is provided on a side of the seat, the lock mechanism or the movement mechanism needs not to protrude much from the seat cushion sideward. This raises a problem that a space(s) for the lock mechanism or the movement mechanism to be provided is limited.

Then, it is required to restrain increase in seat size in the width direction while ensuring a sufficient space for a seat slide structure.

According to this embodiment, the following is provided.

1. A seat slide structure including:
a cushion frame that forms a framework of a seat cushion that supports a femoral region and buttocks of a person;
a first slide rail and a second slide rail that are connected to left and right of a lower end of the cushion frame, respectively; and
a movement mechanism that slides the cushion frame along a length direction of the first slide rail and the second slide rail, and includes:
  a third slide rail that is arranged between the first slide rail and the second slide rail in parallel with the first slide rail and the second slide rail;
  a wire both ends of which are fixed to the third slide rail; and
  a winch around which the wire is wound and that is supported by the cushion frame so as to be rotatable.

2. The seat slide structure according to the item 1, wherein a pulley around which the wire passes is arranged in the third slide rail.

3. The seat slide structure according to the item 2, including a lock mechanism that places or lifts a restriction on movement of the first slide rail and the second slide rail, and includes lock bodies engaging with the first slide rail and the second slide rail, wherein
the winch and the pulley are arranged in front of the lock bodies.

4. The seat slide structure according to the item 1, wherein the third slide rail is arranged so as to be offset from middle between the first slide rail and the second slide rail to either the left or the right.

5. The seat slide structure according to the item 1, wherein
the cushion frame includes a left cushion side frame and a right cushion side frame that are arranged so as to leave a space in between, and
the movement mechanism includes a motor that (i) rotates the winch and (ii) is arranged between the winch and one of the left cushion side frame and the right cushion side frame.

6. The seat slide structure according to the item 5, wherein
the movement mechanism includes a power blocker that transmits or blocks power output from the motor to the winch, and
the motor is arranged between (i) the power blocker and the winch and (ii) the one of the left cushion side frame and the right cushion side frame.

7. The seat slide structure according to the item 2, wherein the third slide rail includes: a lower rail; and a bracket that is provided so as to be slidable along the lower rail and supports the pulley.

8. The seat slide structure according to the item 1, wherein in the third slide rail, holes for weight reduction are formed at intervals in a length direction of the third slide rail.

9. The seat slide structure according to the item 1, wherein the third slide rail is arranged closer to, between the first slide rail and the second slide rail, a slide rail arranged far from a wheel well that is convex toward the seat cushion.

10. The seat slide structure according to the item 9, wherein a length of, between the first slide rail and the second slide rail, the slide rail arranged far from the wheel well and a length of the third slide rail are set to be equal in a front-rear direction.

11. The seat slide structure according to the item 9, wherein a length of, between the first slide rail and the second slide rail, the slide rail arranged far from the wheel well, a length of, between the first slide rail and the second slide rail, a slide rail arranged near the wheel well, and a length of the third slide rail are set to be equal in a front-rear direction.

12. The seat slide structure according to the item 2, wherein
the cushion frame includes:
  a left cushion side frame and a right cushion side frame that are arranged so as to leave a space in between; and
  a connecting member that is put over front ends of the left cushion side frame and the right cushion side frame, thereby connecting the left cushion side frame and the right cushion side frame to one another, and
the pulley is arranged in front of the connecting member.

13. The seat slide structure according to the item 1, wherein the third slide rail is arranged lower than the first slide rail and the second slide rail.

14. The seat slide structure according to the item 6, wherein the third slide rail is arranged so as to overlap each of the power blocker and the winch in an up-down direction.

15. The seat slide structure according to the item 6, wherein
the third slide rail is arranged closer to one of the first slide rail and the second slide rail, and
the power blocker is arranged closer to other of the first slide rail and the second slide rail.

A seat slide structure according to this embodiment slides a vehicle seat installed in an automobile as a passenger car, or installed, for example, in another type of automobiles, such as a bus or a truck, or in a vehicle other than automobiles, such as a train, a vessel, or an airplane.

The vehicle seat (hereinafter "seat") at least includes: a seat cushion that supports the femoral region and the buttocks of a person; and a seat back the lower end of which is supported by the seat cushion and that serves as a backrest. The seat optionally includes a head rest that supports the head of a person, arm rests that support the arms of a person, and an ottoman that supports the legs of a person.

As shown in FIG. 15 to FIG. 27, the seat slide structure includes a cushion frame 210 that forms the framework of the seat cushion, slide rails 220 that are connected to the lower end of the cushion frame 210, a lock mechanism 230 that places or lifts restrictions on movement of the slide rails 220, and a movement mechanism 240 that slides the cushion frame 210 along the length direction of the slide rails 220.

The cushion frame 210 includes a first cushion side frame 211, a second cushion side frame 212, a back pipe frame 213, a front pipe frame 214, a connecting member 215, and a pressure receiving member 216.

The first cushion side frame 211 is arranged so as to leave a space from the second cushion side frame 212 in the right-left direction, and has: a sheet-shaped side plate 2110; a support leg 2111 that is integrated with the lower end of the side plate 2110 and supports the side plate 2110; and a connecting leg 2112 that is provided at the lower end of the support leg 2111 and connected to one of the slide rails 220.

Although not shown, to the first cushion side frame 211, a seat back frame constituting the seat back is connected through a reclining mechanism.

The second cushion side frame 212 is arranged so as to leave a space from the first cushion side frame 211 in the right-left direction, and has: a sheet-shaped side plate 2120; and a connecting leg 2122 that is integrated with the lower end of the side plate 2120 and connected to the other of the slide rails 220.

Although not shown, to the second cushion side frame 212, the seat back frame constituting the seat back is connected through the reclining mechanism.

The back pipe frame 213 is a straight pipe frame, and connects the rear end of the first cushion side frame 211 and the rear end of the second cushion side frame 212 to one another.

The front pipe frame 214 is a U-shaped pipe frame, and connects the front end of the first cushion side frame 211 and the front end of the second cushion side frame 212 to one another.

The connecting member 215 is a straight pipe frame, and is put over the front end of the side plate 2110 of the first cushion side frame 211 and the front end of the side plate 2120 of the second cushion side frame 212, thereby connecting the first cushion side frame 211 and the second cushion side frame 212 to one another.

The connecting member 215 is positioned lower than the front pipe frame 214, and inserted into notch parts formed at the front ends of the side plate 2110 of the first cushion side frame 211 and the side plate 2120 of the second cushion side frame 212, and fixed thereto.

The pressure receiving member 216 receives the weight of a person who sits on the seat, and, in this embodiment, is sheet/plate-shaped. The rear end and the front end of the pressure receiving member 216 are fixed to the back pipe frame 213 and the front pipe frame 214, respectively.

Figure 20:
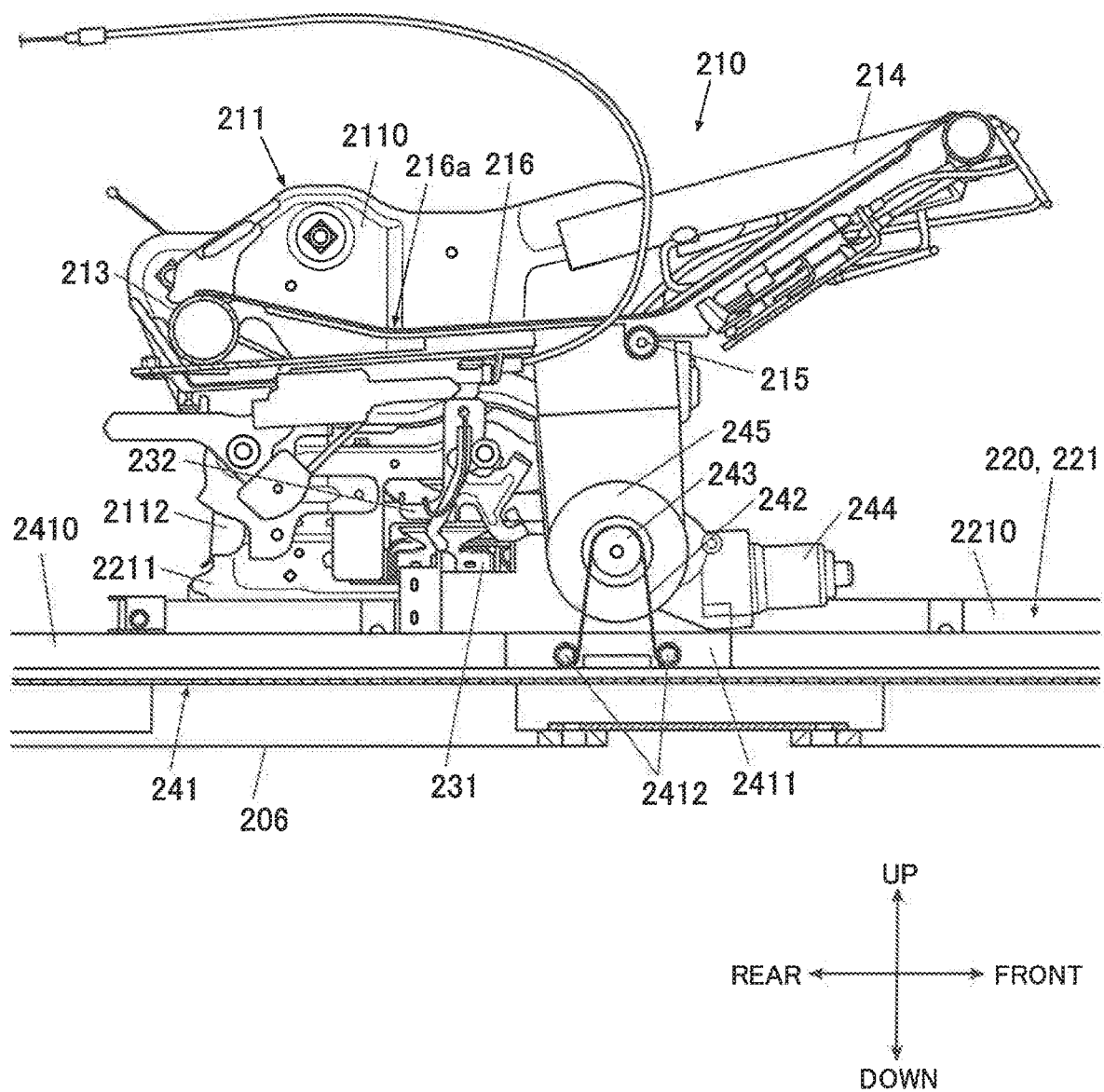
FIG. 20 is a cross sectional view taken along line A-A in FIG. 16.
Figure 21:
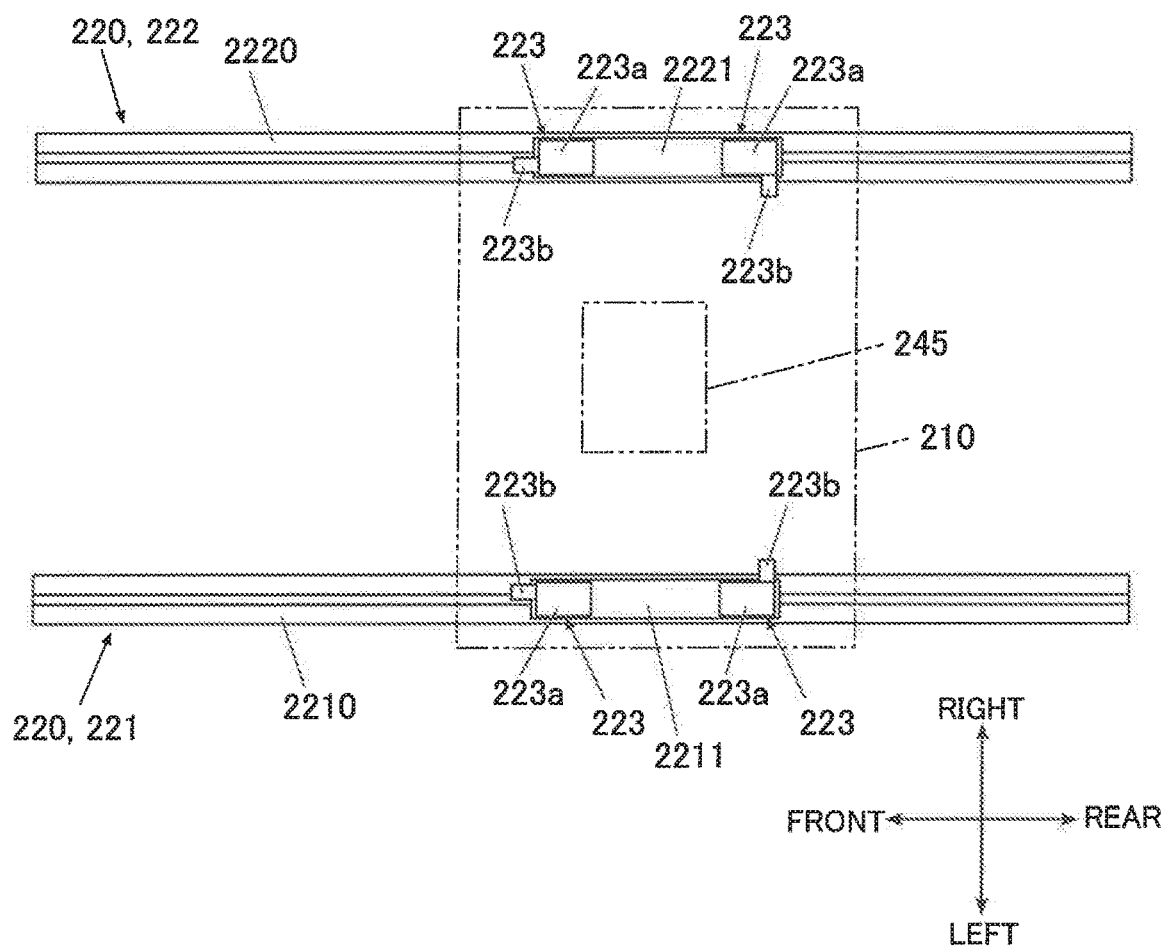
FIG. 21 is a schematic view to explain arrangement of seat weight sensors according to the second embodiment.

The pressure receiving member 216 is formed by being bent so as to be convex downward to fit the shapes of the femoral region and the buttocks of a person, and a part of the pressure receiving member 216, the part receiving the buttocks of a person, is a hip-point 216a (shown in FIG. 20).

The hip-point 216a is positioned, in the pressure receiving member 216, closest to the upper end of the slide rails 220.

The slide rails 220 are a first slide rail 221 and a second slide rail 222 that are arranged so as to leave a space in between in the right-left direction.

The first slide rail 221 is connected to the lower end of the first cushion side frame 211, and the second slide rail 222 is connected to the lower end of the second cushion side frame 212.

In this embodiment, the first slide rail 221 and the second slide rail 222 are provided by being put over pillars of a rail support stand 206.

The first slide rail 221 includes: a lower rail 2210; and an upper rail 2211 that is provided so as to be slidable along the lower rail 2210 and is connected to the cushion frame 210.

The lower rail 2210 has a side wall 2210a where lock holes 2210b are formed, on the side of the lower rail 2210 closer to the center of the seat, and the upper rail 2211 has a side wall 2211a where lock holes 2211b are formed, on the side of the upper rail 2211 closer to the center of the seat. The side wall 2211a of the upper rail 2211 is formed so as to have a U-shaped section, and the side wall 2210a of the lower rail 2210 is inserted therein, so that the side walls 2210a, 2211a face one another.

Into the lock holes 2210b, 2211b, nails 231a of a lock body 231 of the lock mechanism 230 are inserted (described below).

The lock holes 2210b of the side wall 2210a of the lower rail 2210 are formed at intervals in the length direction of the lower rail 2210. The number of the lock holes 2210b formed in the lower rail 2210 can cover a movable region in which the upper rail 2211 can move along the lower rail 2210.

The lock holes 2211b of the side wall 2211a of the upper rail 2211 are formed in accordance with the number of the nails 231a of the lock body 231.

The second slide rail 222 includes: a lower rail 2220; and an upper rail 2221 that is provided so as to be slidable along the lower rail 2220 and is connected to the cushion frame 210.

The lower rail 2220 has a side wall 2220a where lock holes 2220b are formed, on the side of the lower rail 2220 closer to the center of the seat, and the upper rail 2221 has a side wall 2221a where lock holes 2221b are formed, on the side of the upper rail 2221 closer to the center of the seat. The side wall 2221a of the upper rail 2221 is formed so as to have a U-shaped section, and the side wall 2220a of the lower rail 2220 is inserted therein, so that the side walls 2220a, 2221a face one another.

Into the lock holes 2220b, 2221b, nails 231a of a lock body 231 of the lock mechanism 230 are inserted (described below).

The lock holes 2220b of the side wall 2220a of the lower rail 2220 are formed at intervals in the length direction of the lower rail 2220. The number of the lock holes 2220b formed in the lower rail 2220 can cover a movable region in which the upper rail 2221 can move along the lower rail 2220.

The lock holes 2221b of the side wall 2221a of the upper rail 2221 are formed in accordance with the number of the nails 231a of the lock body 231.

Figure 22:
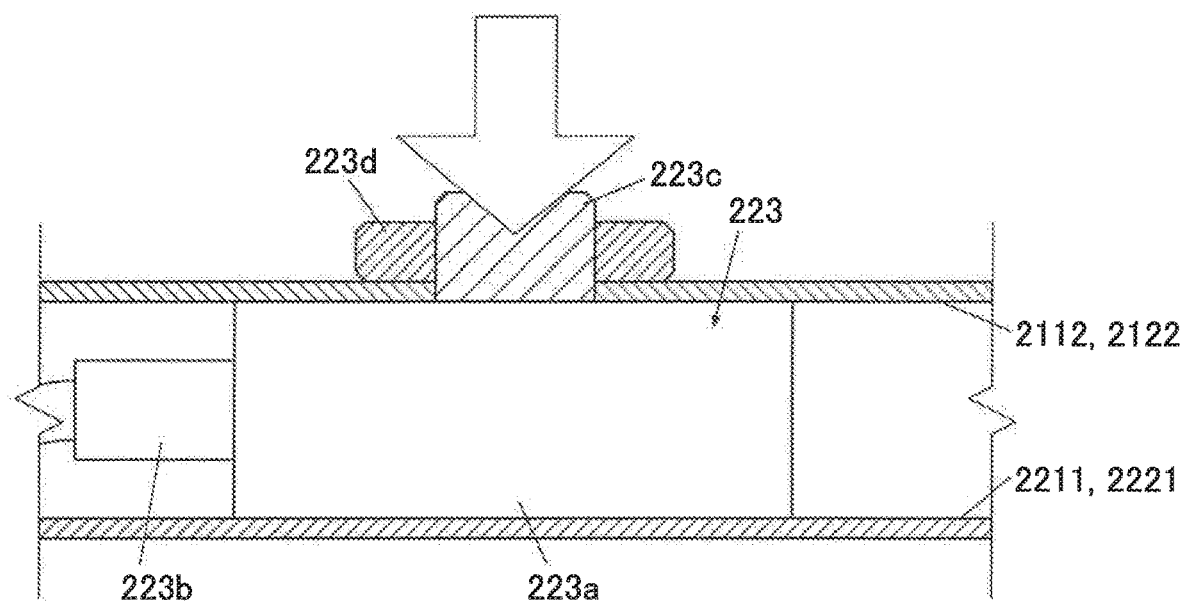
FIG. 22 is a schematic view showing the seat weight sensor(s) according to the second embodiment.

Between the cushion frame 210 and the slide rails 220, weight detectors 223 are provided. The weight detectors 223 measure the weight of each person who sits on the seat as one type of information for controlling inflation of an air bag. An arrow (different from leader lines) in FIG. 22 represents the weight of the sitting person.

The weight detectors 223 are provided at four corners of the seat. That is, in this embodiment, the weight detectors 223 are provided between the connecting leg 2112 of the first cushion side frame 211 and the upper rail 2211 of the first slide rail 221 at the front end and the rear end of the connecting leg 2112, and provided between the connecting leg 2122 of the second cushion side frame 212 and the upper rail 2221 of the second slide rail 222 at the front end and the rear end of the connecting leg 2122.

With the weight detectors 223, an ECU (Electronic Control Unit), which functions as the center in performing comprehensive electric control, calculates the total weight and the center of gravity and hence can determine whether the sitting person is an adult or a child. More specifically, in the case of an adult, the ECU can determine whether he/she is an adult of standard build or an adult of small build (difference in build), and in the case of a child, the ECU can determine whether he/she is a one-year-old child (infant seat), a three-year-old child, or a six-year-old child. On the basis of the determination result, inflation of an air bag is controlled.

The weight detectors 223 are often provided for the seat as the front passenger seat, but may be provided for the seat as the driver's seat or for the seat as any other seat provided with an air bag.

The weight detectors 223 each include a detector body 223a, a power-source-connecting connector 223b, a fixing bolt 223c, and a nut 223d.

The detector body 223a has a built-in sensor (e.g. strain gauge) that detects the weight of the sitting person.

The power-source-connecting connector 223b is a connector for transmitting power from a power source (not shown) to the detector body 223a.

The fixing bolt 223c and the nut 223d are used for fixing the detector body 223a (and built-in sensor) to the cushion frame 210. Another bolt and another nut (not shown) are used for fixing the detector body 223a to the slide rail 220.

The power-source-connecting connectors 223b face in different directions depending on where the weight detectors 223 are arranged. That is, in the case of the weight detectors 223 positioned on the front side, the power-source-connecting connectors 223b are attached to the front ends of the detector bodies 223a, whereas in the case of the weight detectors 223 positioned on the rear side, the power-source-connecting connectors 223b are attached to the sides of the detector bodies 223a closer to the center of the seat.

Connectors for communications (not shown) may be attached to the detector bodies 223a in the same manner as the power-source-connecting connectors 223b.

The lock mechanism 230 functions for both the first slide rail 221 and the second slide rail 222 to place or lift restrictions on movement of the first slide rail 221 and the second slide rail 222. More specifically, the lock mechanism 230 places or lifts restrictions on movement of the upper rails 2211, 2221 of the first and second slide rails 221, 222 along the lower rails 2210, 2220 thereof.

The lock mechanism 230 includes a pair of left and right lock bodies 231, a pair of left and right press levers 232, a connecting pipe 233, a cable 234, a cable's power unit 235, and a limit switch 236.

The lock bodies 231 are used as a left-and-right pair for the first slide rail 221 and the second slide rail 222. Each lock body 231 includes: the nails 231a, which are inserted into the lock holes 2210b, 2211b or 2220b, 2221b; a rotational shaft 231b; and a press receiving part 231c.

Figure 23:
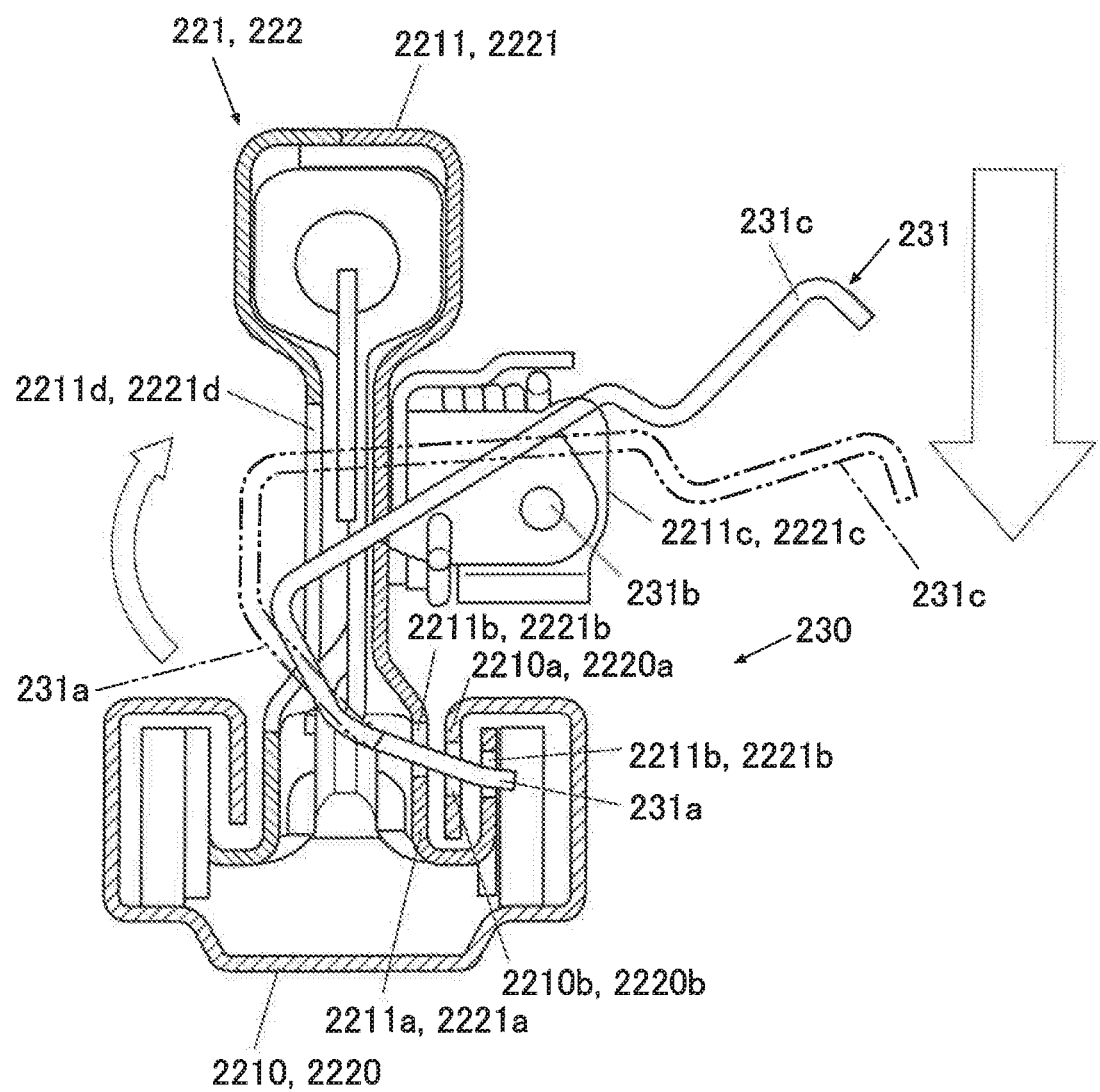
FIG. 23 is a cross sectional view to explain a lock mechanism according to the second embodiment.
Figure 24:
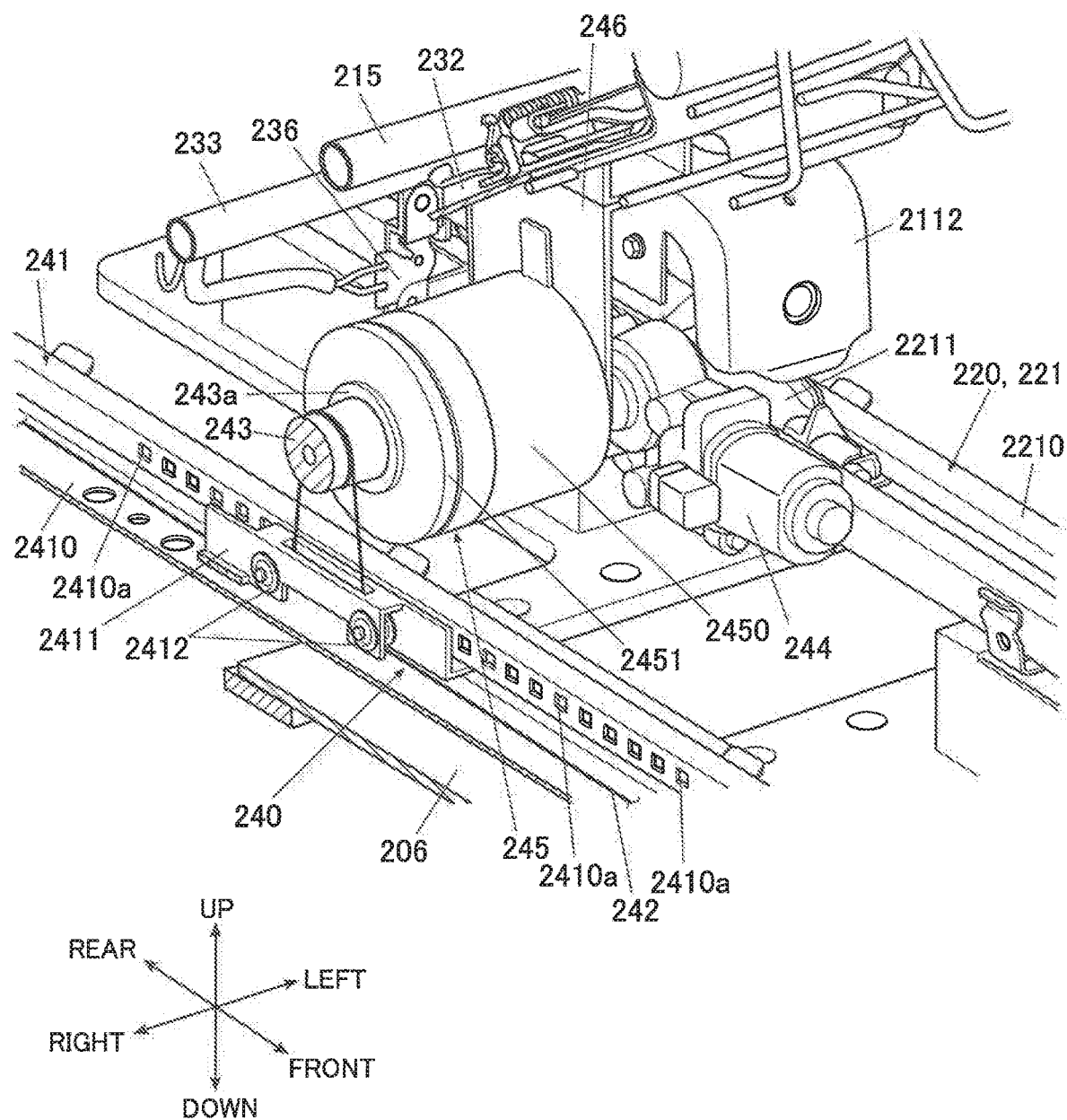
FIG. 24 is a perspective view showing a movement mechanism and its vicinity in the seat slide structure according to the second embodiment.

The nails 231a and the press receiving part 231c are positioned exactly opposite to one another with the rotational shaft 231b as the center. The lock body 231 is configured such that when the press receiving part 231c is pressed, the nails 231a rotate upward. A down arrow (different from leader lines) in FIG. 23 represents pressing force applied to the press receiving part 231c, and an arc-shaped up arrow (different from leader lines) in FIG. 23 represents rotation of the nails 231a.

The lock body 231 is further configured such that when the press of the press receiving part 131c is released, the nails 231a rotate downward.

The number of the nails 231a provided in each lock body 231 is two or more (four in this embodiment), and the nails 231a are arranged at equal intervals.

The rotational shafts 231b are provided in brackets 2211c, 2221c that project from the upper rails 2211, 2221, and arranged in parallel with the first and second slide rails 221, 222.

In the upper rails 2211, 2221, openings 2211d, 2221d are formed on rotational trajectories of the lock bodies 231.

The press levers 232 press the press receiving parts 231c of the lock bodies 231, and are used as a left-and-right pair for the lock bodies 231, which are a left-and-right pair.

The connecting pipe 233 is put over the first cushion side frame 211 and the second cushion side frame 212, and supported thereby so as to be rotatable.

The left and right press levers 232 are fixed to the connecting pipe 233, and rotate in sync with rotation of the connecting pipe 233, namely rotate as the connecting pipe 233 rotates.

The connecting pipe 233 has a projecting shaft 233a to extend the connecting pipe 233. The projecting shaft 233a projects sideward from the outer-side surface of the connecting leg 2112, and enables manual unlocking of the lock bodies 231 by being provided with, for example, an operation lever (not shown) at the tip.

The cable 234 is hitched to one of the left and right press levers 232 (right press lever 232 in this embodiment) to cause the one of the left and right press levers 232 to rotate by power transmitted from the cable's power unit 235 fixed to the cushion frame 210. That is, the cable 234 causes one press lever 232 to rotate, which causes the connecting pipe 233 to rotate on its axis and consequently causes the other press lever 232 to rotate.

The limit switch 236 is connected to the movement mechanism 240, and used for linking operation of the lock mechanism 230 with operation of the movement mechanism 240.

More specifically, the limit switch 236 is turned on when the lock mechanism 230 performs unlocking, and at this timing, for example, the ECU controls and causes a motor 244 (described below) of the movement mechanism 240 to operate, so that the upper rails 2211, 2221 slide along the lower rails 2210, 2220.

On the other hand, the limit switch 236 is turned off when the lock mechanism 230 performs locking, and at this timing, for example, the ECU controls and causes the motor 244 (described below) of the movement mechanism 240 to stop, so that the upper rails 2211, 2221 stop sliding along the lower rails 2210, 2220.

The movement mechanism 240 has a third slide rail 241 arranged between the first slide rail 221 and the second slide rail 222 in parallel with the first slide rail 221 and the second slide rail 222, a wire 242 both ends of which are fixed to the third slide rail 241, and a winch 243 around which the wire 242 is wound and that is supported by the cushion frame 210 so as to be rotatable.

The movement mechanism 240 also has: a motor 244 that rotates the winch 243; and a power blocker 245 that transmits or blocks power output from the motor 244 to the winch 243.

The third slide rail 241 stores the wire 242, and in the third slide rail 241, pulleys 2412 around which the wire 242 passes are arranged. More specifically, the third slide rail 241 has: a lower rail 2410; and a bracket 2411 that is provided so as to be slidable along the lower rail 2410 and supports the pulleys 2412.

Both ends of the wire 242 are fixed to both ends of the third slide rail 241 in the length direction.

The pulleys 2412 are provided at the front side and the rear side on the bracket 2411. More specifically, the pulleys 2412 are provided, as a pair of pulleys, at the front side and the rear side with the winch 243 as the center.

Shafts that support the pulleys 2412 in a freely rotatable manner are arranged in the right-left direction and fixed to side walls of the bracket 2411.

The third slide rail 241 is arranged so as to be offset from the middle between the first slide rail 221 and the second slide rail 222 to either the left or the right. In other words, the third slide rail 241 is arranged closer to one of the first slide rail 221 and the second slide rail 222. In this embodiment, the third slide rail 241 is arranged closer to the second slide rail 222.

Figure 25:
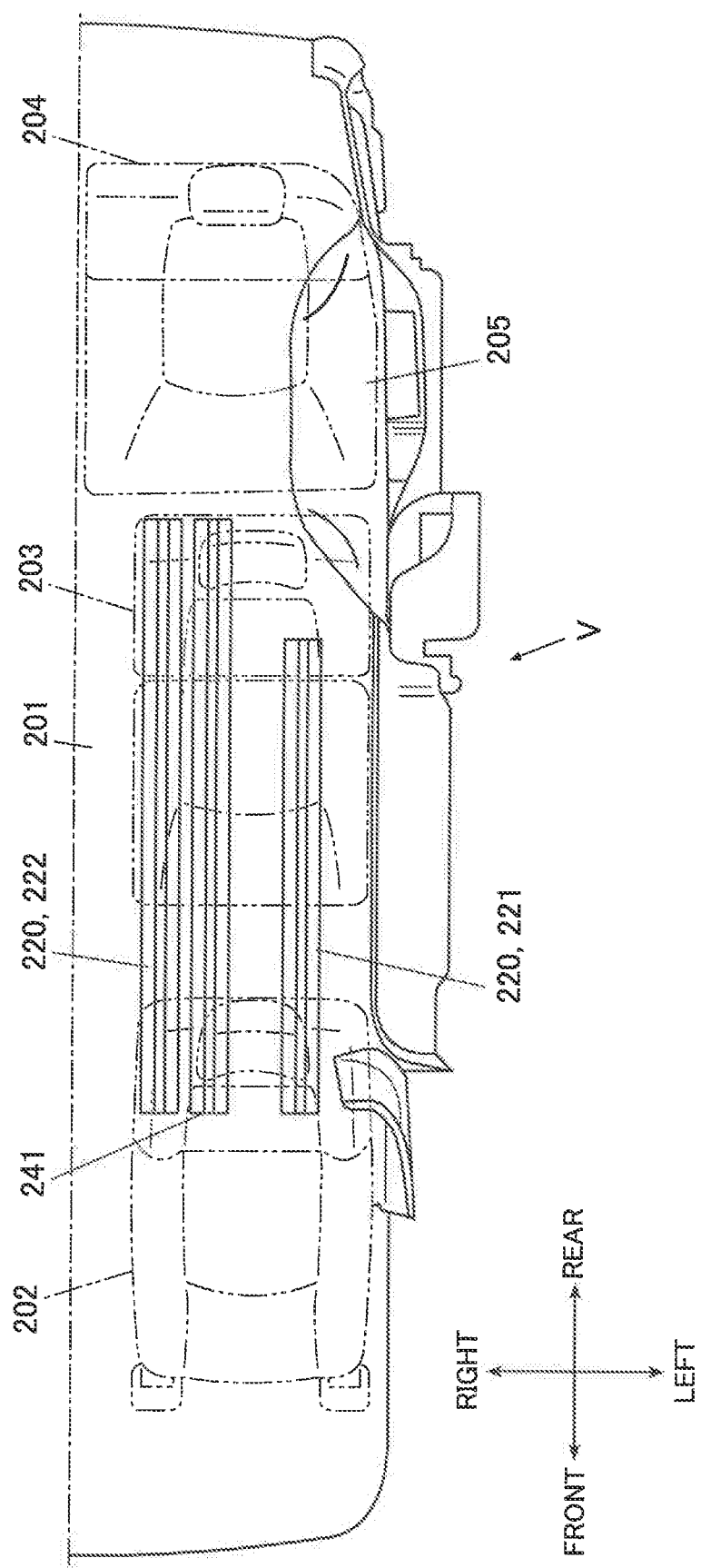
FIG. 25 is an illustration to explain a positional relationship between a wheel well and slide rails according to the second embodiment.

As shown in FIG. 25, the seat slide structure in this embodiment is applied to an automobile V. In the automobile V, three seats 202, 203, 204 are installed in the front-rear direction. The seat slide structure in this embodiment is applied to the seat 203 on the second row. In the body of the automobile V, a wheel well 205 where a wheel is placed is formed so as to be convex toward the seat 203 on the second row and the seat 204 on the third row. In order to apply the seat slide structure to such an automobile V, the third slide rail 241 is arranged closer to the second slide rail 222 that is arranged far from the wheel well 205.

In this embodiment, lengths of the second slide rail 222 arranged far from the wheel well 205 and the third slide rail 241 in the front-rear direction are set to be equal. Alternatively, for example, lengths of the second slide rail 222 arranged far from the wheel well 205, the first slide rail 221 arranged near the wheel well 205, and the third slide rail 241 in the front-rear direction may be set to be equal.

In this embodiment, the seat slide structure is applied to the seat 203 on the second row, but may be applied, for example, to the seat 202 on the first row or the seat 204 on the third row.

Seats to which the seat slide structure is applied are not limited to the seats 202, 203, 204 on the left in the direction of travel, and may be seats (not shown) on the right in the direction of travel.

The third slide rail 241 is arranged lower than the first slide rail 221 and the second slide rail 222. In the drawing(s), the third slide rail 241 is not in contact with the rail support stand 206, but in practice, is supported by pillars as with the first slide rail 221 and the second slide rail 222.

The rail support stand 206 may be provided on a floor 201 of the automobile V, or the floor 201 itself may be formed so as to have level differences in the same manner as the rail support stand 206.

In the lower rail 2410 of the third slide rail 241, holes 2410a for weight reduction are formed at intervals in the length direction of the third slide rail 241. Unlike the first slide rail 221 and the second slide rail 222, the third slide rail 241 does not receive the weight of the seat or the weight of the sitting person, and hence does not need to have high strength more than necessary. As far as necessary strength can be ensured, the number and the size of the holes 2410a formed in the third slide rail 241 are not particularly limited.

The winch 243 is supported by the cushion frame 210 so as to be rotatable by being connected to a rotational shaft of the power blocker 245. That is, the winch 243 is supported by the cushion from 210 indirectly through the power blocker 245.

The winch 243 is formed such that its diameter gradually increases from the center to both ends in the shaft direction so that the wound wire 242 does not come off easily. The winch 243 has, at both ends in the shaft direction, flanges 243a having a diameter larger than the winch 243, so that the wire 242 hardly comes off.

The motor 244 is for rotating the winch 243 through the power blocker 245, and transmits, to the power blocker 245, power for rotating the winch 243.

The motor 244 is arranged between the winch 243 and one of the cushion side frames 211, 212 provided on the left and the right. More specifically, the motor 244 is arranged between (i) the power blocker 245 and the winch 243 and (ii) one of the left and right cushion side frames 211, 212.

The power blocker 245 is an electromagnetic clutch, and has a clutch rotor 2450 to which power is transmitted from the motor 244, an armature unit 2451 connected to a main shaft 2451a, and an electromagnetic coil (not shown) that is provided inside and electromagnetically attaches/detaches the clutch rotor 2450 and the armature unit 2451 to/from one another.

The winch 243 is connected to the main shaft 2451a, and rotates by power transmitted from the motor 244 to the power blocker 245.

The power blocker 245 is attached to a hanging bracket 246 that is fixed to the connecting member 215, which is put over the first cushion side frame 211 and the second cushion side frame 212.

To the hanging bracket 246, the motor 244 is also attached. Hence, of the movement mechanism 240, the bracket 2411 and the pulleys 2412 of the third slide rail 241, the winch 243, the motor 244, and the power blocker 245 slide together with the cushion frame 210.

A positional relationship of the components of the movement mechanism 240 will be described. The winch 243 and the pulleys 2412 are arranged in front of the lock bodies 231 of the lock mechanism 230. Further, the pulleys 2412 are arranged in front of the connecting member 215.

The third slide rail 241 is arranged so as to overlap each of the power blocker 245 and the winch 243 in the up-down direction. As described above, because the third slide rail 241 is arranged closer to one of the first slide rail 221 and the second slide rail 222 (closer to the second slide rail 222 in this embodiment), the power blocker 245 is arranged closer to the other of the first slide rail 221 and the second slide rail 222 (closer to the first slide rail 221 in this embodiment).

The power blocker 245 is arranged in front of the power-source-connecting connectors 223b of the rear-side weight detectors 223 arranged behind the power-source-connecting connectors 223b of the front-side weight detectors 223, and is arranged behind the power-source-connecting connectors 223b of the front-side weight detectors 223 arranged in front of the power-source-connecting connectors 223b of the rear-side weight detectors 223.

Although not shown, on or near the seat, a switch(es) for making an input to slide the seat forward or rearward is provided. Operating the switch causes the lock mechanism 230 and the movement mechanism 240 to operate to slide the seat forward or rearward.

Operation of the seat slide structure thus configured will be described. Each control necessary for sliding the seat is performed by the ECU described above.

First, an occupant chooses whether to slide the seat forward or rearward by operating the switch. When receiving an input from the switch, the ECU controls the cable's power unit 235 of the lock mechanism 230 to pull the cable 234. This causes the press lever 232 to which the cable 234 is hitched to rotate. As this takes place, the connecting pipe 233 rotates on its axis, and the other press lever 232 rotates in sync therewith.

Successively, the left and right press levers 232 press the press receiving parts 231c of the left and right lock bodies 231, so that the left and right lock bodies 231 rotate on their rotational shafts 231b. This pulls out the nails 231a of the lock bodies 231 from the lock holes 2210b, 2211b, 2220b, 2221b of the first and second slide rails 221, 222, thereby performing unlocking.

Pulling out the nails 231a of the lock bodies 231 from the lock holes 2210b, 2211b, 2220b, 2221b turns on the limit switch 236. When the limit switch 236 is turned on, the ECU causes the motor 244 to operate and consequently causes the power blocker 245 to operate to rotate the winch 243.

When the winch 243 starts rotating, the wire 242, which is wound around the winch 243, is expected to be wound up, but because the wire 242 passes through the bracket 2411 via the pulleys 2412, and both ends of the wire 242 are fixed to both ends of the third slide rail 241 in the length direction, the bracket 2411 slides along the lower rail 2410 of the third slide rail 241. As this takes place, in the first and second slide rails 221, 222, the upper rails 2211, 2221 slide along the lower rails 2210, 2220.

Thus, the seat can be made to slide forward or rearward.

When the seat slides to a position desired by the occupant, the occupant stops operating the switch. When operation on the switch stops, the cable's power unit 235 stops, and consequently the cable 234 goes back to its initial position, and also the left and right press levers 232 rotate to go back to their initial positions.

As these take place, the lock bodies 231 also rotate to go back to their initial positions. However, the nails 231a of the lock bodies 231 may not be inserted into the lock holes 2210b, 2220b of the lower rails 2210, 2220 because the seat sliding is stopped at the occupant's desired position. In such a case, the ECU that detects that the limit switch 236 is still on although operation on the abovementioned switch is stopped causes the motor 244 to operate to slightly slide the seat forward or rearward. This inserts the nails 231a of the lock bodies 231 into their nearby lock holes 2210b, 2220b of the lower rails 2210, 2220, thereby performing locking.

Inserting the nails 231a of the lock bodies 231 into their nearby lock holes 2210b, 2220b of the lower rails 2210, 2220 turns off the limit switch 236. Then, the ECU stops the motor 244 and consequently stops the power blocker 245 to stop the winch 243 from rotating.

Thus, the seat can be stopped at a position desired by the occupant.

The wire 242 repeats the above actions, and hence may sag with age. To deal with this, the seat slide structure may employ, as needed, a structure that prevents occurrence of such sagging.

Figure 26:
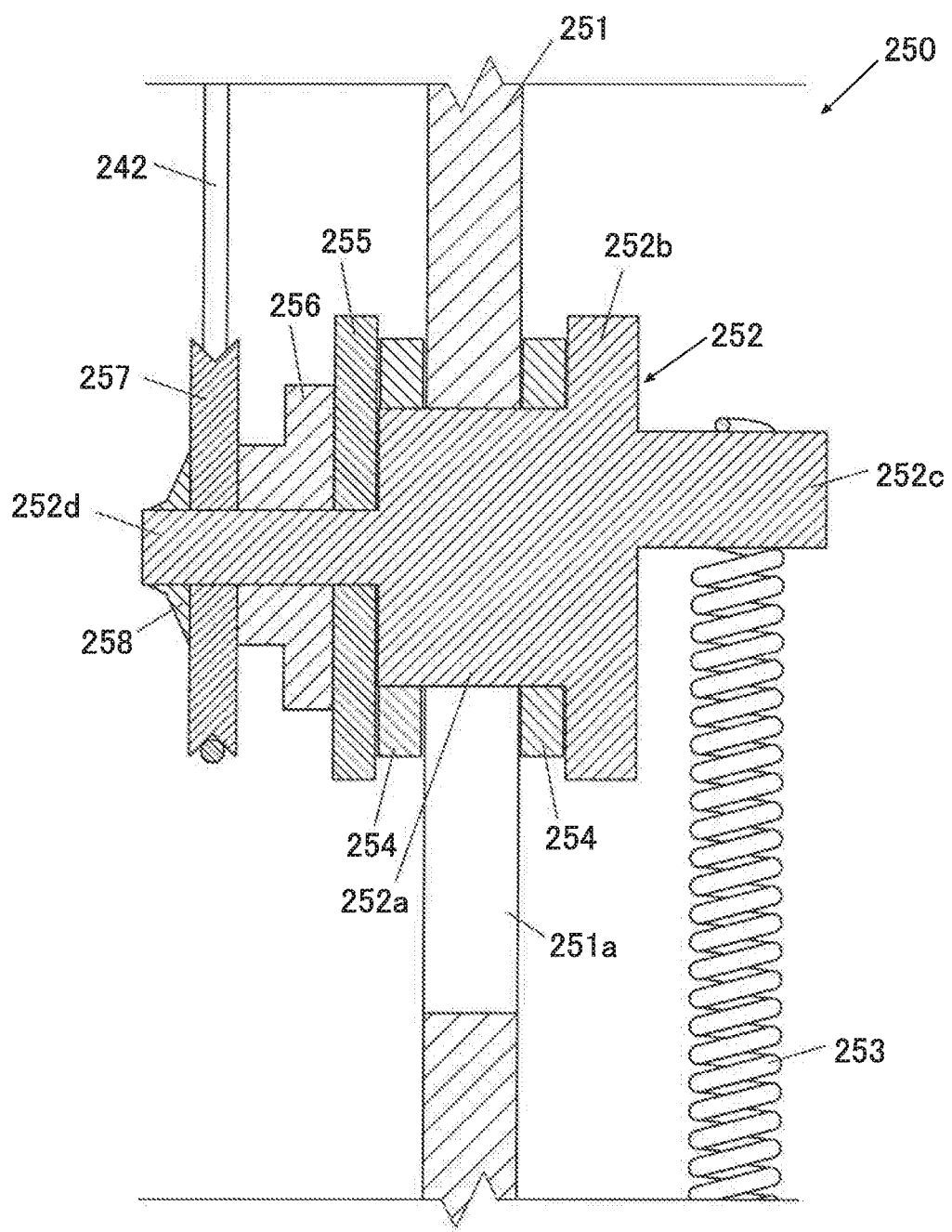
FIG. 26 is an illustration to explain an example of a wire sagging prevention structure according to the second embodiment.

A sagging prevention structure 250 shown in FIG. 26 is configured to prevent the sagging with a biasing member 253 pulling a step pin 252. The step pin 252 holds a pulley 257 in the freely rotatable manner. Around the pulley 257, the wire 242 passes. The sagging prevention structure 250 has a bracket 251, the step pin 252, the biasing member 253, washers 254, 255, a fastening member 256, the pulley 257, and a catch 258.

The bracket 251 is integrated with a part of the bracket 2411 of the third slide rail 241, but may be integrated with the bracket 2411 of the third slide rail 241. Alternatively, the bracket 2411 of the third slide rail 241 may be processed properly to function as the bracket 251 of the sagging prevention structure 250.

In the bracket 251, a slit 251a is formed, and the step pin 252 passes through the slit 251a.

The step pin 252 has a body shaft 252a that passes through the slit 251a and is slidable along the slit 251a, a flange 252b integrated with one end of the body shaft 252a in the shaft direction, a hitching part 252c that projects from the one end of the body shaft 252a in the shaft direction (i.e. from the flange 252b) and to which the biasing member 253 is hitched, and a rotational shaft 252d that projects from the other end of the body shaft 252a in the shaft direction and around which the pulley 257 is provided so as to freely rotate.

The biasing member 253 is a tension spring, and one end thereof is hitched to the hitching part 252c of the step pin 252, and the other end thereof is hitched to a position (not shown) of the bracket 2411 of the third slide rail 241.

The number of the washers 254 provided is two. The washers 254 are arranged such that the bracket 251 is interposed therebetween. The body shaft 252a of the step pin 252 passes through holes formed in the centers of the washers 254.

The washer 255 is provided on, of the step pin 252, the side where the rotational shaft 252d is provided. The rotational shaft 252d passes through a hole formed in the center of the washer 255.

The fastening member 256 is provided around the rotational shaft 252d of the step pin 252 on the outer side of the washer 255, and prevents the step pin 252 from coming off the slit 251a.

The pulley 257 is provided around the rotational shaft 252d of the step pin 252 on the outer side of the fastening member 256 so as to freely rotate. The wire 242 passes around the pulley 257, and pulls the step pin 252 in a direction opposite to a direction in which the biasing member 253 pulls the step pin 252.

The catch 258 that prevents the pulley 257 from coming off the rotational shaft 252d is provided on the outer side of the pulley 257.

According to the sagging prevention structure 250 thus configured, because the pulling direction of the wire 242 is the exact opposite to the pulling direction of the biasing member 253, when the wire 242 sags, the step pin 252 moves along the slit 251a by the pulling force of the biasing member 253. This brings the sagging wire 242 back to a stretched state, and hence can contribute to continuation of normal seat sliding performed by the seat slide structure.

Figure 27:
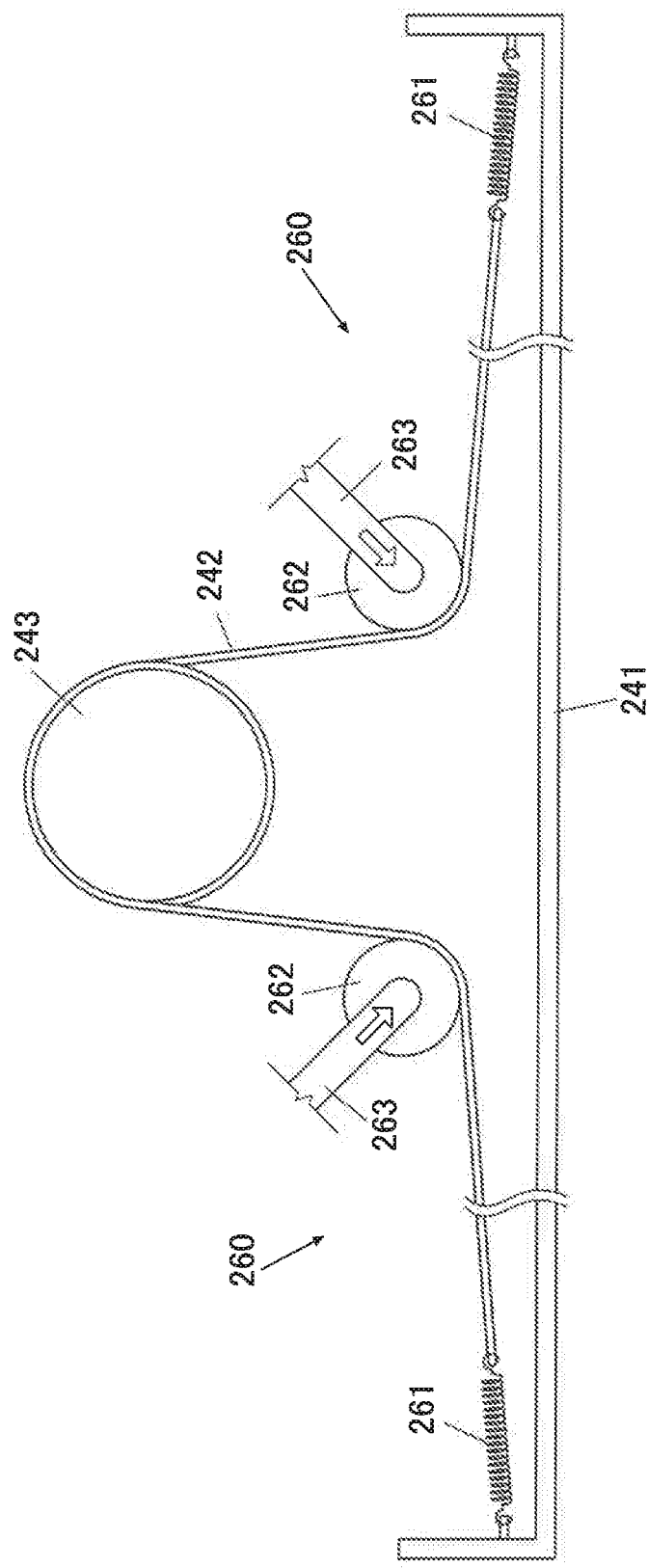
FIG. 27 is an illustration to explain another example of the wire sagging prevention structure according to the second embodiment.
Figure 28:
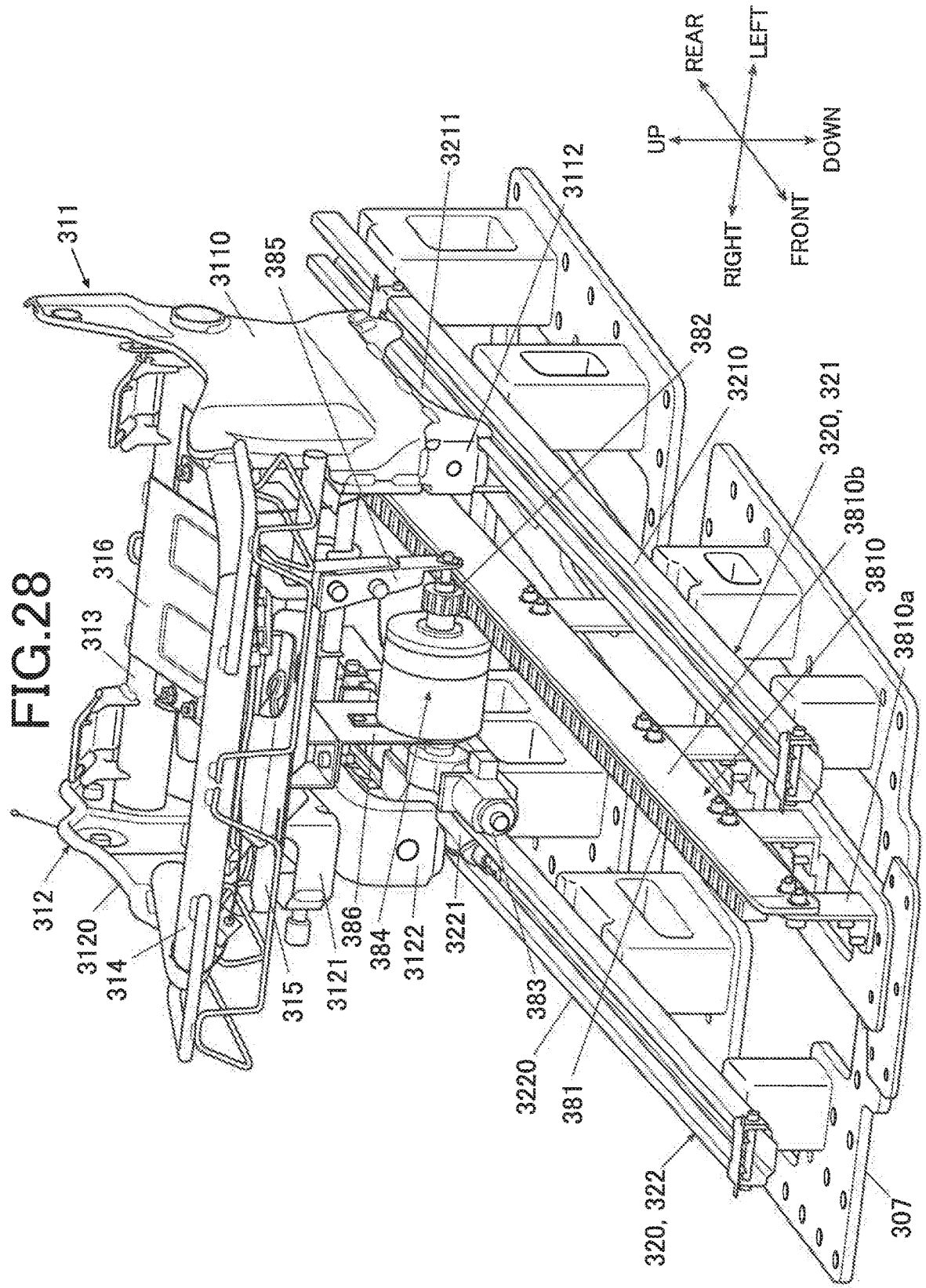
FIG. 28 is a perspective view showing a seat slide structure according to a third embodiment.
Figure 31:
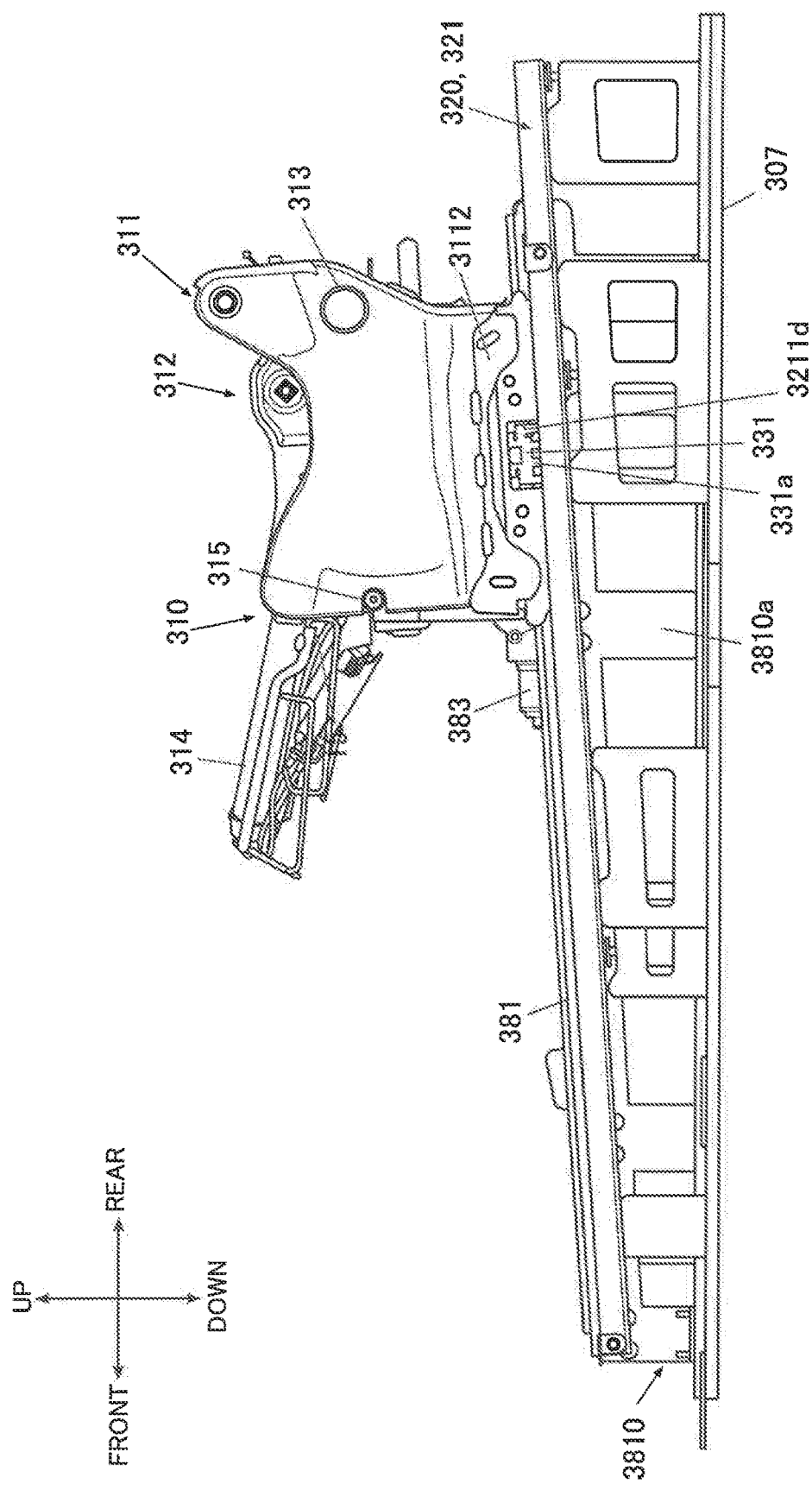
FIG. 31 is a left side view showing the seat slide structure according to the third embodiment.
Figure 32:
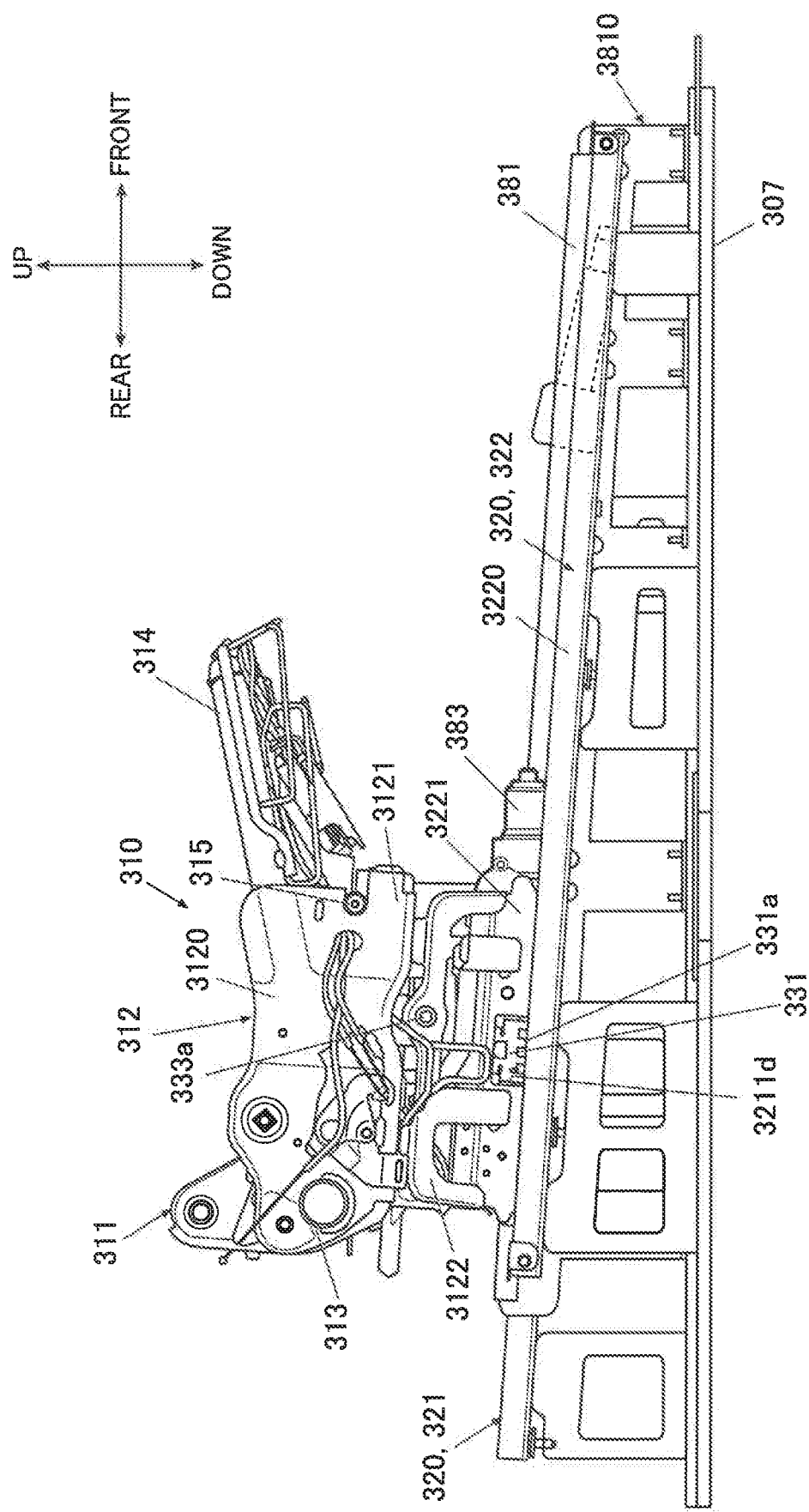
FIG. 32 is a right side view showing the seat slide structure according to the third embodiment.
Figure 33:
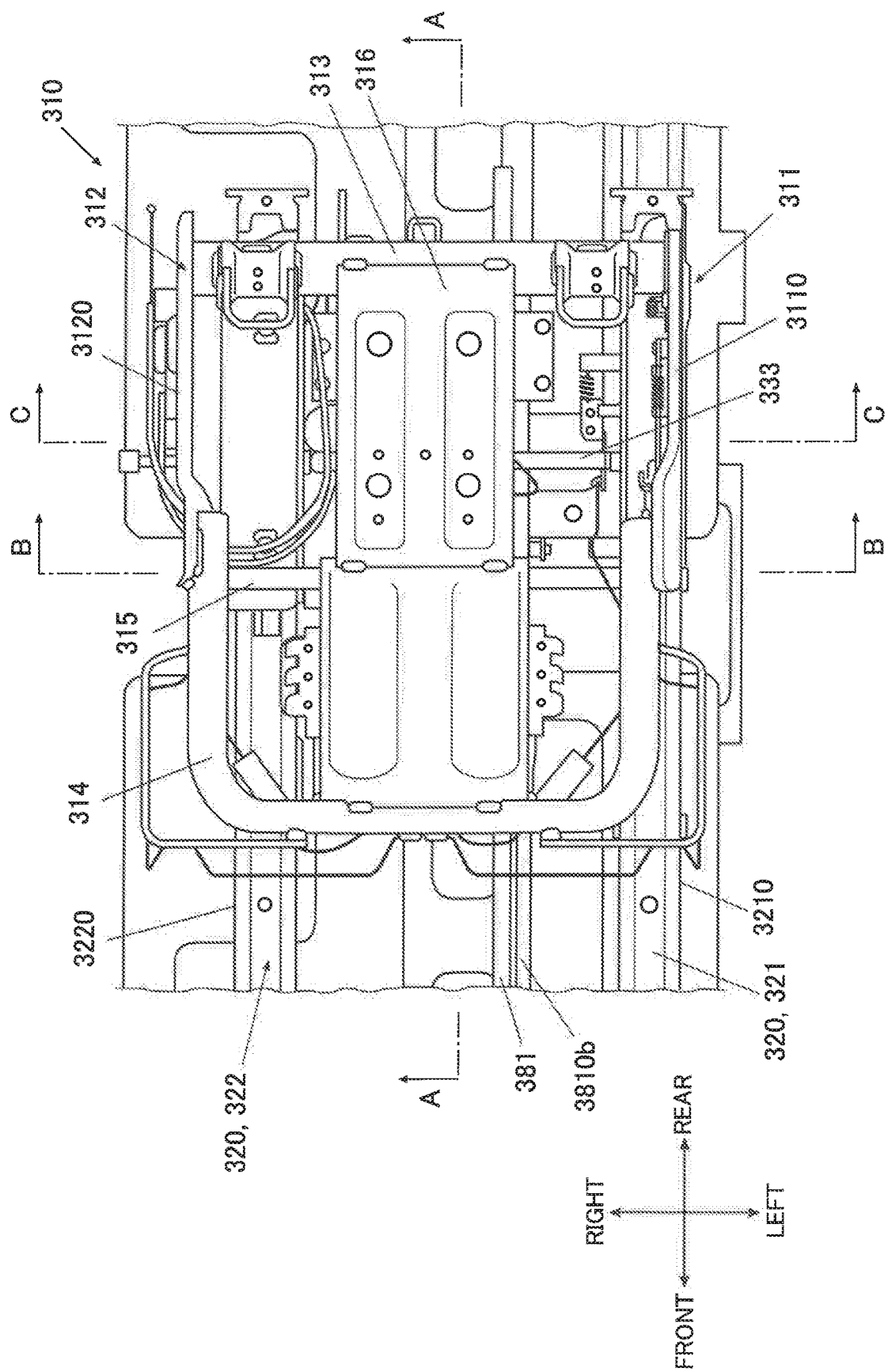
FIG. 33 is a plan view showing the seat slide structure according to the third embodiment.

A sagging prevention structure 260 shown in FIG. 27 has biasing members 261 provided at both ends of the wire 242, a pair of pulleys 262, and attachment members 263 to which biasing force to bias the pulleys 262 downward is applied.

The biasing members 261 are tension springs. One ends (outer-side ends) of the biasing members 261 are attached to the ends of the lower rail 2410 of the third slide rail 241, and the other ends (inner-side ends) thereof are hitched to the ends of the wire 242. Hence, the wire 242 is pulled by the biasing members 261 in its normal state.

Rotational shafts of the pulleys 262 are attached to the attachment members 263, and the attachment members 263 are attached to parts of the bracket 2411, which is not shown in FIG. 27.

The attachment members 263 are biased by biasing members (not shown) in a direction to press the pulleys 262 against the wire 242.

According to the sagging prevention structure 260 thus configured, because the wire 242 is in the state of being pulled by the biasing members 261, and the pulleys 262 are in the state of being pressed against the wire 242, when the wire 242 sags, the wire 242 is pulled by the biasing members 261, and the pulleys 262 are pressed against the wire 242. This brings the sagging wire 242 back to the stretched state, and hence can contribute to continuation of normal seat sliding performed by the seat slide structure.

According to this embodiment, the movement mechanism 240 includes: the third slide rail 241 that is arranged between the first slide rail 221 and the second slide rail 222 in parallel with the first slide rail 221 and the second slide rail 222; the wire 242 both ends of which are fixed to the third slide rail 241; and the winch 243 around which the wire 242 is wound and that is supported by the cushion frame 210 so as to be rotatable. Thus, the movement mechanism 240 that slides the cushion frame 210 along the length direction of the first slide rail 221 and the second slide rail 221 can be stored between the first slide rail 221 and the second slide rail 222. This can restrain increase in seat size in the right-left direction.

Further, the pulley(s) 2412 around which the wire 242 passes is arranged in the third slide rail 241. This eliminates a need to ensure a space for the pulleys 2412 to be arranged, and hence can contribute to restraining increase in seat size.

Further, the winch 243 and the pulley(s) 2412 are arranged in front of the lock bodies 231 of the movement mechanism 230. Thus, (i) the winch 243 and the pulleys 2412 and (ii) the lock bodies 231 are not overlapped. This makes it more likely that the lock bodies 231 operate normally, and also can restrain increase in seat size.

Further, the third slide rail 241 is arranged so as to be offset from the middle between the first slide rail 221 and the second slide rail 222 to either the left or the right. This can ensure a large space on the left or the right of the third slide rail 241, so that the movement mechanism 240 can be easily arranged near the third slide rail 241.

Further, the motor 244 that rotates the winch 243 is arranged between the winch 243 and one of the left cushion side frame 211 and the right cushion side frame 212. Thus, the motor 244 can be arranged so as not to protrude from the cushion frame 210 outward, and also can be arranged in a limited space between the winch 243 and one of the left cushion side frame 211 and the right cushion side frame 212. This can contribute to restraining increase in seat size.

Further, the motor 244 is arranged between (i) the power blocker 245 and the winch 243 and (ii) the one of the left cushion side frame 211 and the right cushion side frame 212. Thus, the motor 244 can be arranged in a limited space between (i) the power blocker 245 and the winch 243 and (ii) the one of the left cushion side frame 211 and the right cushion side frame 212. This can contribute to restraining increase in seat size.

Further, the third slide rail 241 includes: the lower rail 2410; and the bracket 2411 that is provided so as to be slidable along the lower rail 2410 and supports the pulley(s) 2412. Hence, the bracket 2411 moves as the cushion frame 210 moves. Accordingly, no matter where on the first slide rail 221 and the second slide rail 222 the cushion frame 210 is present, the positional relationship between the cushion frame 210 and the pulleys 2412 does not change, so that the cushion frame 210 is more likely to operate normally.

Further, in the third slide rail 241, the holes 2410a for weight reduction are formed at intervals in the length direction of the third slide rail 241. This can make the whole seat or a vehicle provided with the seat lighter.

Further, the third slide rail 241 is arranged closer to, between the first slide rail 221 and the second slide rail 222, the second slide rail 222 arranged far from the wheel well 205 that is convex toward the seat cushion. Thus, the third slide rail 241 can be arranged far from the wheel well 205. This can ensure a large space at the side of the third slide rail 241 closer to the wheel well 205, so that the movement mechanism 240 can be easily arranged near the third slide rail 241.

Further, the length of, between the first slide rail 221 and the second slide rail 222, the second slide rail 222 arranged far from the wheel well 205 and the length of the third slide rail 241 are set to be equal in the front-rear direction. Hence, it is more likely that actions of the movement mechanism 240 in the third slide rail 241 and sliding actions in the second slide rail 222 arranged far from the wheel well 205 synchronize with one another, so that the seat slides more smoothly. Further, the same components can be used for the rails. This can reduce cost.

Further, the length of, between the first slide rail 221 and the second slide rail 222, the second slide rail 222 arranged far from the wheel well 205, the length of, between the first slide rail 221 and the second slide rail 222, the first slide rail 221 arranged near the wheel well 205, and the length of the third slide rail 241 are set to be equal in the front-rear direction. Hence, it is more likely that actions of the movement mechanism 240 in the third slide rail 241 and sliding actions in the first slide rail 221 and the second slide rail 222 synchronize with one another, so that the seat slides more smoothly. Further, the same components can be used for the rails. This can reduce cost.

Further, the pulley(s) 2412 is arranged in front of the connecting member 215 that is put over the front ends of the left cushion side frame 211 and the right cushion side frame 212, thereby connecting the left cushion side frame 211 and the right cushion side frame 212 to one another. Thus, the pulleys 2412 and the connecting member 215 are not overlapped.

Hence, the connecting member 215 hardly gets in the way of making the wire 242 pass around the pulleys 2412.

Further, the third slide rail 241 is arranged lower than the first slide rail 221 and the second slide rail 222. This can ensure a large space above the third slide rail 241, so that the movement mechanism 240 can be easily arranged near the third slide rail 241.

Further, the third slide rail 241 is arranged so as to overlap each of the power blocker 245 and the winch 243 in the up-down direction. This makes the distance between the third slide rail 241 and each of the power blocker 245 and the winch 243 short, and can restrain increase in seat size in the right-left direction.

Further, the third slide rail 241 is arranged closer to one of the first slide rail 221 and the second slide rail 222, and the power blocker 245 is arranged closer to the other of the first slide rail 221 and the second slide rail 222. Thus, the power blocker 245 can be easily arranged in a space ensured at the side opposite to the side where the third slide rail 241 is arranged.

Third Embodiment

Both the seat lock mechanism and the seat movement mechanism in the conventional vehicle seat mentioned above are simpler in structure than earlier ones.

In such a conventional vehicle seat, as part of the movement mechanism that slides a seat, an electromagnetic clutch is used. However, the shaft of this electromagnetic clutch is arranged on a side of the seat, which is wider than a space between slide rails. This increases seat size in the width direction. Further, if the lock mechanism or the movement mechanism is provided on a side of the seat, the lock mechanism or the movement mechanism needs not to protrude much from the seat cushion sideward. This raises a problem that a space(s) for the lock mechanism or the movement mechanism to be provided is limited.

Then, it is required to restrain increase in seat size in the width direction while ensuring a sufficient space for a seat slide structure.

According to this embodiment, the following is provided.

1. A seat slide structure including:

a cushion frame that forms a framework of a seat cushion that supports a femoral region and buttocks of a person;

a first slide rail and a second slide rail that are connected to left and right of a lower end of the cushion frame, respectively; and a movement mechanism that slides the cushion frame along a length direction of the first slide rail and the second slide rail, and includes:

a rack that is arranged in parallel with the first slide rail and the second slide rail;

a pinion gear that engages with the rack; and a power blocker that is at least partly arranged between the first slide rail and the second slide rail, transmits or blocks power from a power source to the pinion gear, and includes:

a shaft through which the power is transmitted from the power source to the pinion gear and that is provided in a right-left direction.

2. The seat slide structure according to the item 1, wherein the power blocker is an electromagnetic clutch.

3. The seat slide structure according to the item 1, wherein the power blocker is arranged in front of a hip-point for an occupant in the cushion frame.

4. The seat slide structure according to the item 1, wherein the cushion frame includes:

a left cushion side frame and a right cushion side frame that are arranged so as to leave a space in between; and a connecting member that is put over front ends of the left cushion side frame and the right cushion side frame, thereby connecting the left cushion side frame and the right cushion side frame to one another, and the power blocker is supported by the connecting member.

A seat slide structure according to this embodiment slides a vehicle seat installed in an automobile as a passenger car, or installed, for example, in another type of automobiles, such as a bus or a truck, or in a vehicle other than automobiles, such as a train, a vessel, or an airplane.

The vehicle seat (hereinafter "seat") at least includes: a seat cushion that supports the femoral region and the buttocks of a person; and a seat back the lower end of which is supported by the seat cushion and that serves as a backrest. The seat optionally includes a head rest that supports the head of a person, arm rests that support the arms of a person, and an ottoman that supports the legs of a person.

As shown in FIG. 28 to FIG. 42, the seat slide structure includes a cushion frame 310 that forms the framework of the seat cushion, slide rails 320 that are connected to the lower end of the cushion frame 310, a lock mechanism 330 that places or lifts restrictions on movement of the slide rails 320, and a movement mechanism 380 that slides the cushion frame 310 along the length direction of the slide rails 320.

The cushion frame 310 includes a first cushion side frame 311, a second cushion side frame 312, a back pipe frame 313, a front pipe frame 314, a connecting member 315, and a pressure receiving member 316.

The second cushion side frame 312 is arranged so as to leave a space from the first cushion side frame 311 in the right-left direction, and has: a sheet-shaped side plate 3120; a support leg 3121 that is integrated with the lower end of the side plate 3120 and supports the side plate 3120; and a connecting leg 3122 that is provided at the lower end of the support leg 3121 and connected to one of the slide rails 320.

Although not shown, to the first cushion side frame 311, a seat back frame constituting the seat back is connected through a reclining mechanism.

The first cushion side frame 311 is arranged so as to leave a space from the second cushion side frame 312 in the right-left direction, and has: a sheet-shaped side plate 3110; and a connecting leg 3112 that is integrated with the lower end of the side plate 3110 and connected to the other of the slide rails 320.

Although not shown, to the second cushion side frame 312, the seat back frame constituting the seat back is connected through the reclining mechanism.

The back pipe frame 313 is a straight pipe frame, and connects the rear end of the first cushion side frame 311 and the rear end of the second cushion side frame 312 to one another.

The front pipe frame 314 is a U-shaped pipe frame, and connects the front end of the first cushion side frame 311 and the front end of the second cushion side frame 312 to one another.

The connecting member 315 is a straight pipe frame, and is put over the front end of the side plate 3110 of the first cushion side frame 311 and the front end of the side plate 3120 of the second cushion side frame 312, thereby connecting the first cushion side frame 311 and the second cushion side frame 312 to one another.

The connecting member 315 is positioned lower than the front pipe frame 314, and inserted into notch parts formed at the front ends of the side plate 3110 of the first cushion side frame 311 and the side plate 3120 of the second cushion side frame 312, and fixed thereto.

The pressure receiving member 316 receives the weight of a person who sits on the seat, and, in this embodiment, is sheet/plate-shaped. The rear end and the front end of the pressure receiving member 316 are fixed to the back pipe frame 313 and the front pipe frame 314, respectively.

Figure 34:
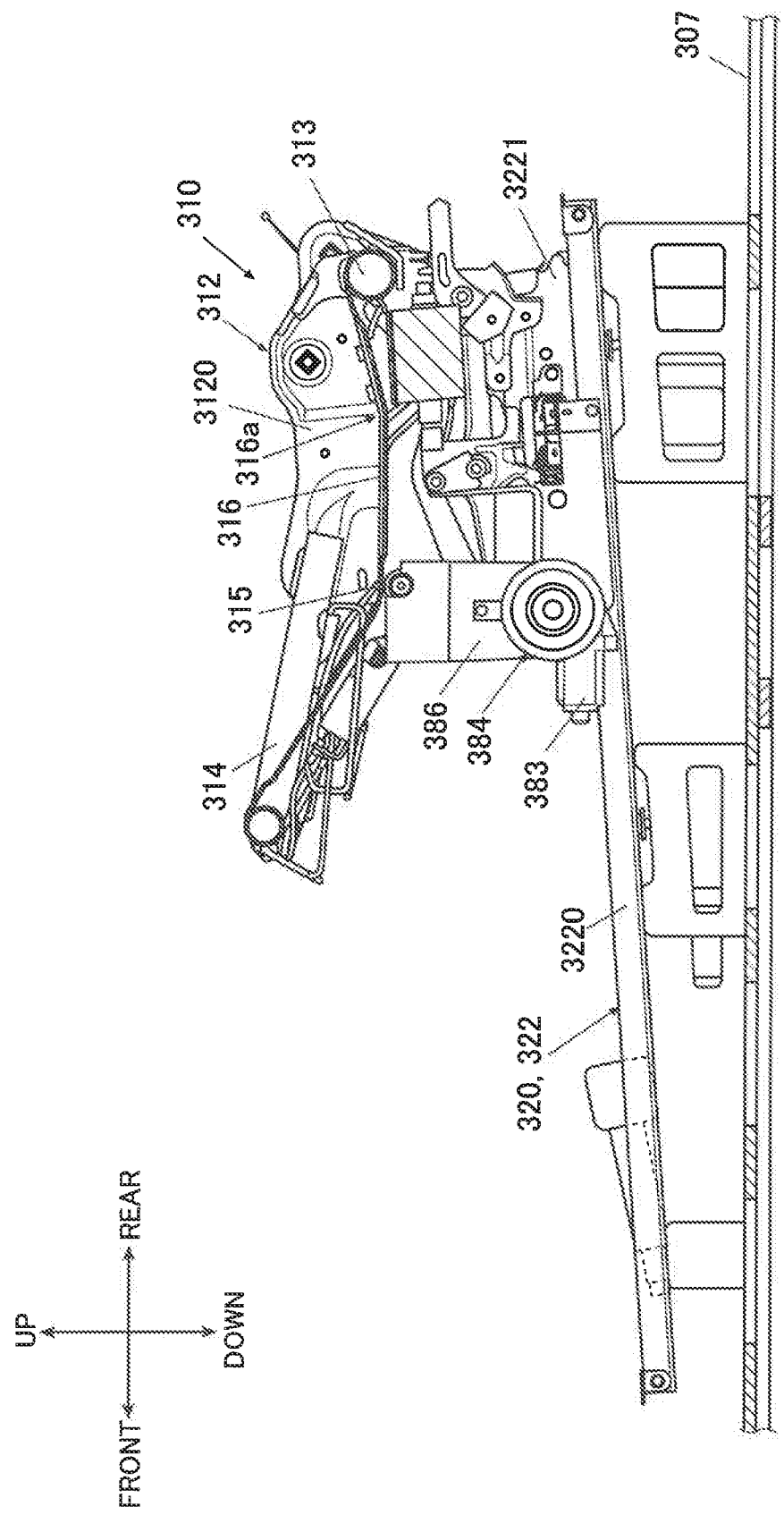
FIG. 34 is a cross sectional view taken along line A-A in FIG. 33.

The pressure receiving member 316 is formed by being bent so as to be convex downward to fit the shapes of the femoral region and the buttocks of a person, and a part of the pressure receiving member 316, the part receiving the buttocks of a person, is a hip-point 316a (shown in FIG. 34).

The hip-point 316a is positioned, in the pressure receiving member 316, closest to the upper end of the slide rails 320.

The slide rails 320 are a first slide rail 321 and a second slide rail 322 that are arranged so as to leave a space in between in the right-left direction.

The first slide rail 321 is connected to the lower end of the first cushion side frame 311, and the second slide rail 322 is connected to the lower end of the second cushion side frame 312.

In this embodiment, the first slide rail 321 and the second slide rail 322 are provided by being put over pillars of a rail support stand 307. The rail support stand 307 is a decline support stand the height/level of which gradually decreases to the front end.

The first slide rail 321 includes: a lower rail 3210; and an upper rail 3211 that is provided so as to be slidable along the lower rail 3210 and is connected to the cushion frame 310.

The lower rail 3210 has a side wall 3210a where lock holes 3210b are formed, on the side of the lower rail 3210 closer to the center of the seat, and the upper rail 3211 has a side wall 3211a where lock holes 3211b are formed, on the side of the upper rail 3211 closer to the center of the seat. The side wall 3211a of the upper rail 3211 is formed so as to have a U-shaped section, and the side wall 3210a of the lower rail 3210 is inserted therein, so that the side walls 3210a, 3211a face one another.

Into the lock holes 3210b, 3211b, nails 331a of a lock body 331 of the lock mechanism 330 are inserted (described below).

The lock holes 3210b of the side wall 3210a of the lower rail 3210 are formed at intervals in the length direction of the lower rail 3210. The number of the lock holes 3210b formed in the lower rail 3210 can cover a movable region in which the upper rail 3211 can move along the lower rail 3210.

The lock holes 3211b of the side wall 3211a of the upper rail 3211 are formed in accordance with the number of the nails 331a of the lock body 331.

The second slide rail 322 includes: a lower rail 3220; and an upper rail 3221 that is provided so as to be slidable along the lower rail 3220 and is connected to the cushion frame 310.

The lower rail 3220 has a side wall 3220a where lock holes 3220b are formed, on the side of the lower rail 3220 closer to the center of the seat, and the upper rail 3221 has a side wall 3221a where lock holes 3221b are formed, on the side of the upper rail 3221 closer to the center of the seat. The side wall 3221a of the upper rail 3221 is formed so as to have a U-shaped section, and the side wall 3220a of the lower rail 3220 is inserted therein, so that the side walls 3220a, 3221a face one another.

Into the lock holes 3220b, 3221b, nails 331a of a lock body 331 of the lock mechanism 330 are inserted (described below).

The lock holes 3220b of the side wall 3220a of the lower rail 3220 are formed at intervals in the length direction of the lower rail 3220. The number of the lock holes 3220b formed in the lower rail 3220 can cover a movable region in which the upper rail 3221 can move along the lower rail 3220.

The lock holes 3221b of the side wall 3221a of the upper rail 3221 are formed in accordance with the number of the nails 331a of the lock body 331.

Figure 39:
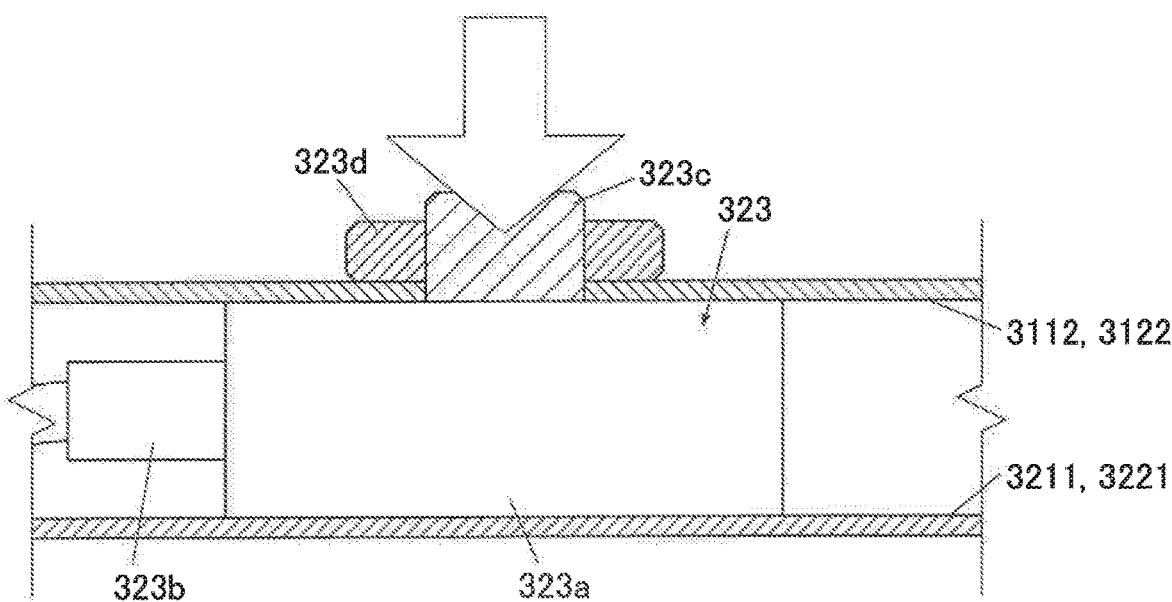
FIG. 39 is a schematic view showing the seat weight sensor(s) according to the third embodiment.

Between the cushion frame 310 and the slide rails 320, weight detectors 323 are provided. The weight detectors 323 measure the weight of each person who sits on the seat as one type of information for controlling inflation of an air bag. An arrow (different from leader lines) in FIG. 39 represents the weight of the sitting person.

The weight detectors 323 are provided at four corners of the seat. That is, in this embodiment, the weight detectors 323 are provided between the connecting leg 3112 of the first cushion side frame 311 and the upper rail 3211 of the first slide rail 321 at the front end and the rear end of the connecting leg 3112, and provided between the connecting leg 3122 of the second cushion side frame 312 and the upper rail 3221 of the second slide rail 322 at the front end and the rear end of the connecting leg 3122.

With the weight detectors 323, an ECU (Electronic Control Unit), which functions as the center in performing comprehensive electric control, calculates the total weight and the center of gravity and hence can determine whether the sitting person is an adult or a child. More specifically, in the case of an adult, the ECU can determine whether he/she is an adult of standard build or an adult of small build (difference in build), and in the case of a child, the ECU can determine whether he/she is a one-year-old child (infant seat), a three-year-old child, or a six-year-old child. On the basis of the determination result, inflation of an air bag is controlled.

The weight detectors 323 are often provided for the seat as the front passenger seat, but may be provided for the seat as the driver's seat or for the seat as any other seat provided with an air bag.

The weight detectors 323 each include a detector body 323a, a power-source-connecting connector 323b, a fixing bolt 323c, and a nut 323d.

The detector body 323a has a built-in sensor (e.g. strain gauge) that detects the weight of the sitting person.

The power-source-connecting connector 323b is a connector for transmitting power from a power source (not shown) to the detector body 323a.

The fixing bolt 323c and the nut 323d are used for fixing the detector body 323a (and built-in sensor) to the cushion frame 310. Another bolt and another nut (not shown) are used for fixing the detector body 323a to the slide rail 320.

The power-source-connecting connectors 323b face in different directions depending on where the weight detectors 323 are arranged. That is, in the case of the weight detectors 323 positioned on the front side, the power-source-connecting connectors 323b are attached to the front ends of the detector bodies 323a, whereas in the case of the weight detectors 323 positioned on the rear side, the power-source-connecting connectors 323b are attached to the sides of the detector bodies 323a closer to the center of the seat.

Connectors for communications (not shown) may be attached to the detector bodies 323a in the same manner as the power-source-connecting connectors 323b.

The lock mechanism 330 functions for both the first slide rail 321 and the second slide rail 322 to place or lift restrictions on movement of the first slide rail 321 and the second slide rail 322. More specifically, the lock mechanism 330 places or lifts restrictions on movement of the upper rails 3211, 3221 of the first and second slide rails 321, 322 along the lower rails 3210, 3220 thereof.

The lock mechanism 330 includes a pair of left and right lock bodies 331, a pair of left and right press levers 332, a connecting pipe 333, a cable 334, a cable's power unit 335, and a limit switch 336.

The lock bodies 331 are used as a left-and-right pair for the first slide rail 321 and the second slide rail 322. Each lock body 331 includes: the nails 331a, which are inserted into the lock holes 3210b, 3211b or 3220b, 3221b; a rotational shaft 331b; and a press receiving part 331c.

Figure 40:
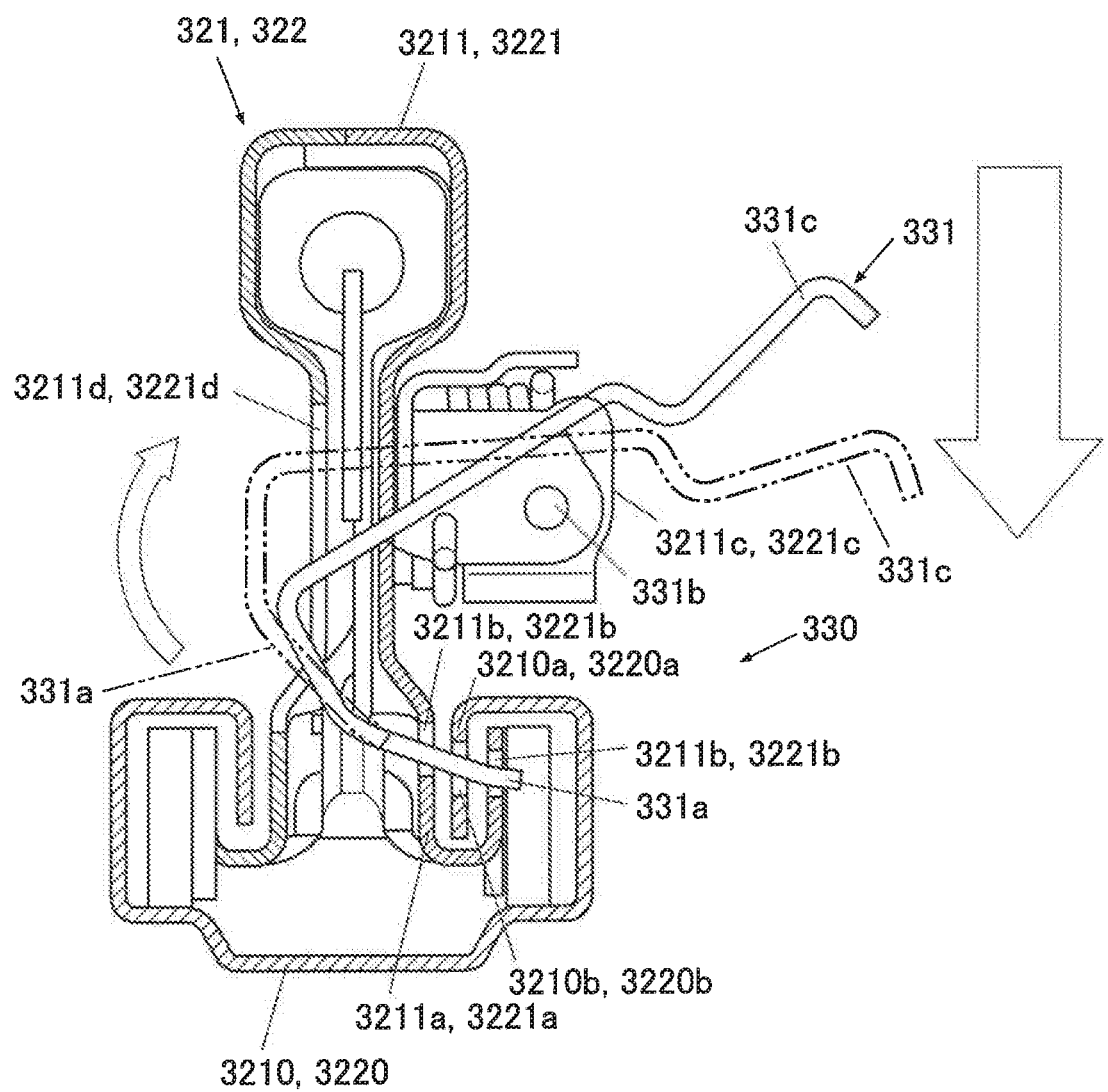
FIG. 40 is a cross sectional view to explain a lock mechanism according to the third embodiment.
Figure 41:
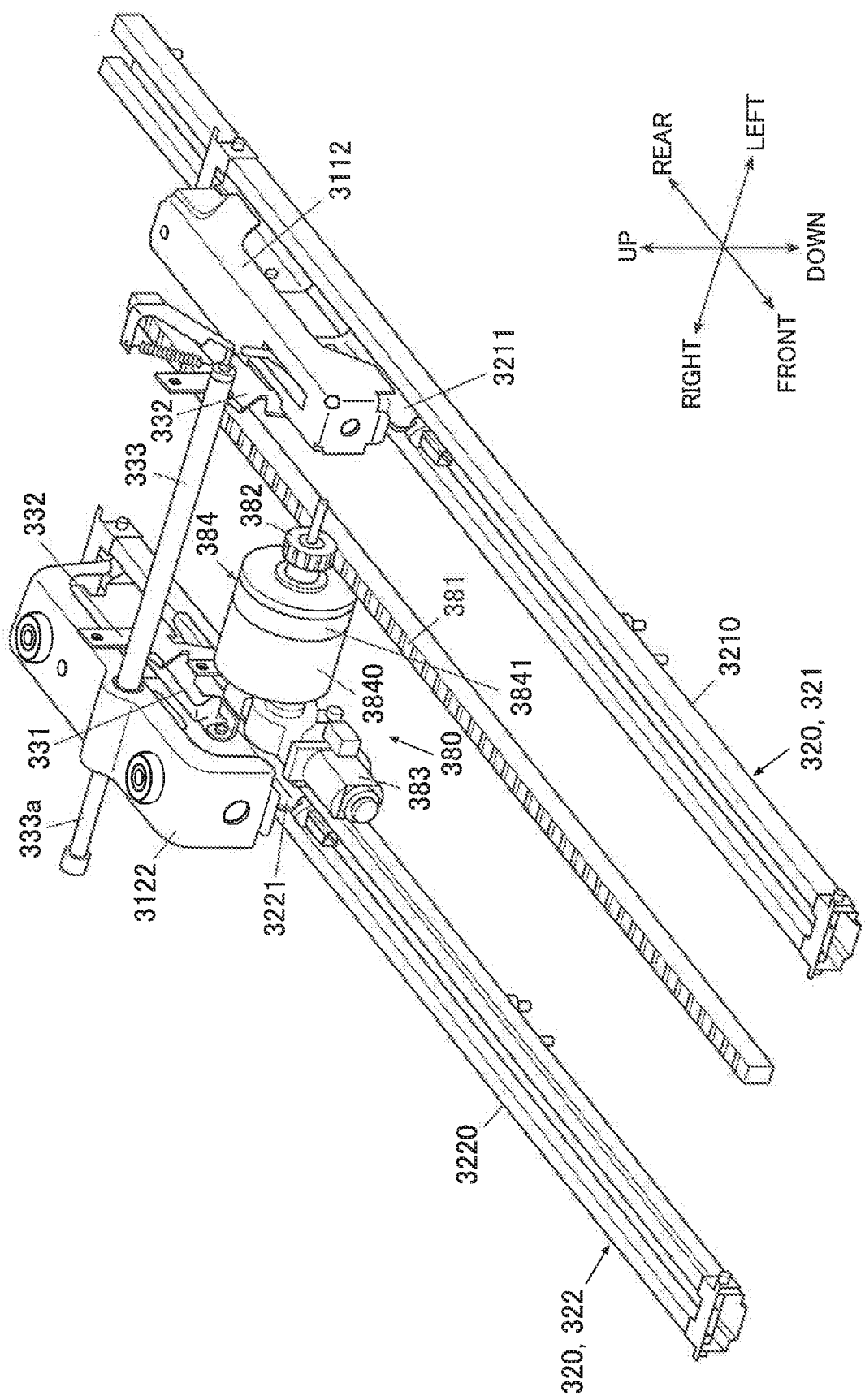
FIG. 41 is a perspective view showing a movement mechanism and its vicinity in the seat slide structure according to the third embodiment.
Figure 42:
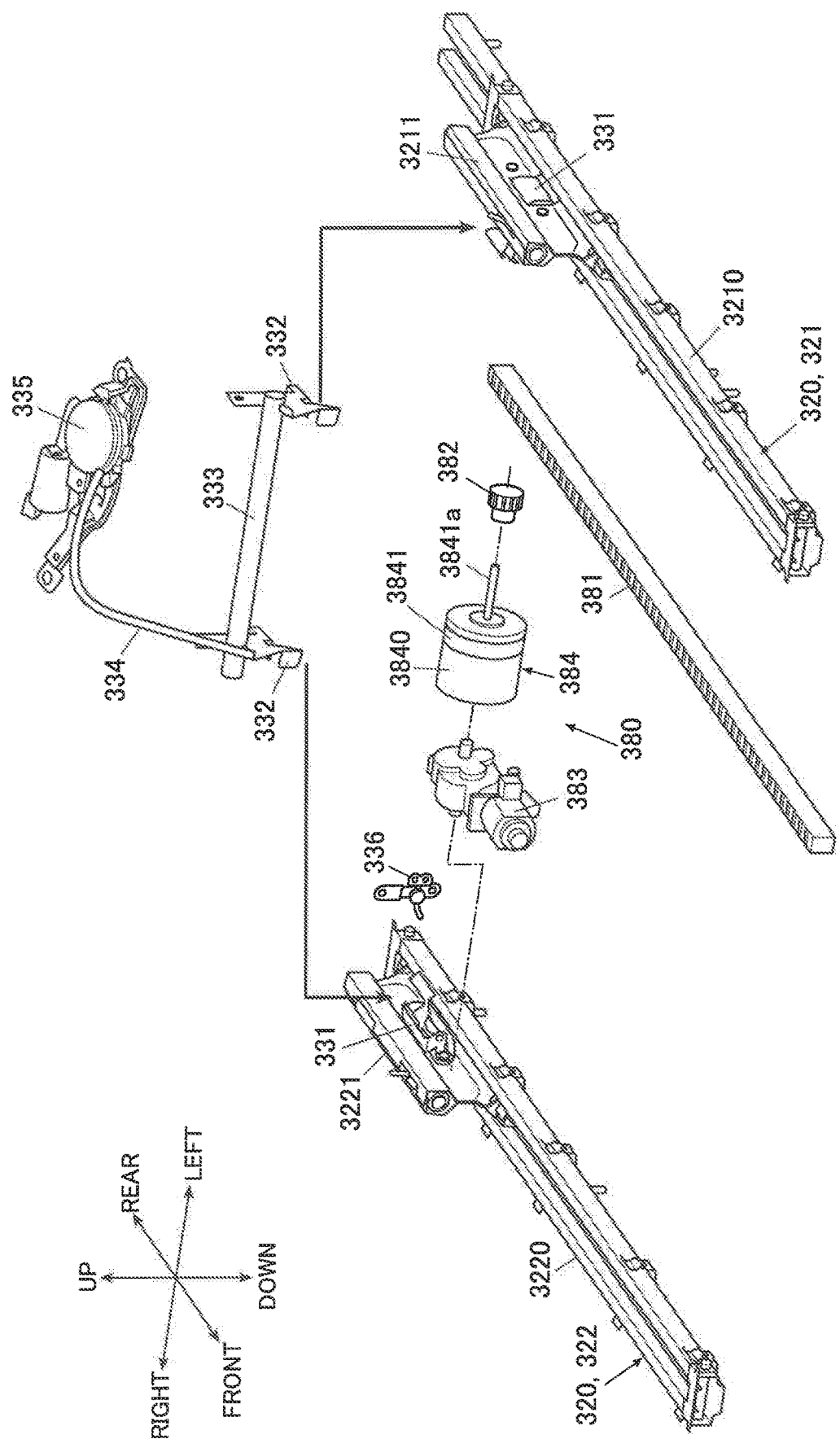
FIG. 42 is an enlarged perspective view showing the movement mechanism and its vicinity in the seat slide structure according to the third embodiment.
Figure 43:
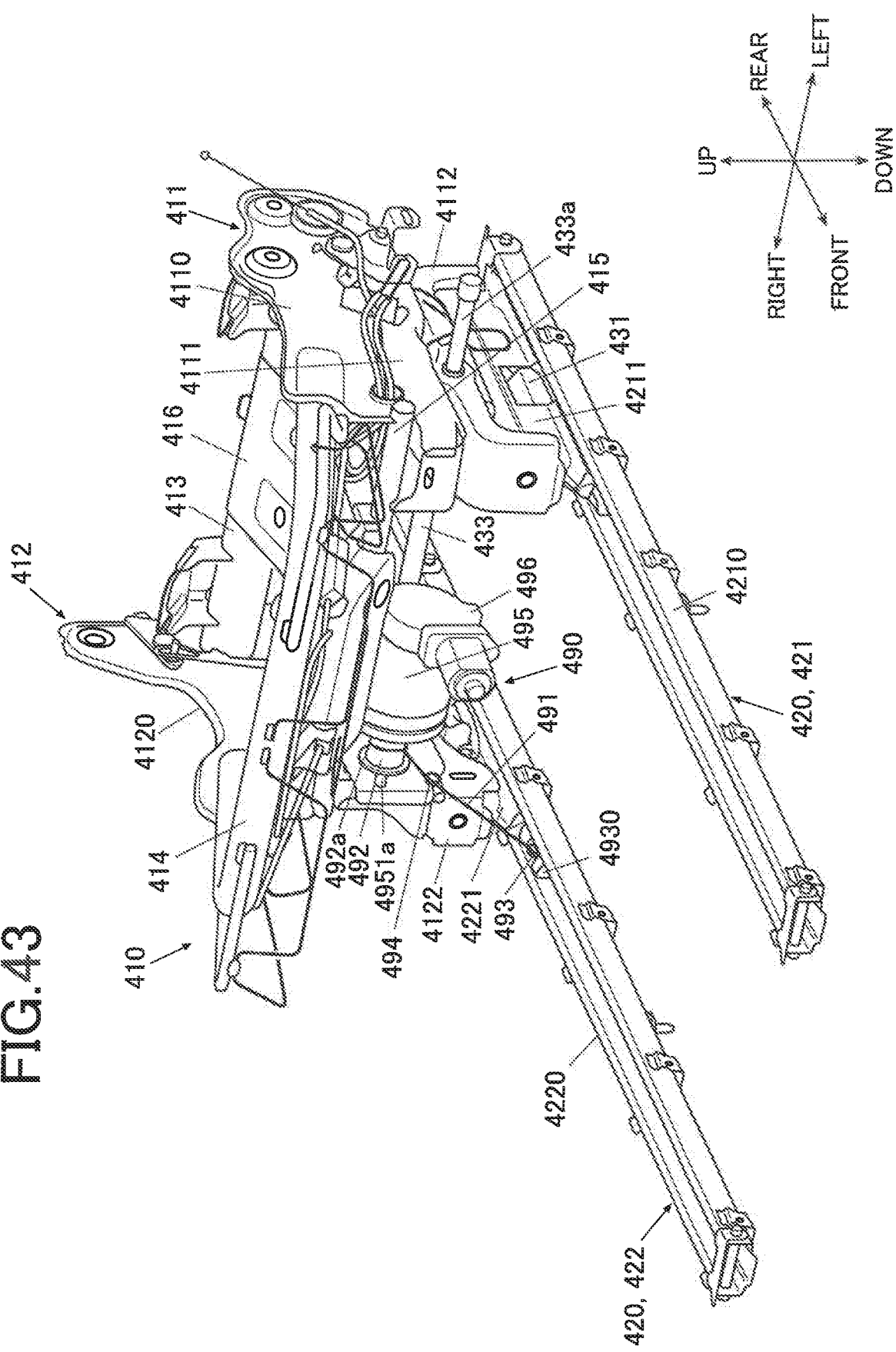
FIG. 43 is a perspective view showing a seat slide structure according to a fourth embodiment.
Figure 44:
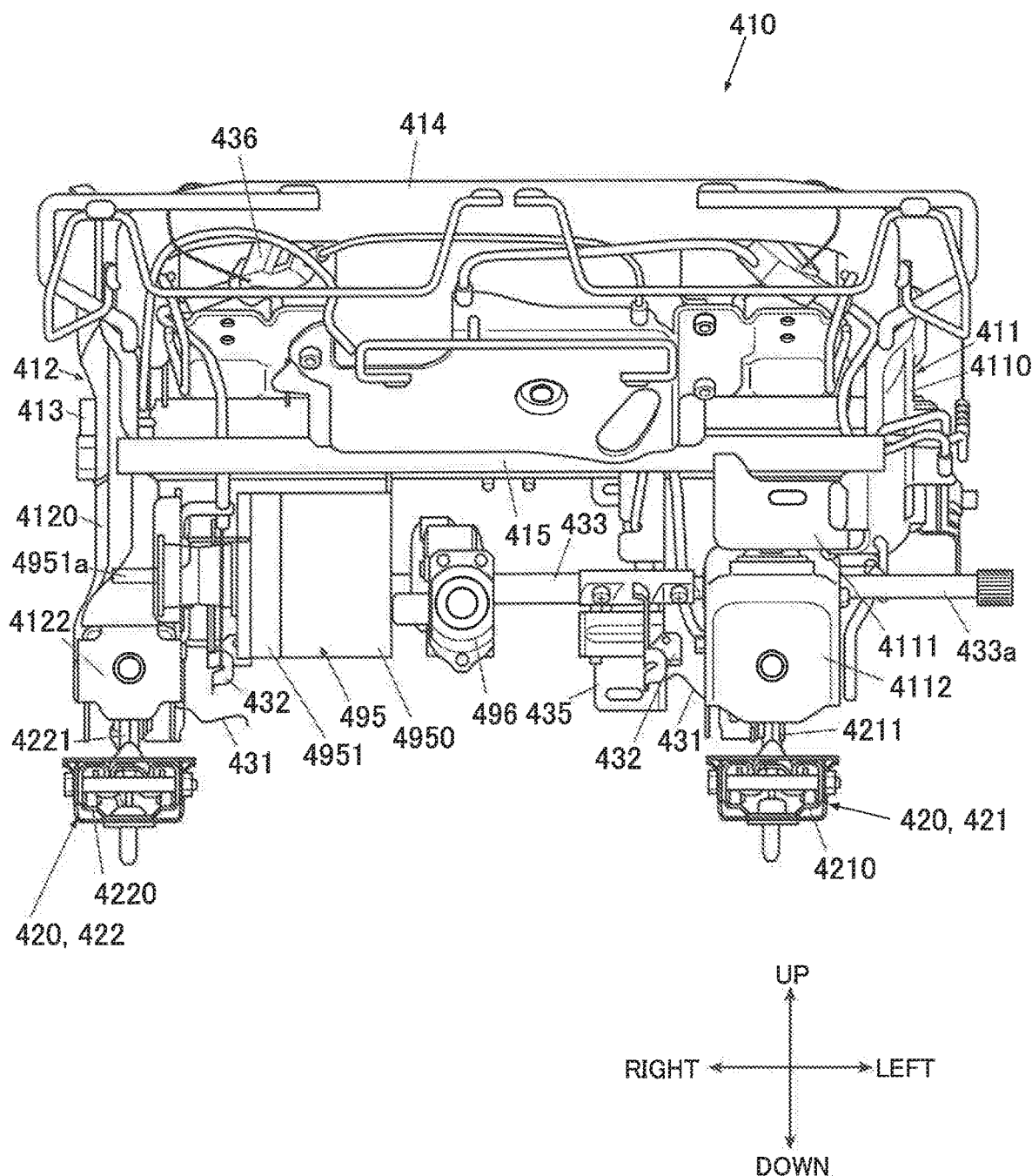
FIG. 44 is a front view showing the seat slide structure according to the fourth embodiment.
Figure 45:
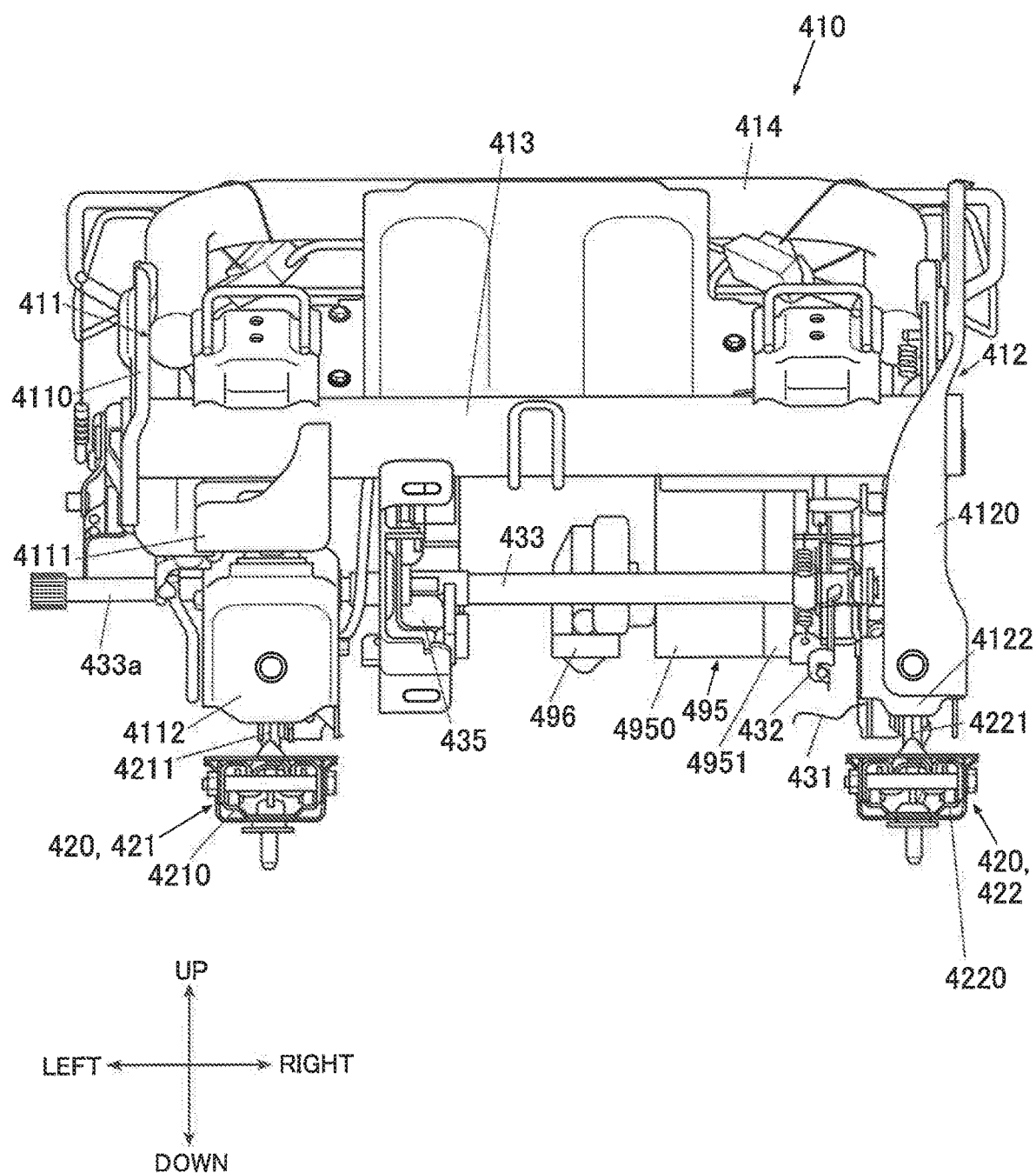
FIG. 45 is a rear view showing the seat slide structure according to the fourth embodiment.
Figure 46:
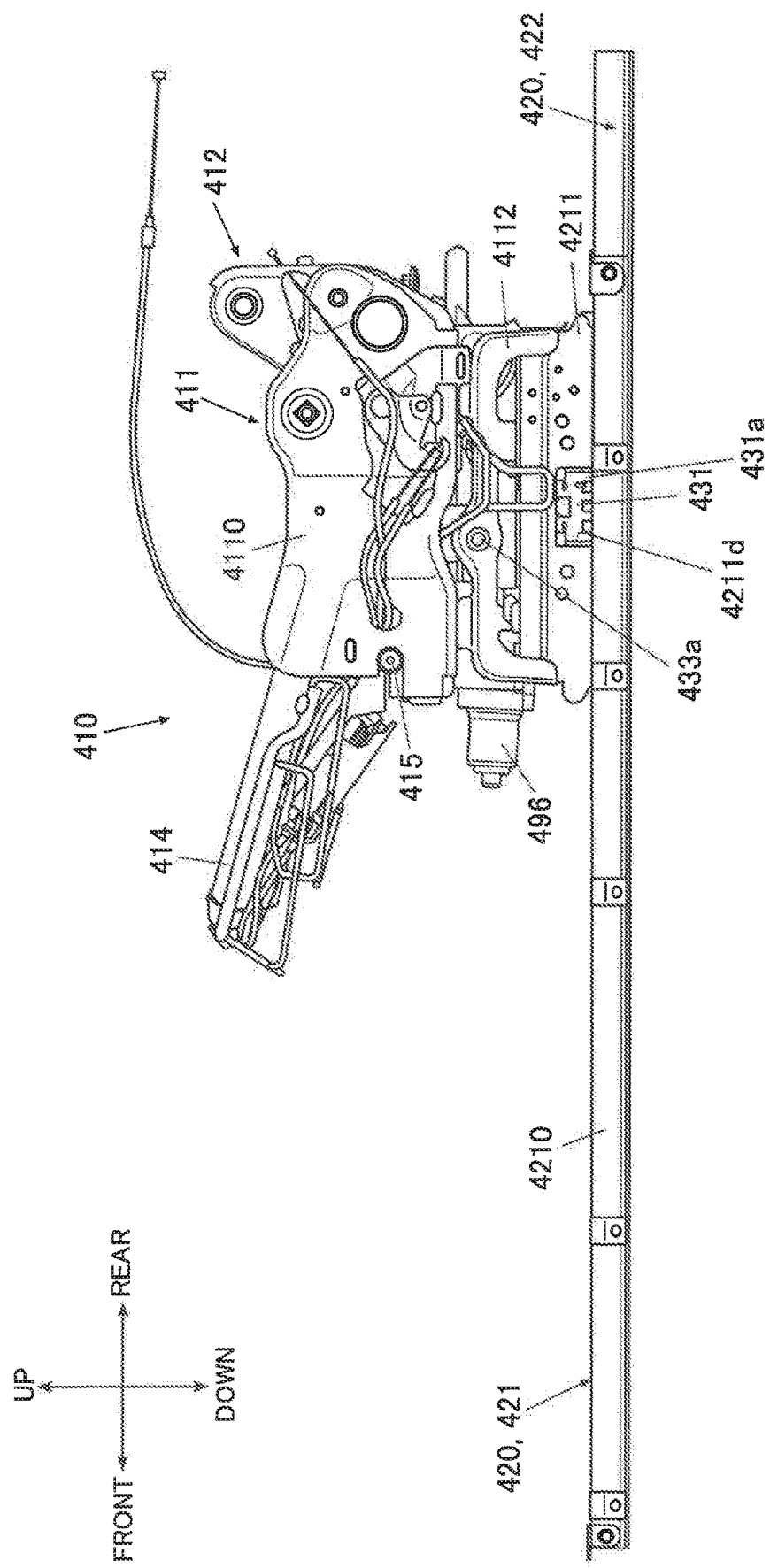
FIG. 46 is a left side view showing the seat slide structure according to the fourth embodiment.
Figure 47:
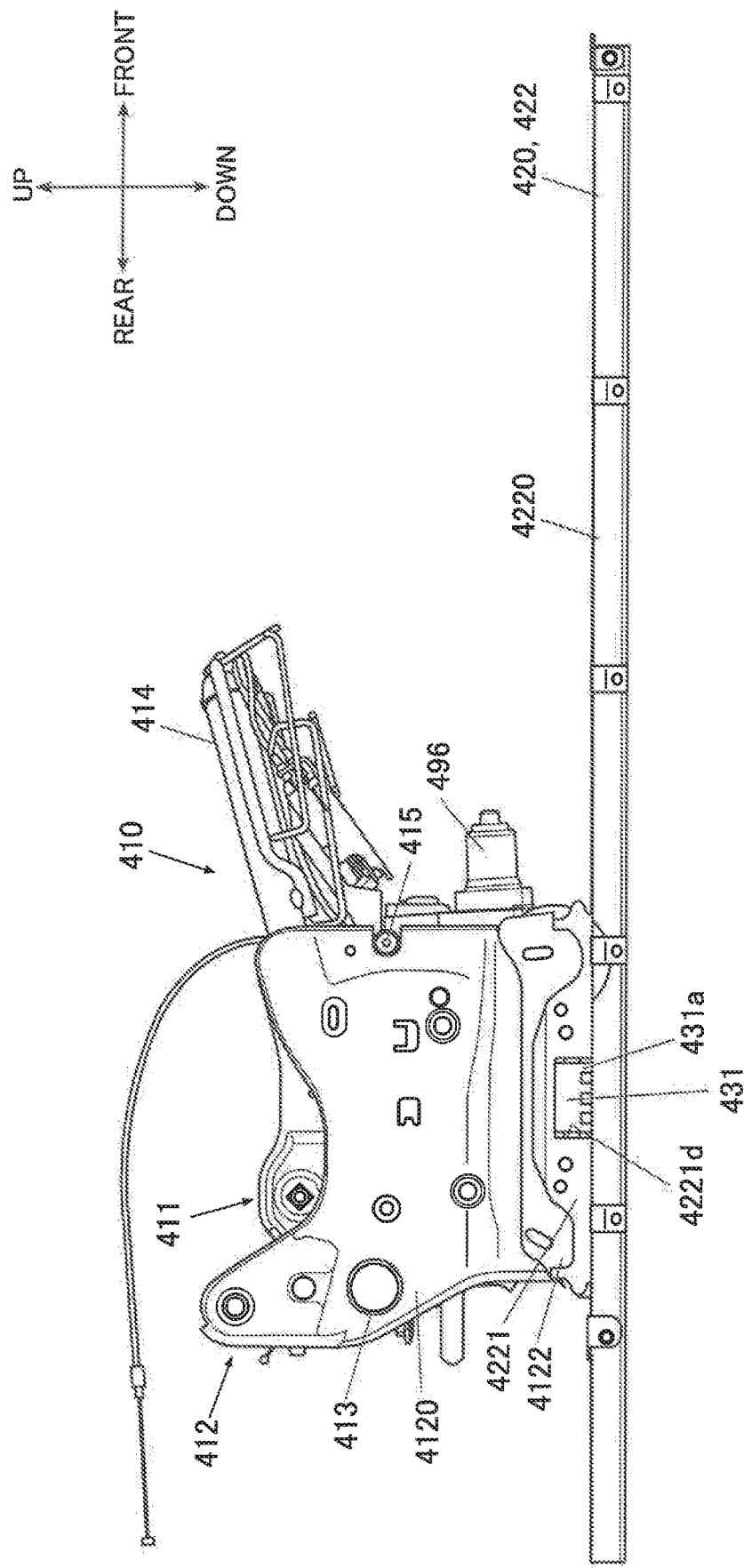
FIG. 47 is a right side view showing the seat slide structure according to the fourth embodiment.
Figure 48:
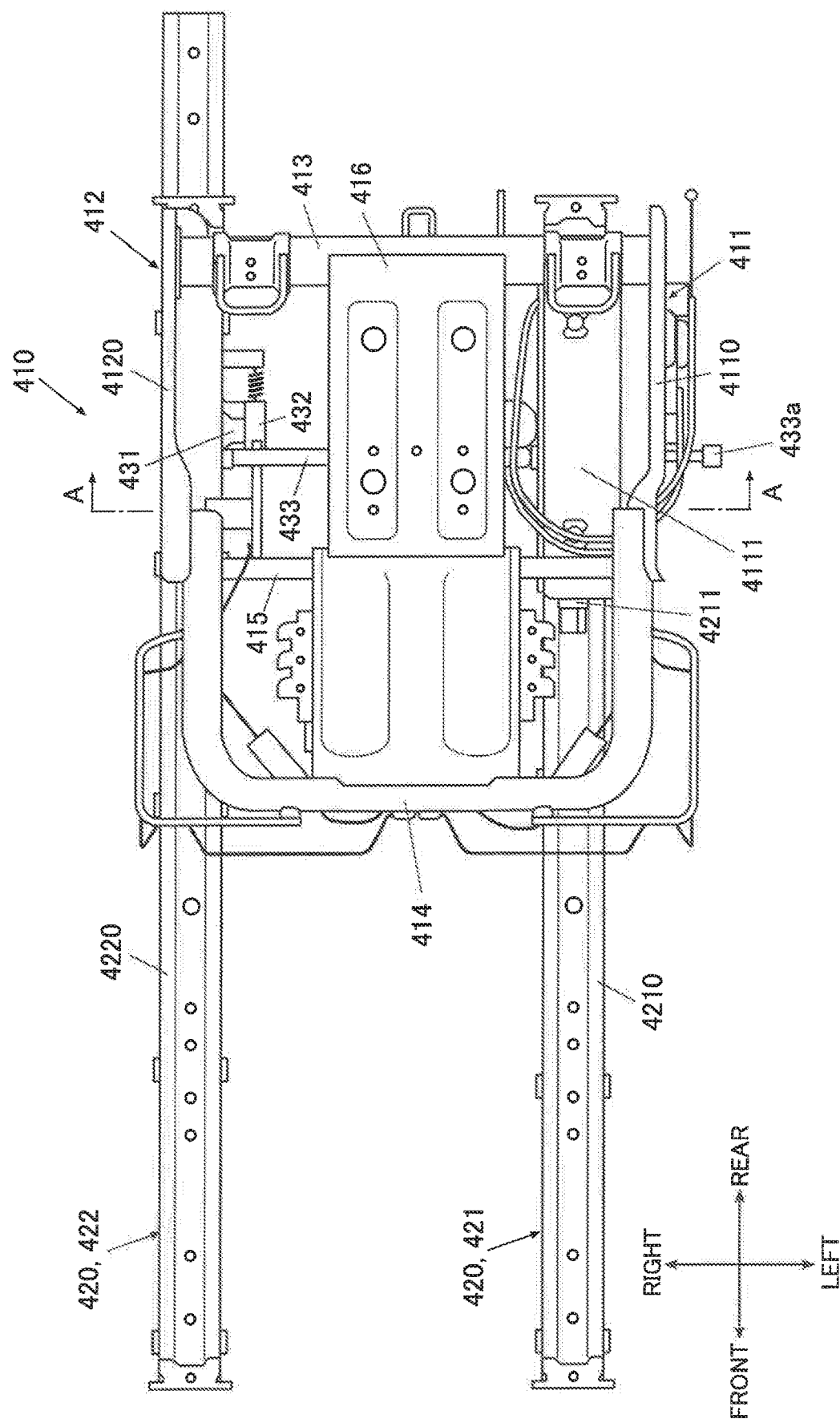
FIG. 48 is a plan view showing the seat slide structure according to the fourth embodiment.
Figure 49:
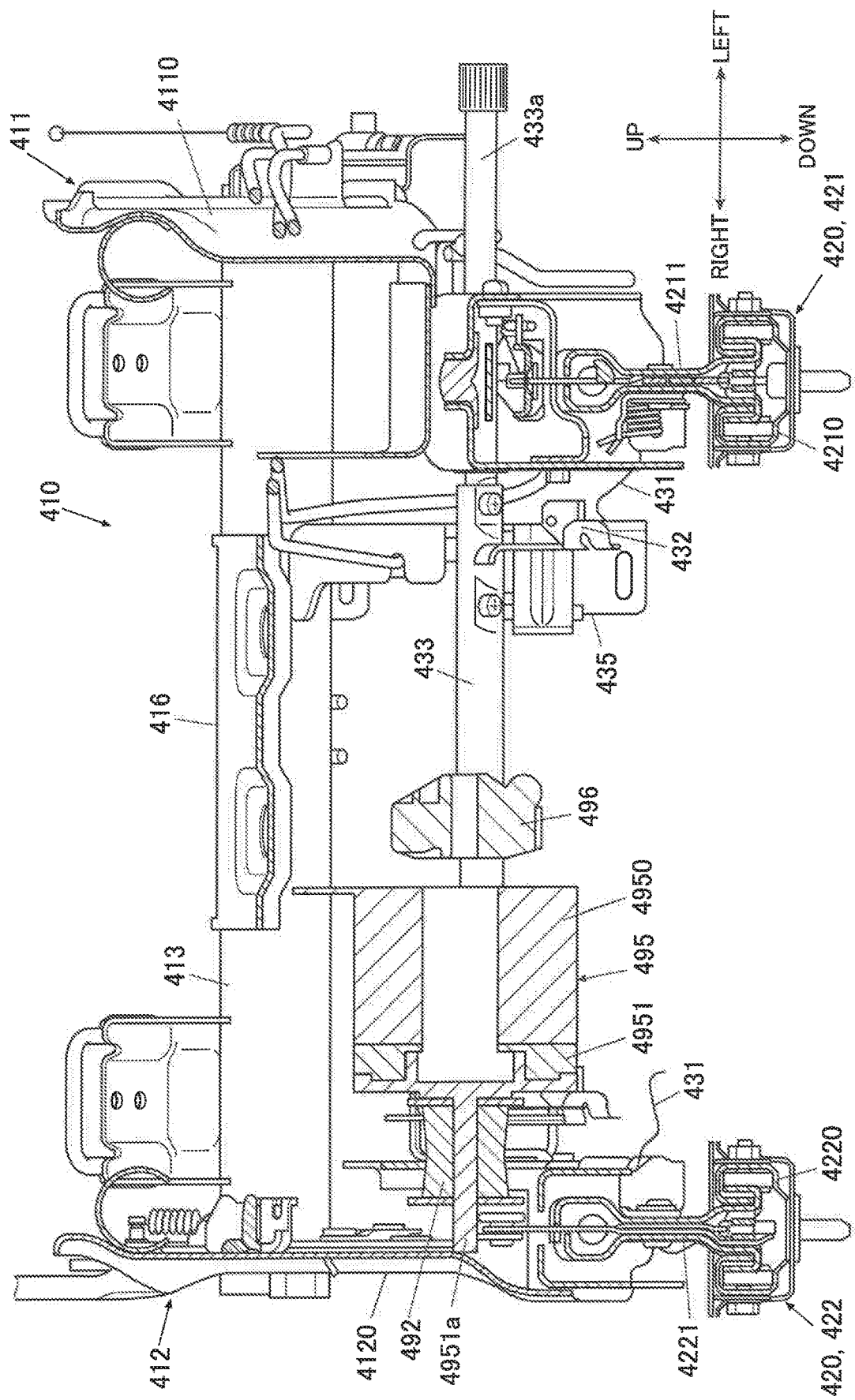
FIG. 49 is a cross sectional view taken along line A-A in FIG. 48.
Figure 50:
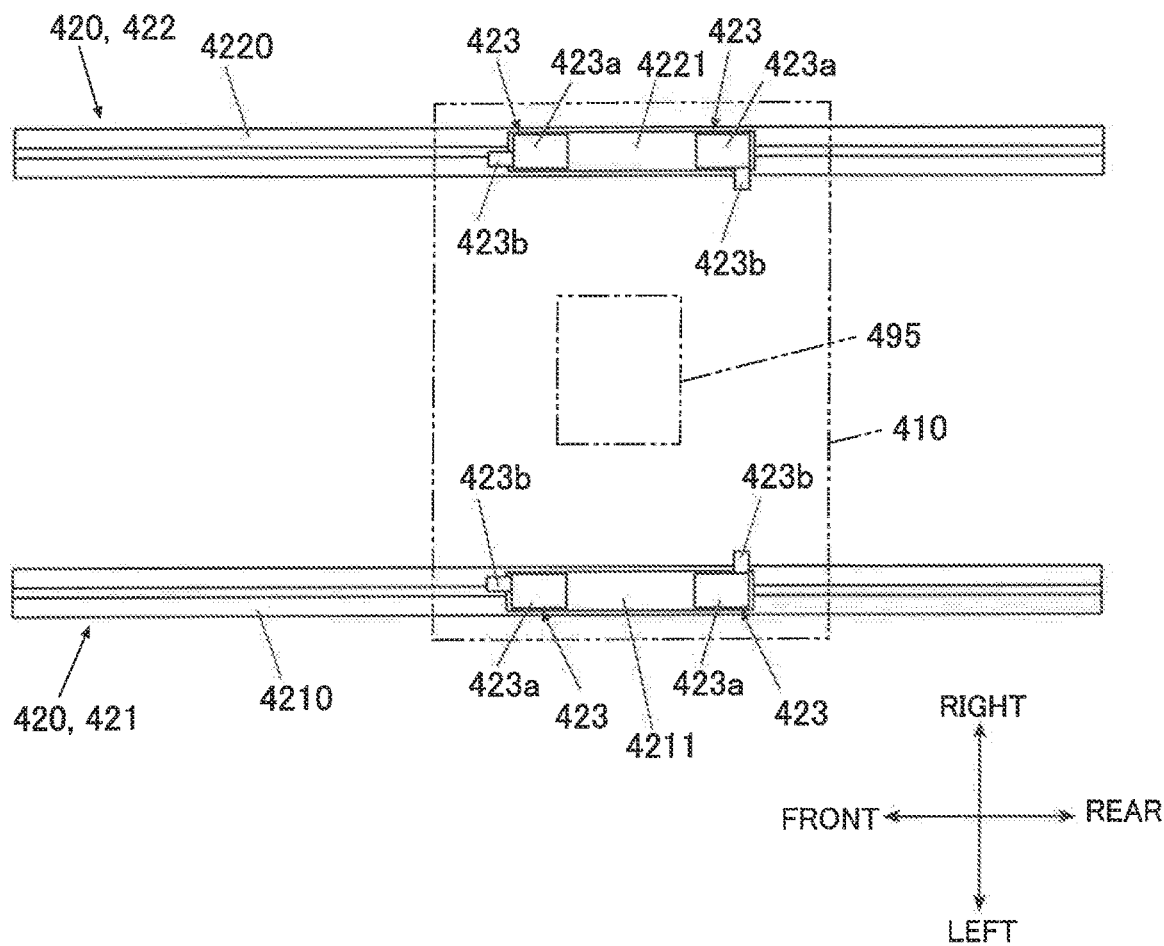
FIG. 50 is a schematic view to explain arrangement of seat weight sensors according to the fourth embodiment.

The nails 331a and the press receiving part 331c are positioned exactly opposite to one another with the rotational shaft 331b as the center. The lock body 331 is configured such that when the press receiving part 331c is pressed, the nails 331a rotate upward. A down arrow (different from leader lines) in FIG. 40 represents pressing force applied to the press receiving part 331c, and an arc-shaped up arrow (different from leader lines) in FIG. 40 represents rotation of the nails 331a.

The lock body 331 is further configured such that when the press of the press receiving part 331c is released, the nails 331a rotate downward.

The number of the nails 331a provided in each lock body 331 is two or more (four in this embodiment), and the nails 331a are arranged at equal intervals.

The rotational shafts 331b are provided in brackets 3211c, 3221c that project from the upper rails 3211, 3221, and arranged in parallel with the first and second slide rails 321, 322.

In the upper rails 3211, 3221, openings 3211d, 3221d are formed on rotational trajectories of the lock bodies 331.

The press levers 332 press the press receiving parts 331c of the lock bodies 331, and are used as a left-and-right pair for the lock bodies 331, which are a left-and-right pair.

The connecting pipe 333 is put over the first cushion side frame 311 and the second cushion side frame 312, and supported thereby so as to be rotatable.

The left and right press levers 332 are fixed to the connecting pipe 333, and rotate in sync with rotation of the connecting pipe 333, namely rotate as the connecting pipe 333 rotates.

The connecting pipe 333 has a projecting shaft 333a to extend the connecting pipe 333. The projecting shaft 333a projects sideward from the outer-side surface of the connecting leg 3122, and enables manual unlocking of the lock bodies 331 by being provided with, for example, an operation lever (not shown) at the tip.

The cable 334 is hitched to one of the left and right press levers 332 (right press lever 332 in this embodiment) to cause the one of the left and right press levers 332 to rotate by power transmitted from the cable's power unit 335 fixed to the cushion frame 310. That is, the cable 334 causes one press lever 332 to rotate, which causes the connecting pipe 333 to rotate on its axis and consequently causes the other press lever 332 to rotate.

The limit switch 336 is connected to the movement mechanism 380, and used for linking operation of the lock mechanism 330 with operation of the movement mechanism 380.

More specifically, the limit switch 336 is turned on when the lock mechanism 330 performs unlocking, and at this timing, for example, the ECU controls and causes a motor 383 (described below) of the movement mechanism 380 to operate, so that the upper rails 3211, 3221 slide along the lower rails 3210, 3220.

On the other hand, the limit switch 336 is turned off when the lock mechanism 330 performs locking, and at this timing, for example, the ECU controls and causes the motor 383 (described below) of the movement mechanism 380 to stop, so that the upper rails 3211, 3221 stop sliding along the lower rails 3210, 3220.

The movement mechanism 380 has a rack 381 that is arranged in parallel with the first slide rail 321 and the second slide rail 322, a pinion gear 382 that engages with the rack 381, and a power blocker 384 that is at least partly arranged between the first slide rail 321 and the second slide rail 322, and transmits or blocks power from the motor 383 as a power source to the pinion gear 382.

The power blocker 384 has shafts 3840a, 3841a for transmitting power from the motor 383 as the power source to the pinion gear 382. The shafts 3840a, 3841a are provided in the right-left direction.

The rack 381 is a bar-shaped member having the upper surface where many teeth (concave and convex parts) are formed, and is arranged in parallel with the first slide rail 321 and the second slide rail 322. Because the rail support stand 307 is a slope type, the first slide rail 321 and the second slide rail 322 are arranged to slope such that their heights/levels gradually decrease to the front end, and the rack 381 is arranged to slope accordingly, namely such that the height/level gradually decreases to the front end.

In order that the rack 381 is arranged so as to slope, on the rail support stand 307, a rack supporter 3810 is provided. The rack supporter 3810 has: support legs 3810a having different heights; and a support plate 3810b that is put over and fixed to the support legs 3810a at an angle at which the rack 381 slopes. The rack 381 is fixed to the support plate 3810b.

The pinion gear 382 is a toothed wheel member having the outer circumferential surface where many teeth (convex and concave parts) are formed so as to be continuous around its axis. The teeth of the pinion gear 382 are formed so as to mesh with the teeth formed on the rack 381.

The pinion gear 382 is supported by the cushion frame 310 so as to be rotatable by being connected to the shaft 3841a of the power blocker 384.

The motor 383 is for rotating the pinion gear 382 through the power blocker 384, and transmits, to the power blocker 384, power for rotating the pinion gear 382.

The motor 383 is arranged between the power blocker 384 and one of the cushion side frames 311, 312 provided on the left and the right.

The power blocker 384 is, in this embodiment, an electromagnetic clutch, and has a clutch rotor 3840 to which power is transmitted from the motor 383, an armature unit 3841 connected to a shaft 3841a, and an electromagnetic coil (not shown) that is provided inside and electromagnetically attaches/detaches the clutch rotor 3840 and the armature unit 3841 to/from one another.

The pinion gear 382 is connected to the shaft 3841a, and rotates by power transmitted from the motor 383 to the power blocker 384. The motor 383 and the power blocker 384 are connected to one another by the shaft 3840a.

The power blocker 384 is attached to a first hanging bracket 385 and a second hanging bracket 386 that are fixed to the connecting member 315, which is put over the first cushion side frame 311 and the second cushion side frame 312.

The first hanging bracket 385 supports the shaft 3841a connected to the pinion gear 382, and the second hanging bracket 386 is positioned between the motor 383 and the power blocker 384 and supports the motor 383 and the power blocker 384.

Figure 35:
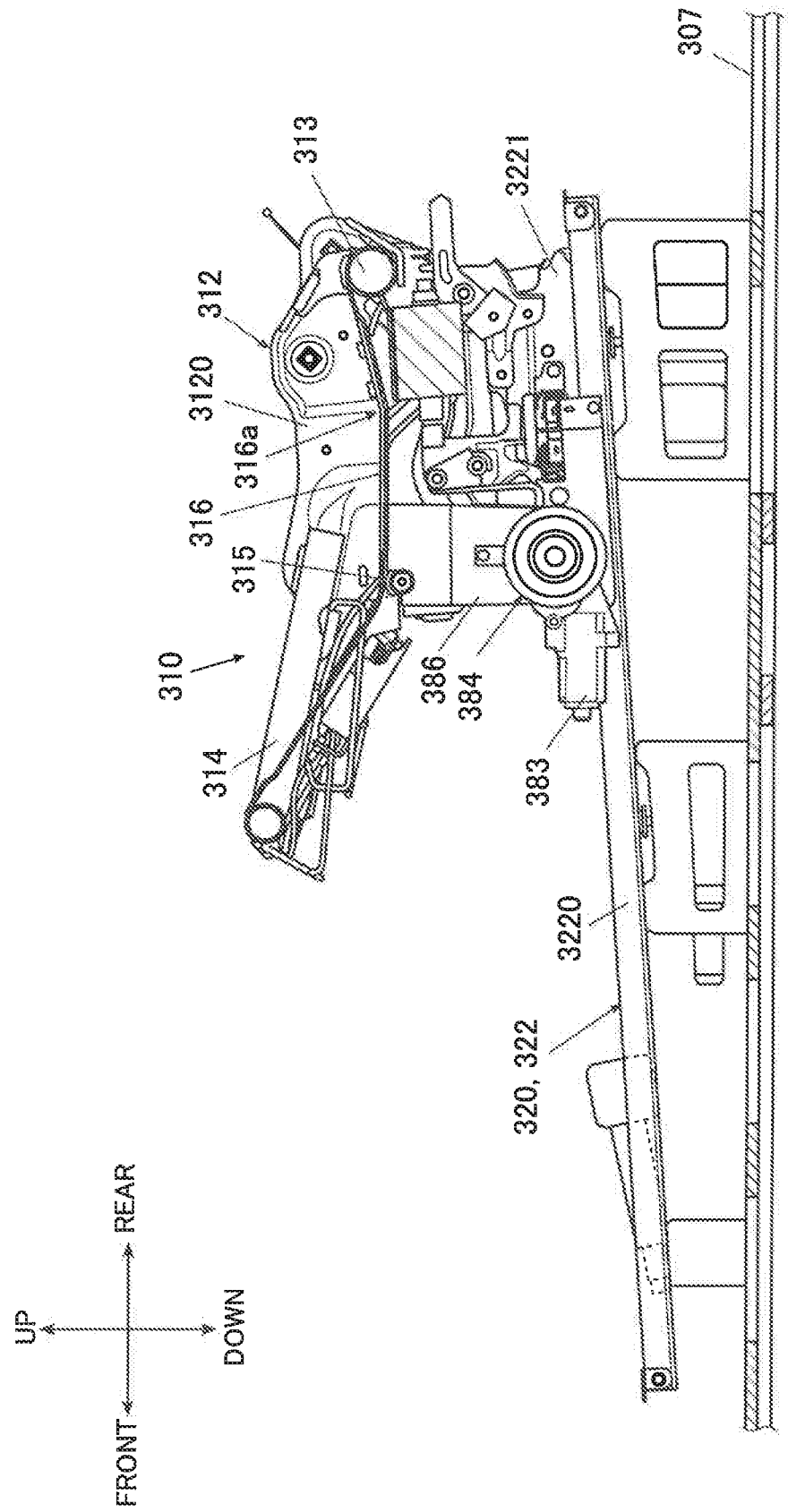
FIG. 35 is a cross sectional view showing an example of arrangement of a power blocker different from that shown in FIG. 34.
Figure 36:
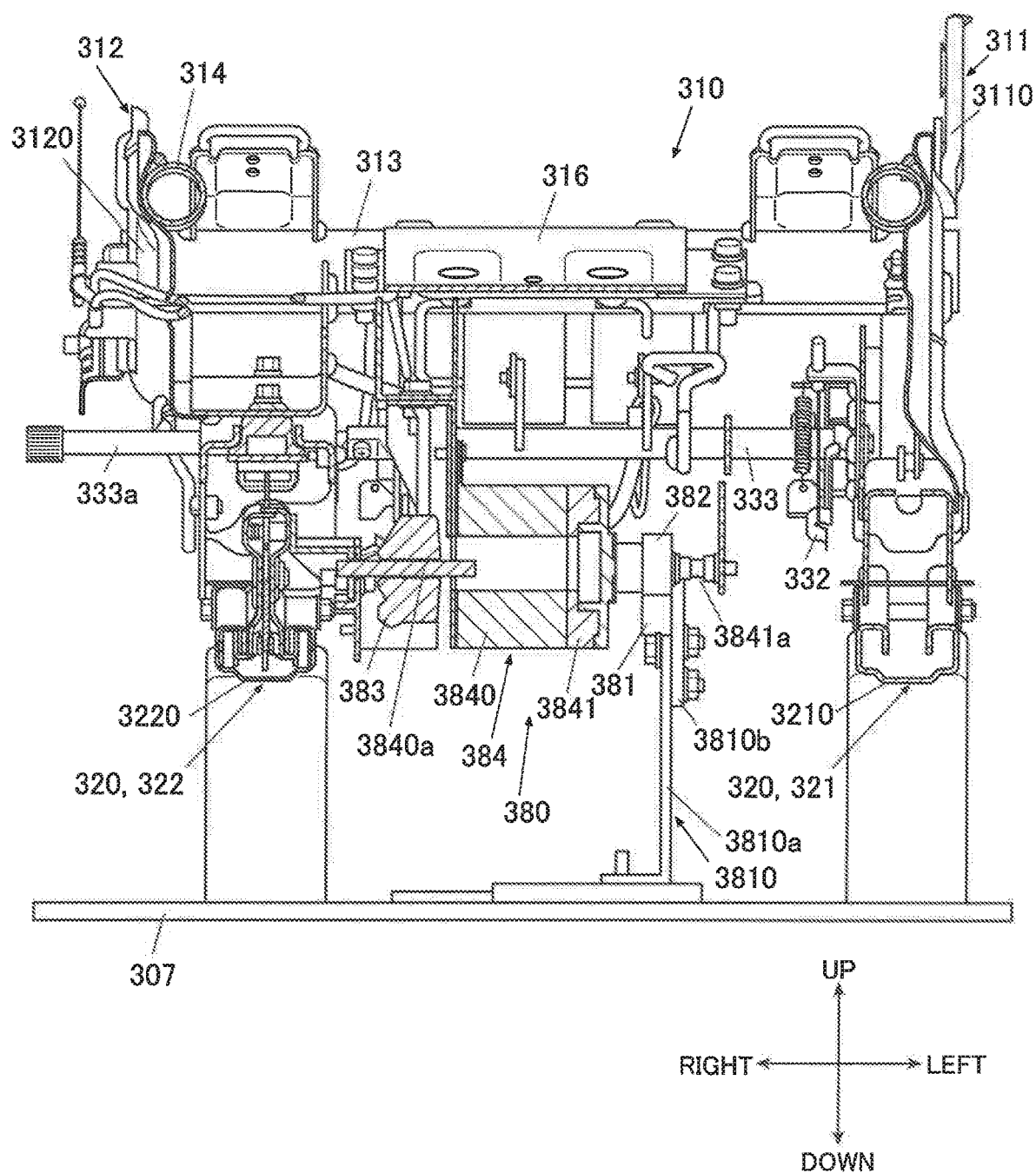
FIG. 36 is a cross sectional view taken along line B-B in FIG. 33.
Figure 37:
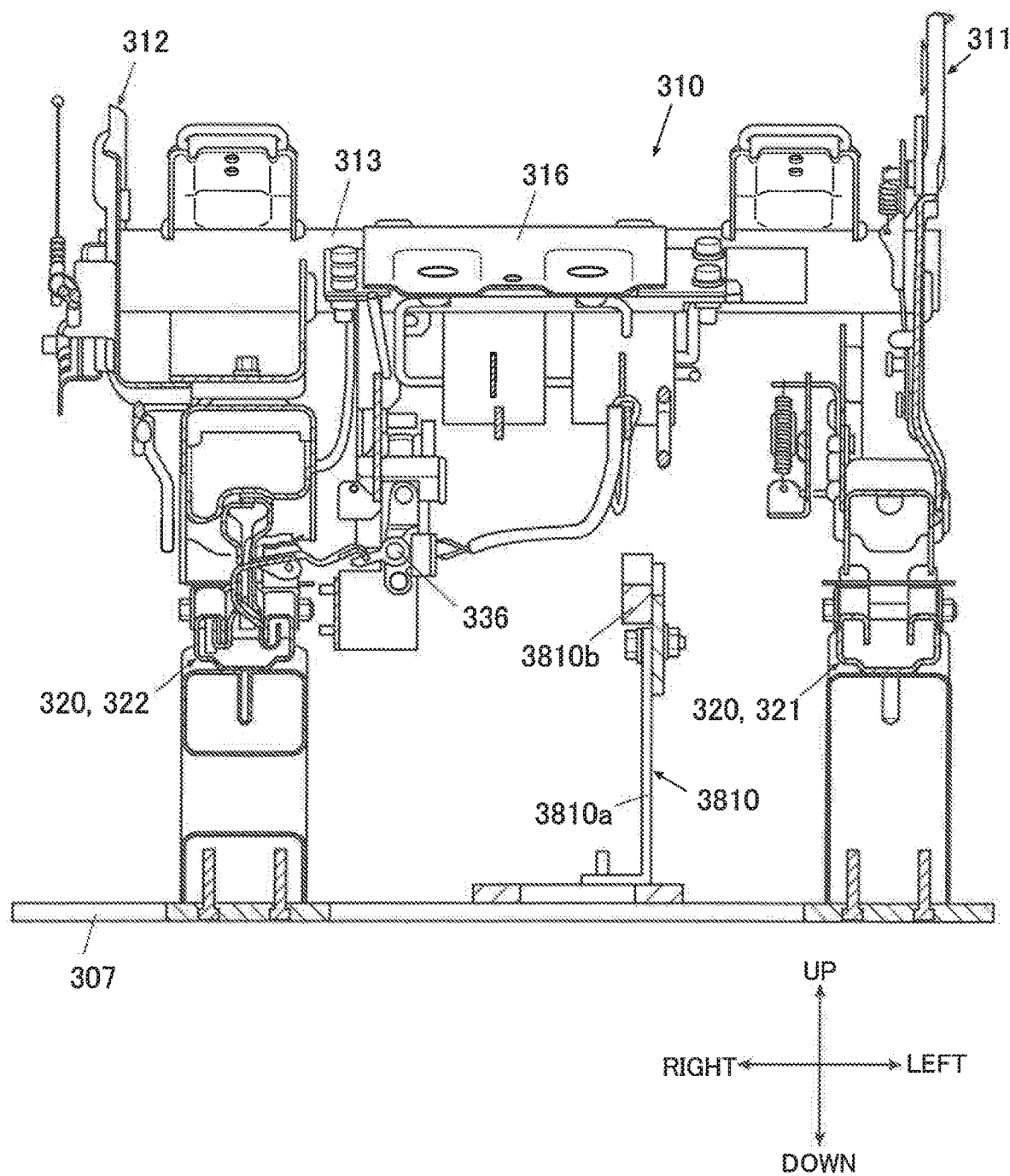
FIG. 37 is a cross sectional view taken along line C-C in FIG. 33.
Figure 38:
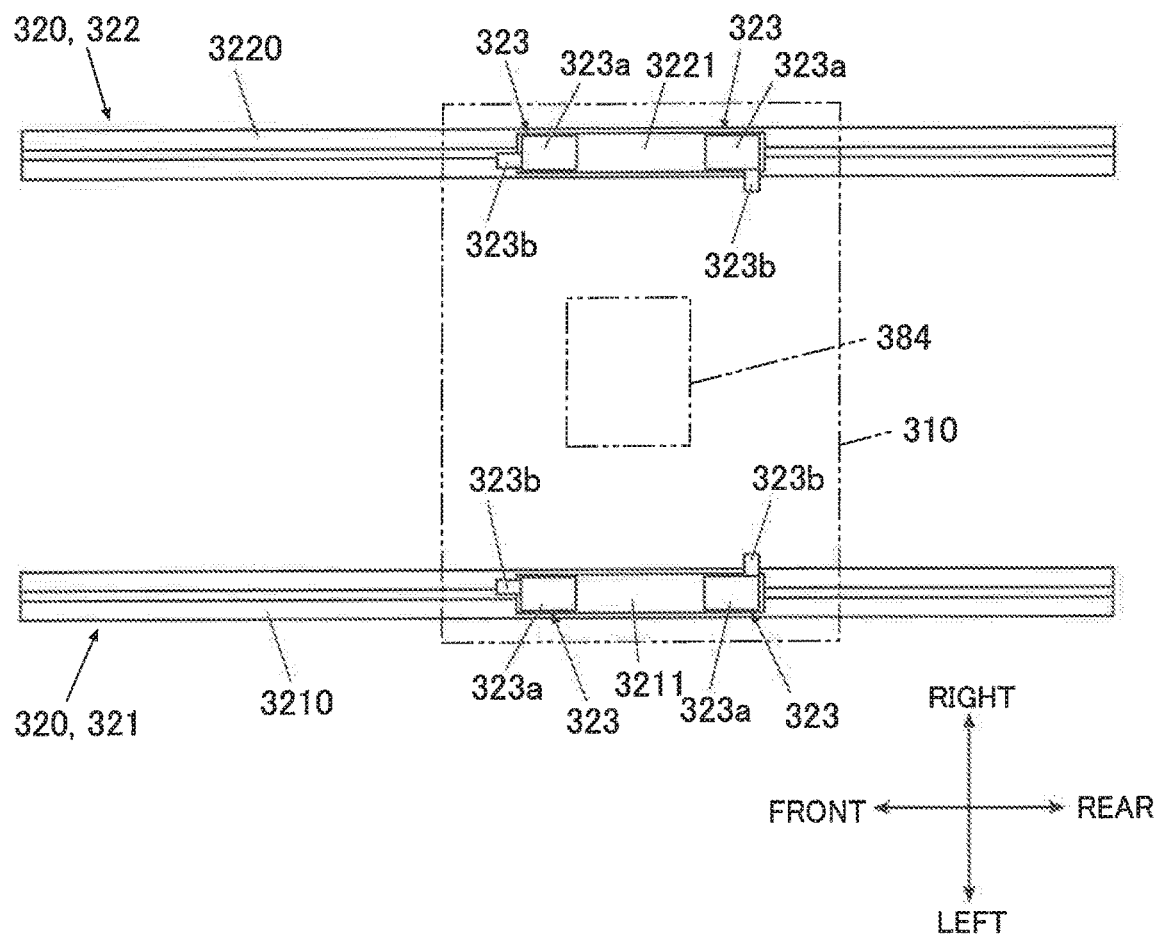
FIG. 38 is a schematic view to explain arrangement of seat weight sensors according to the third embodiment.

In this embodiment, the power blocker 384 is arranged almost entirely in front of the connecting member 315 as shown in FIG. 34, but may be arranged, for example, almost entirely behind the connecting member 315 as shown in FIG. 35.

Further, the power blocker 384 is arranged in front of the hip-point 316a of the pressure receiving member 316 of the cushion frame 310. In other words, the power blocker 384 is arranged at a position by avoiding a position immediately under a part of the pressure receiving member 316 having the shortest distance (space) from the first slide rail 321 and the second slide rail 322.

The power blocker 384 is at least partly arranged in front of the lock bodies 331. The "at least part(ly)" indicates, for example, the shaft 3841a of the power blocker 384, and accordingly the above expression includes indicating that the shaft 3841a of the power blocker 384 is arranged in front of the lock bodies 331, and also includes indicating that the power blocker 384 is entirely arranged in front of the lock bodies 331.

The power blocker 384 is, in this embodiment, an electromagnetic clutch, but not limited thereto and may be a hydraulic clutch, a torque diode, or the like.

Although not shown, on or near the seat, a switch(es) for making an input to slide the seat forward or rearward is provided. Operating the switch causes the lock mechanism 330 and the movement mechanism 380 to operate to slide the seat forward or rearward Operation of the seat slide structure thus configured will be described. Each control necessary for sliding the seat is performed by the ECU described above.

First, an occupant chooses whether to slide the seat forward or rearward by operating the switch. When receiving an input from the switch, the ECU controls the cable's power unit 335 of the lock mechanism 330 to pull the cable 334. This causes the press lever 332 to which the cable 334 is hitched to rotate. As this takes place, the connecting pipe 333 rotates on its axis, and the other press lever 332 rotates in sync therewith.

Successively, the left and right press levers 332 press the press receiving parts 331c of the left and right lock bodies 331, so that the left and right lock bodies 331 rotate on their rotational shafts 331b. This pulls out the nails 331a of the lock bodies 331 from the lock holes 3210b, 3211b, 3220b, 3221b of the first and second slide rails 321, 322, thereby performing unlocking.

Pulling out the nails 331a of the lock bodies 331 from the lock holes 3210b, 3211b, 3220b, 3221b turns on the limit switch 336. When the limit switch 336 is turned on, the ECU causes the motor 383 to operate and consequently causes the power blocker 384 to operate to rotate the pinion gear 382.

When the pinion gear 382 starts rotating, the pinion gear 382 moves on the rack 381 by the gears meshing. As this takes place, in the first and second slide rails 321, 322, the upper rails 3211, 3221 slide along the lower rails 3210, 3220.

Thus, the seat can be made to slide forward or rearward.

When the seat slides to a position desired by the occupant, the occupant stops operating the switch. When operation on the switch stops, the cable's power unit 335 stops, and consequently the cable 334 goes back to its initial position, and also the left and right press levers 332 rotate to go back to their initial positions.

As these take place, the lock bodies 331 also rotate to go back to their initial positions. However, the nails 331*a* of the lock bodies 331 may not be inserted into the lock holes 3210*b*, 3220*b* of the lower rails 3210, 3220 because the seat sliding is stopped at the occupant's desired position. In such a case, the ECU that detects that the limit switch 336 is still on although operation on the abovementioned switch is stopped causes the motor 383 to operate to slightly slide the seat forward or rearward. This inserts the nails 331*a* of the lock bodies 331 into their nearby lock holes 3210*b*, 3220*b* of the lower rails 3210, 3220, thereby performing locking.

Inserting the nails 331*a* of the lock bodies 331 into their nearby lock holes 3210*b*, 3220*b* of the lower rails 3210, 3220 turns off the limit switch 336. Then, the ECU stops the motor 383 and consequently stops the power blocker 384 to stop the pinion gear 382 from rotating.

Thus, the seat can be stopped at a position desired by the occupant.

According to this embodiment, the power blocker 384 that is at least partly arranged between the first slide rail 321 and the second slide rail 322 and transmits or blocks power from a power source to the pinion gear 382 includes the shaft(s) 3840*a*, 3841*a* through which the power is transmitted from the power source to the pinion gear 382 and that is provided in the right-left direction. This can ensure a space for the power blocker 384 to be arranged, and can restrain increase in seat size in the right-left direction.

Further, the power blocker 384 is an electromagnetic clutch. This can transmit or block power from the power source to the pinion gear 382 according to the on/off state of the electromagnetic clutch.

Further, the power blocker 384 is arranged in front of the hip-point 316*a* for an occupant in the cushion frame 310. Thus, the power blocker 384 can be arranged at a position where a free space is present in the up-down direction.

Further, the power blocker 384 is supported by the connecting member 315 that is put over the front ends of the left cushion side frame 311 and the right cushion side frame 312, thereby connecting the left cushion side frame 311 and the right cushion side frame 312 to one another. This can disperse the weight of the power blocker 384 to the left cushion side frame 311 and the right cushion side frame 312.

Fourth Embodiment

Both the seat lock mechanism and the seat movement mechanism in the conventional vehicle seat mentioned above are simpler in structure than earlier ones.

In such a conventional vehicle seat, as part of the movement mechanism that slides a seat, a drive pulley and a driven pulley are used. However, these pulleys are arranged above the slide rail(s). This increases seat size in the up-down direction.

Then, it is required to restrain increase in seat size in the up-down direction.

According to this embodiment, the following is provided.

1. A seat slide structure including:

a cushion frame that forms a framework of a seat cushion that supports a femoral region and buttocks of a person;

a slide rail that is connected to a lower end of the cushion frame; and a movement mechanism that slides the cushion frame along a length direction of the slide rail, and includes:

a wire both ends of which are fixed to the slide rail;

a winch around which the wire is wound and that is supported by the cushion frame so as to be rotatable; and a first pulley around which the wire passes and that (i) is at least partly stored in the slide rail and (ii) is arranged within a width of the slide rail.

2. The seat slide structure according to the item 1, wherein the first pulley is at least partly stored in the slide rail in a height direction of the slide rail.

3. The seat slide structure according to the item 1, wherein the first pulley includes a first support shaft that (i) supports the first pulley in a freely rotatable manner and (ii) is stored in the slide rail in a height direction of the slide rail.

4. The seat slide structure according to the item 1, wherein the first pulley is entirely stored in the slide rail in a height direction of the slide rail.

5. The seat slide structure according to the item 1, wherein the movement mechanism includes a second pulley around which the wire passes and that (i) is provided outside the slide rail and (ii) is arranged at a side of the slide rail closer to center of the seat cushion.

6. The seat slide structure according to the item 5, wherein the first pulley includes a first support shaft that supports the first pulley in a freely rotatable manner, the second pulley includes a second support shaft that supports the second pulley in the freely rotatable manner, and the first support shaft and the second support shaft are arranged so as to slope.

7. The seat slide structure according to the item 1, wherein the slide rail includes:

a lower rail; and an upper rail that is provided so as to be slidable along the lower rail, and is connected to the cushion frame, the first pulley includes a first support shaft that supports the first pulley in a freely rotatable manner, the first pulley is provided at each of a front end and a rear end of the upper rail as a front-side first pulley and a rear-side first pulley, and the first support shaft is supported at each of the front end and the rear end of the upper rail by double holding.

8. The seat slide structure according to the item 7, including a lock mechanism that includes a lock body engaging with the slide rail, and places or lifts a restriction on movement of the slide rail, wherein the front-side first pulley is arranged in front of the lock body.

9. The seat slide structure according to the item 7, wherein the cushion frame includes:

a left cushion side frame and a right cushion side frame that are arranged so as to leave a space in between; and a connecting member that is put over front ends of the left cushion side frame and the right cushion side frame, thereby connecting the left cushion side frame and the right cushion side frame to one another, and the front-side first pulley is arranged in front of the connecting member.

10. The seat slide structure according to the item 7, wherein the movement mechanism includes a power blocker that transmits or blocks power from a power source to the winch, and includes:
a shaft through which the power is transmitted from the power source to the winch, and
the front-side first pulley is arranged in front of the shaft.

11. The seat slide structure according to the item 5, wherein
the cushion frame includes a left cushion side frame and a right cushion side frame that are arranged so as to leave a space in between, and
the second pulley is supported at a point on a side of one of the left cushion side frame and the right cushion side frame, the side being closer to center of the seat cushion.

12. The seat slide structure according to the item 11, wherein
the movement mechanism includes a power blocker that transmits or blocks power from a power source to the winch, and
the second pulley is arranged between the power blocker and the one of the left cushion side frame and the right cushion side frame, and arranged so as to at least overlap the power blocker and the one of the left cushion side frame and the right cushion side frame in a right-left direction.

13. The seat slide structure according to the item 1, wherein
the cushion frame includes a left cushion side frame and a right cushion side frame that are arranged so as to leave a space in between,
the slide rail includes a first slide rail and a second slide rail that are connected to left and right of the lower end of the cushion frame,
the movement mechanism includes a power blocker that transmits or blocks power from a power source to the winch, and
the winch is arranged between the first slide rail and the second slide rail, and between the power blocker and one of the left cushion side frame and the right cushion side frame.

14. The seat slide structure according to the item 13, wherein a shaft that projects sideward from the winch is supported by the one of the left cushion side frame and the right cushion side frame.

A seat slide structure according to this embodiment slides a vehicle seat installed in an automobile as a passenger car, or installed, for example, in another type of automobiles, such as a bus or a truck, or in a vehicle other than automobiles, such as a train, a vessel, or an airplane.

The vehicle seat (hereinafter "seat") at least includes: a seat cushion that supports the femoral region and the buttocks of a person; and a seat back the lower end of which is supported by the seat cushion and that serves as a backrest. The seat optionally includes a head rest that supports the head of a person, arm rests that support the arms of a person, and an ottoman that supports the legs of a person.

As shown in FIG. 43 to FIG. 56, the seat slide structure includes a cushion frame 410 that forms the framework of the seat cushion, slide rails 420 that are connected to the lower end of the cushion frame 410, a lock mechanism 430 that places or lifts restrictions on movement of the slide rails 420, and a movement mechanism 490 that slides the cushion frame 410 along the length direction of the slide rails 420.

The cushion frame 410 includes a first cushion side frame 411, a second cushion side frame 412, a back pipe frame 413, a front pipe frame 414, a connecting member 415, and a pressure receiving member 416.

The first cushion side frame 411 is arranged so as to leave a space from the second cushion side frame 412 in the right-left direction, and has: a sheet-shaped side plate 4110; a support leg 4111 that is integrated with the lower end of the side plate 4110 and supports the side plate 4110; and a connecting leg 4112 that is provided at the lower end of the support leg 4111 and connected to one of the slide rails 420.

Although not shown, to the first cushion side frame 411, a seat back frame constituting the seat back is connected through a reclining mechanism.

The second cushion side frame 412 is arranged so as to leave a space from the first cushion side frame 411 in the right-left direction, and has: a sheet-shaped side plate 4120; and a connecting leg 4122 that is integrated with the lower end of the side plate 4120 and connected to the other of the slide rails 420.

Although not shown, to the second cushion side frame 412, the seat back frame constituting the seat back is connected through the reclining mechanism.

The back pipe frame 413 is a straight pipe frame, and connects the rear end of the first cushion side frame 411 and the rear end of the second cushion side frame 412 to one another.

The front pipe frame 414 is a U-shaped pipe frame, and connects the front end of the first cushion side frame 411 and the front end of the second cushion side frame 412 to one another.

The connecting member 415 is a straight pipe frame, and is put over the front end of the side plate 4110 of the first cushion side frame 411 and the front end of the side plate 4120 of the second cushion side frame 412, thereby connecting the first cushion side frame 411 and the second cushion side frame 412 to one another.

The connecting member 415 is positioned lower than the front pipe frame 414, and inserted into notch parts formed at the front ends of the side plate 4110 of the first cushion side frame 411 and the side plate 4120 of the second cushion side frame 412, and fixed thereto.

The pressure receiving member 416 receives the weight of a person who sits on the seat, and, in this embodiment, is sheet/plate-shaped. The rear end and the front end of the pressure receiving member 116 are fixed to the back pipe frame 413 and the front pipe frame 414, respectively.

The pressure receiving member 416 is formed by being bent so as to be convex downward to fit the shapes of the femoral region and the buttocks of a person, and a part of the pressure receiving member 416, the part receiving the buttocks of a person, is a hip-point.

The hip-point is positioned, in the pressure receiving member 416, closest to the upper end of the slide rails 420.

The slide rails 420 are a first slide rail 421 and a second slide rail 422 that are arranged so as to leave a space in between in the right-left direction.

The first slide rail 421 is connected to the lower end of the first cushion side frame 411, and the second slide rail 422 is connected to the lower end of the second cushion side frame 412.

In this embodiment, the first slide rail 421 and the second slide rail 422 are provided on a floor of an automobile. The first slide rail 421 includes: a lower rail 4210; and an upper rail 4211 that is provided so as to be slidable along the lower rail 4210 and is connected to the cushion frame 410.

The lower rail 4210 has a side wall 4210*a* where lock holes 4210*b* are formed, on the side of the lower rail 4210 closer to the center of the seat, and the upper rail 4211 has a side wall 4211*a* where lock holes 4211*b* are formed, on the side of the upper rail 4211 closer to the center of the seat. The side wall 4211*a* of the upper rail 4211 is formed so as to have a U-shaped section, and the side wall 4210*a* of the lower rail 4210 is inserted therein, so that the side walls 4210*a*, 4211*a* face one another.

Into the lock holes 4210*b*, 4211*b*, nails 431*a* of a lock body 431 of the lock mechanism 430 are inserted (described below).

The lock holes 4210*b* of the side wall 4210*a* of the lower rail 4210 are formed at intervals in the length direction of the lower rail 4210. The number of the lock holes 4210*b* formed in the lower rail 4210 can cover a movable region in which the upper rail 4211 can move along the lower rail 4210.

The lock holes 4211*b* of the side wall 4211*a* of the upper rail 4211 are formed in accordance with the number of the nails 431*a* of the lock body 431.

The second slide rail 422 includes: a lower rail 4220; and an upper rail 4221 that is provided so as to be slidable along the lower rail 4220 and is connected to the cushion frame 410.

The lower rail 4220 has a side wall 4220*a* where lock holes 4220*b* are formed, on the side of the lower rail 4220 closer to the center of the seat, and the upper rail 4221 has a side wall 4221*a* where lock holes 4221*b* are formed, on the side of the upper rail 4221 closer to the center of the seat. The side wall 4221*a* of the upper rail 4221 is formed so as to have a U-shaped section, and the side wall 4220*a* of the lower rail 4220 is inserted therein, so that the side walls 4220*a*, 4221*a* face one another.

Into the lock holes 4220*b*, 4221*b*, nails 431*a* of a lock body 431 of the lock mechanism 430 are inserted (described below).

The lock holes 4220*b* of the side wall 4220*a* of the lower rail 4220 are formed at intervals in the length direction of the lower rail 4220. The number of the lock holes 4220*b* formed in the lower rail 4220 can cover a movable region in which the upper rail 4221 can move along the lower rail 4220.

The lock holes 4221*b* of the side wall 4221*a* of the upper rail 4221 are formed in accordance with the number of the nails 431*a* of the lock body 431.

Figure 51:
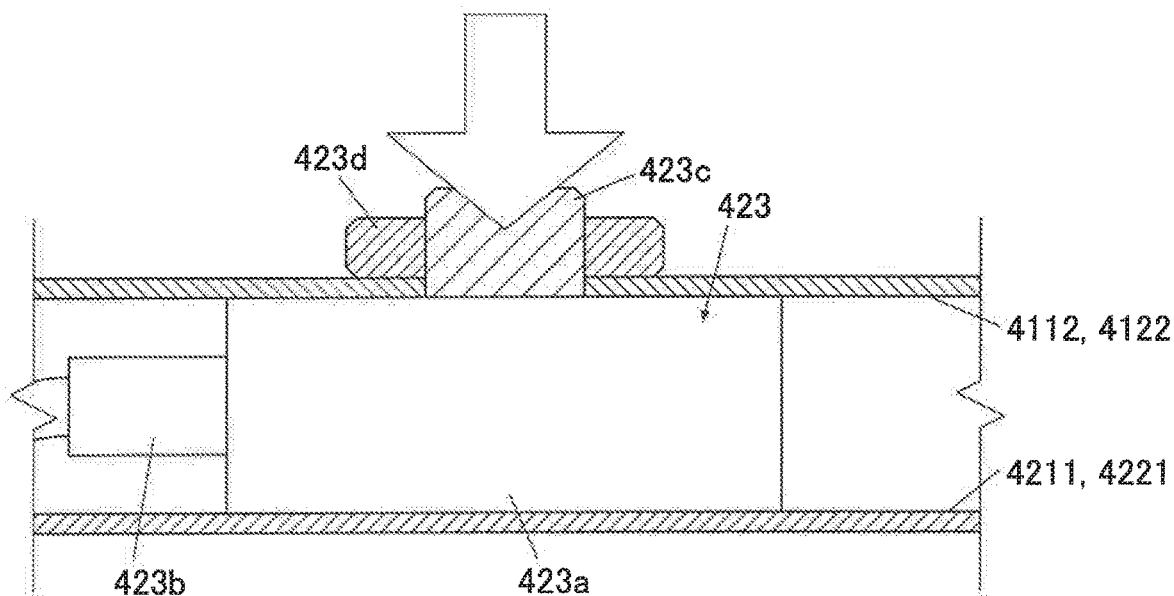
FIG. 51 is a schematic view showing the seat weight sensor(s) according to the fourth embodiment.

Between the cushion frame 410 and the slide rails 420, weight detectors 423 are provided. The weight detectors 423 measure the weight of each person who sits on the seat as one type of information for controlling inflation of an air bag. An arrow (different from leader lines) in FIG. 51 represents the weight of the sitting person.

The weight detectors 423 are provided at four corners of the seat. That is, in this embodiment, the weight detectors 423 are provided between the connecting leg 4112 of the first cushion side frame 411 and the upper rail 4211 of the first slide rail 421 at the front end and the rear end of the connecting leg 4112, and provided between the connecting leg 4122 of the second cushion side frame 412 and the upper rail 4221 of the second slide rail 422 at the front end and the rear end of the connecting leg 4122.

With the weight detectors 423, an ECU (Electronic Control Unit), which functions as the center in performing comprehensive electric control, calculates the total weight and the center of gravity and hence can determine whether the sitting person is an adult or a child. More specifically, in the case of an adult, the ECU can determine whether he/she is an adult of standard build or an adult of small build (difference in build), and in the case of a child, the ECU can determine whether he/she is a one-year-old child (infant seat), a three-year-old child, or a six-year-old child. On the basis of the determination result, inflation of an air bag is controlled.

The weight detectors 423 are often provided for the seat as the front passenger seat, but may be provided for the seat as the driver's seat or for the seat as any other seat provided with an air bag.

The weight detectors 423 each include a detector body 423*a*, a power-source-connecting connector 423*b*, a fixing bolt 423*c*, and a nut 423*d*.

The detector body 423*a* has a built-in sensor (e.g. strain gauge) that detects the weight of the sitting person.

The power-source-connecting connector 423*b* is a connector for transmitting power from a power source (not shown) to the detector body 423*a*.

The fixing bolt 423*c* and the nut 423*d* are used for fixing the detector body 423*a* (and built-in sensor) to the cushion frame 410. Another bolt and another nut (not shown) are used for fixing the detector body 423*a* to the slide rail 420.

The power-source-connecting connectors 423*b* face in different directions depending on where the weight detectors 423 are arranged. That is, in the case of the weight detectors 423 positioned on the front side, the power-source-connecting connectors 423*b* are attached to the front ends of the detector bodies 423*a*, whereas in the case of the weight detectors 423 positioned on the rear side, the power-source-connecting connectors 423*b* are attached to the sides of the detector bodies 423*a* closer to the center of the seat.

Connectors for communications (not shown) may be attached to the detector bodies 423*a* in the same manner as the power-source-connecting connectors 423*b*.

The lock mechanism 430 functions for both the first slide rail 421 and the second slide rail 422 to place or lift restrictions on movement of the first slide rail 421 and the second slide rail 422. More specifically, the lock mechanism 430 places or lifts restrictions on movement of the upper rails 4211, 4221 of the first and second slide rails 421, 422 along the lower rails 4210, 4220 thereof.

The lock mechanism 430 includes a pair of left and right lock bodies 431, a pair of left and right press levers 432, a connecting pipe 433, a cable (not shown), a cable's power unit 435, and a limit switch 436.

The lock bodies 431 are used as a left-and-right pair for the first slide rail 421 and the second slide rail 422. Each lock body 431 includes: the nails 431*a*, which are inserted into the lock holes 4210*b*, 4211*b* or 4220*b*, 4221*b*; a rotational shaft 431*b*; and a press receiving part 431*c*.

Figure 52:
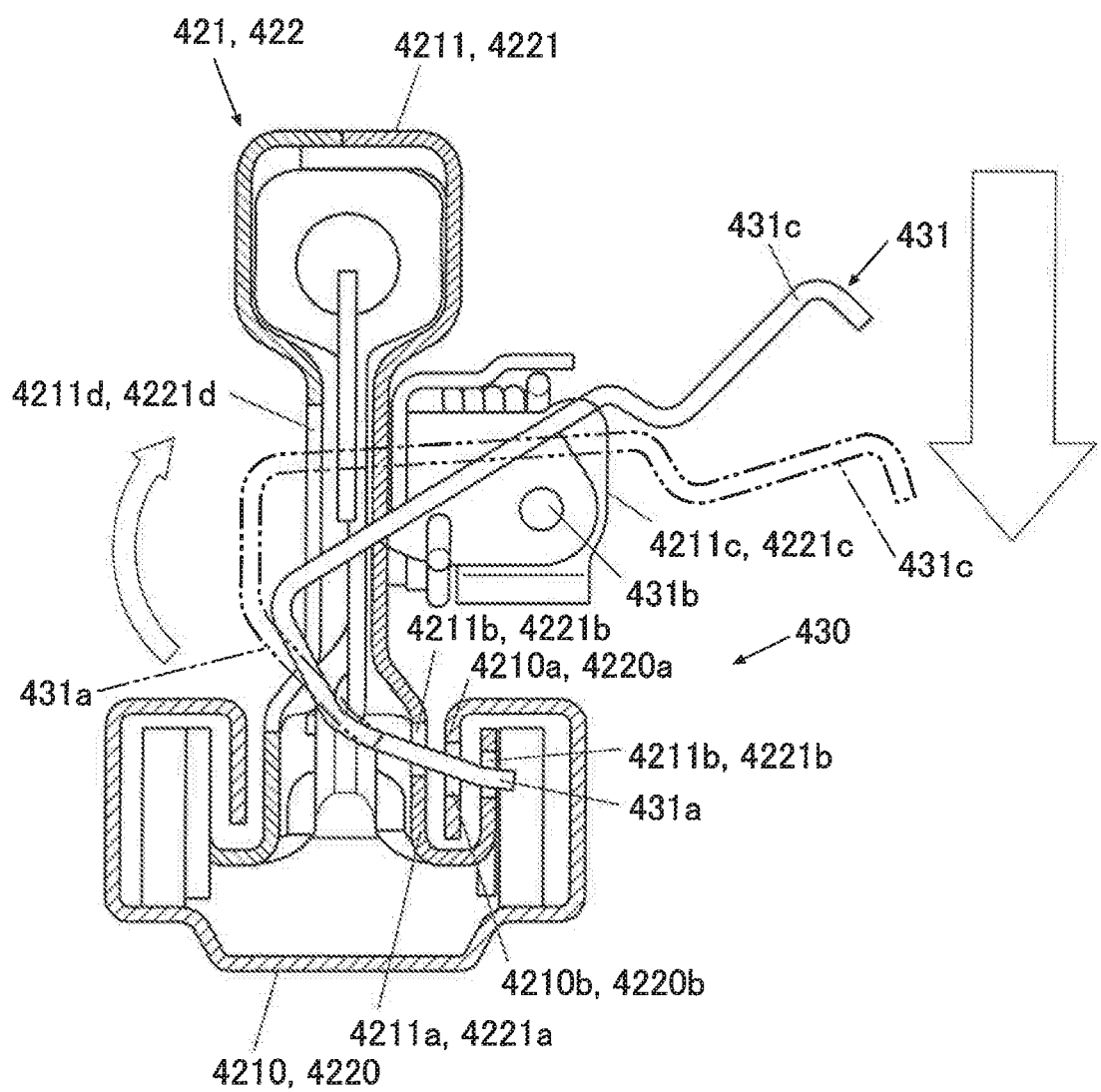
FIG. 52 is a cross sectional view to explain a lock mechanism according to the fourth embodiment.
Figure 53:
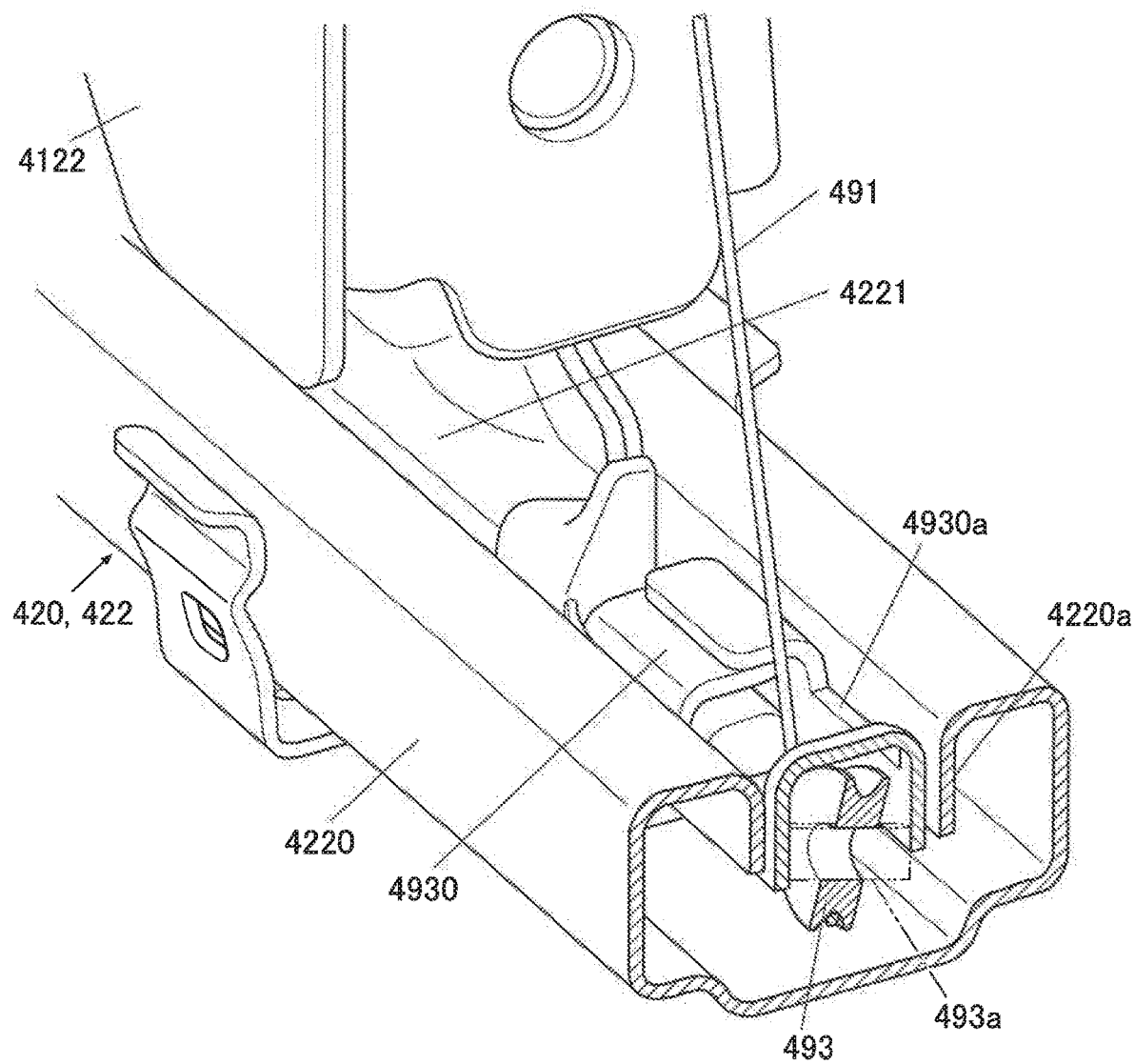
FIG. 53 is a cross-sectional perspective view showing a first pulley and components in its vicinity according to the fourth embodiment.
Figure 54:
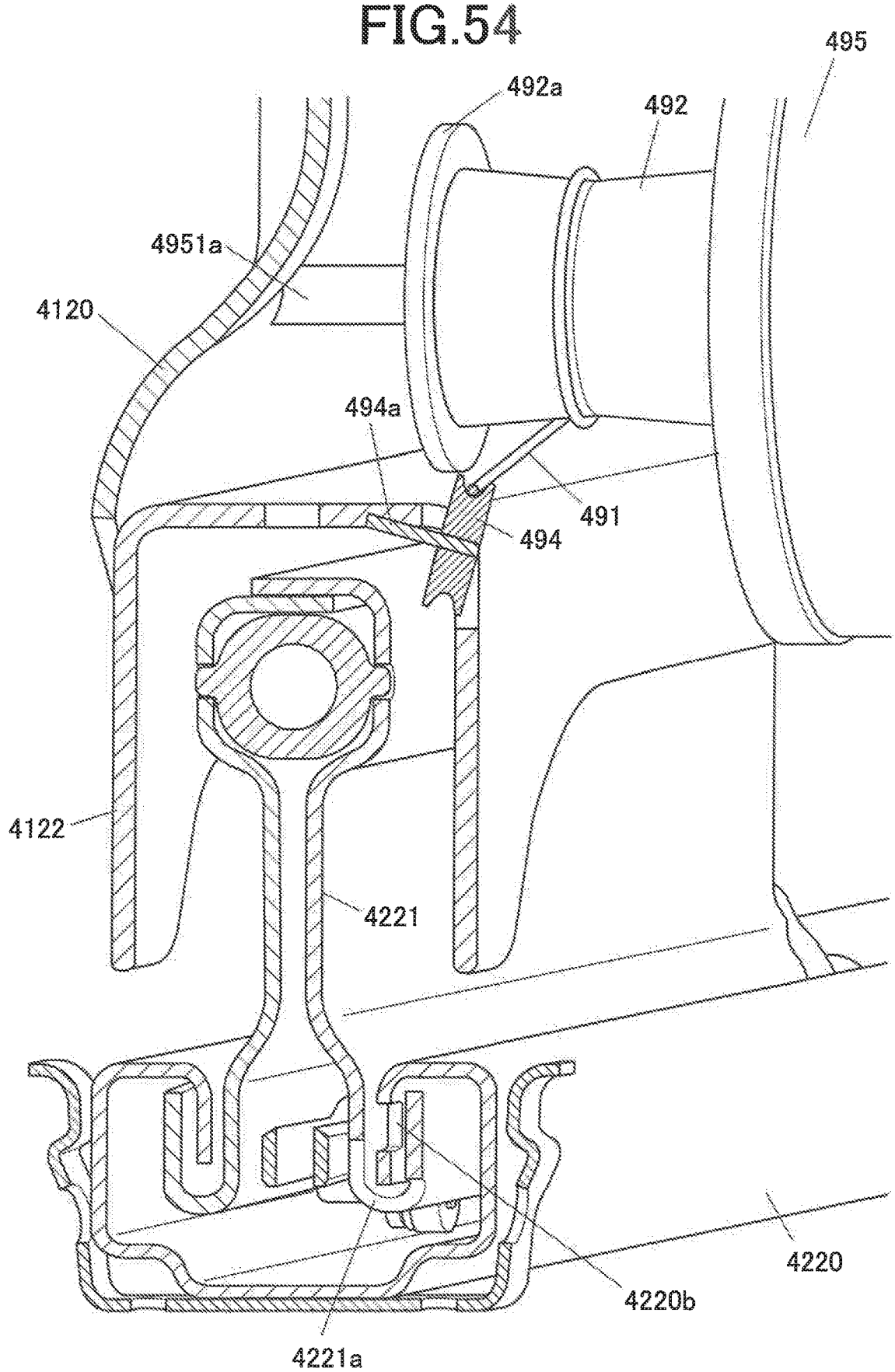
FIG. 54 is a cross-sectional perspective view showing a second pulley and components in its vicinity according to the fourth embodiment.

The nails 431*a* and the press receiving part 431*c* are positioned exactly opposite to one another with the rotational shaft 431*b* as the center. The lock body 431 is configured such that when the press receiving part 431*c* is pressed, the nails 431*a* rotate upward. A down arrow (different from leader lines) in FIG. 52 represents pressing force applied to the press receiving part 431*c*, and an arc-shaped up arrow (different from leader lines) in FIG. 52 represents rotation of the nails 431*a*.

The lock body 431 is further configured such that when the press of the press receiving part 431*c* is released, the nails 431*a* rotate downward.

The number of the nails 431*a* provided in each lock body 431 is two or more (four in this embodiment), and the nails 431*a* are arranged at equal intervals.

The rotational shafts 431*b* are provided in brackets 4211*c*, 4221*c* that project from the upper rails 4211, 4221, and arranged in parallel with the first and second slide rails 421, 422.

In the upper rails 4211, 4221, openings 4211*d*, 4221*d* are formed on rotational trajectories of the lock bodies 431.

The press levers 432 press the press receiving parts 431c of the lock bodies 431, and are used as a left-and-right pair for the lock bodies 431, which are a left-and-right pair.

The connecting pipe 433 is put over the first cushion side frame 411 and the second cushion side frame 412, and supported thereby so as to be rotatable.

The left and right press levers 432 are fixed to the connecting pipe 433, and rotate in sync with rotation of the connecting pipe 433, namely rotate as the connecting pipe 433 rotates.

The connecting pipe 433 has a projecting shaft 433a to extend the connecting pipe 433. The projecting shaft 433a projects sideward from the outer-side surface of the connecting leg 4112, and enables manual unlocking of the lock bodies 431 by being provided with, for example, an operation lever (not shown) at the tip.

The cable is hitched to one of the left and right press levers 432 (right press lever 432 in this embodiment) to cause the one of the left and right press levers 432 to rotate by power transmitted from the cable's power unit 435 fixed to the cushion frame 410. That is, the cable causes one press lever 432 to rotate, which causes the connecting pipe 433 to rotate on its axis and consequently causes the other press lever 432 to rotate.

The limit switch 436 is connected to the movement mechanism 490, and used for linking operation of the lock mechanism 430 with operation of the movement mechanism 490.

More specifically, the limit switch 436 is turned on when the lock mechanism 430 performs unlocking, and at this timing, for example, the ECU controls and causes a motor 496 (described below) of the movement mechanism 490 to operate, so that the upper rails 4211, 4221 slide along the lower rails 4210, 4220.

On the other hand, the limit switch 436 is turned off when the lock mechanism 430 performs locking, and at this timing, for example, the ECU controls and causes the motor 496 (described below) of the movement mechanism 490 to stop, so that the upper rails 4211, 4221 stop sliding along the lower rails 4210, 4220.

The movement mechanism 490 has a wire 491 both ends of which are fixed to one of the slide rails 420 (second slide rail 422 in this embodiment), a winch 492 around which the wire 491 is wound and that is supported by the cushion frame 410 so as to be rotatable, and first pulleys 493 around which the wire 491 passes and that are at least partly stored in the second slide rail 422. The first pulleys 493 are arranged within the width of the second slide rail 422.

The movement mechanism 490 also has second pulleys 494 around which the wire 491 passes and that are provided outside the second slide rail 422, a power blocker 495 that transmits or blocks power output from a power source to the winch 492, and the motor 496 as the power source.

The second slide rail 422 stores the wire 491, and in the second slide rail 422, the first pulleys 493 around which the wire 491 passes are arranged. The wire 491 is hooked around the first pulleys 493 so as to pass under the first pulleys 493.

Both ends of the wire 491 are fixed to both ends of the second slide rail 422 in the length direction.

The first pulleys 493 are provided, as a pair of pulleys, at the front side and the rear side with the winch 492 as the center.

The winch 492 is supported by the cushion frame 410 so as to be rotatable by being connected to a main shaft 4951a of the power blocker 495. That is, the winch 492 is supported by the cushion from 410 indirectly through the power blocker 495. More specifically, of the power blocker 495, the main shaft 4951a that projects sideward from the winch 492 is supported by one of the cushion side frames 411, 412 provided on the left and the right (second cushion side frame 412 on the right in this embodiment). Further, the winch 492 is arranged between the first slide rail 421 and the second slide rail 422, and between the power blocker 495 and one of the left and right cushion side frames 411, 412 (second cushion side frame 412 on the right in this embodiment).

The winch 492 is formed such that its diameter increases gradually from the center to both ends in the shaft direction so that the wound wire 242 does not come off easily. The winch 492 has, at both ends in the shaft direction, flanges 492a having a diameter larger than the winch 492, so that the wire 491 hardly comes off.

The motor 496 is for rotating the winch 492 through the power blocker 495, and transmits, to the power blocker 495, power for rotating the winch 492.

The motor 496 is arranged in the middle between the left and right cushion side frames 411, 412.

The power blocker 495 has a clutch rotor 4950 to which power is transmitted from the motor 496, an armature unit 4951 connected to the main shaft 4951a, and an electromagnetic coil (not shown) that is provided inside and electromagnetically attaches/detaches the clutch rotor 4950 and the armature unit 4951 to/from one another.

The winch 492 is connected to the main shaft 4951a, and rotates by power transmitted from the motor 496 to the power blocker 495.

The power blocker 495 is supported by the connecting member 415, which is put over the first cushion side frame 411 and the second cushion side frame 412.

The power blocker 495 is arranged in front of the power-source-connecting connectors 423b of the rear-side weight detectors 423 arranged behind the power-source-connecting connectors 423b of the front-side weight detectors 423, and is arranged behind the power-source-connecting connectors 423b of the front-side weight detectors 423 arranged in front of the power-source-connecting connectors 423b of the rear-side weight detectors 423.

The first pulleys 493 and the second pulleys 494 will be described in detail.

The first pulleys 493 are at least partly stored in the second slide rail 422 in the height direction of the second slide rail 422. In this embodiment, the first pulleys 493 are entirely stored in the second slide rail 422 in the height direction of the second slide rail 422.

The first pulleys 493 are provided at the front end and the rear end of the upper rail 4221 of the second slide rail 422.

Of these front-side and rear-side first pulleys 493, the front-side first pulley 493 is arranged in front of the lock bodies 431 of the lock mechanism 430. Further, the front-side first pulley 493 is arranged in front of the connecting member 415, which is put over the first cushion side frame 411 and the second cushion side frame 412. Still further, the front-side first pulley 493 is arranged in front of the main shaft 4951a of the power blocker 495.

The rear-side first pulley 493 is arranged at a position that is symmetrical to the front-side first pulley 493 in the front-rear direction with the winch 492 as the center.

The first pulleys 493 have first support shafts 493a that support the first pulleys 493 in the freely rotatable manner. The first support shafts 493a are stored in the second slide rail 422 in the height direction of the second slide rail 422. Further, the first support shafts 493a are arranged so as to slope in the second slide rail 422.

The first support shafts 493a are supported at the front end and the rear end of the upper rail 4221 of the second slide rail 422 each by double holding.

To the front end (and the rear end) of the upper rail 4221 of the second slide rail 422, as part of the upper rail 4221, a pulley-attaching member(s) 4930 where the first pulley(s) 493 is stored is integrally attached. The pulley-attaching member(s) 4930 is slidable along the lower rail 4220.

An opening 4930a is formed in the upper surface of the pulley-attaching member 4930, and the first pulley 493 is provided at the position where the opening 4930a is formed. That is, the wire 491 can be pulled in the pulley-attaching member 4930 from the opening 4930a.

The first pulley 493 is entirely stored in the pulley-attaching member 4930 in the height direction of the second slide rail 422. The first support shaft 493a is also entirely stored in the pulley-attaching member 4930 in the height direction of the second slide rail 422.

The wire 491 passes around the second pulleys 494, and the second pulleys 494 are provided outside the upper rail 4221 of the second slide rail 422. The wire 491 is hooked around the second pulleys 494 so as to pass over the second pulleys 494.

The second pulleys 494 are provided, as a pair of pulleys, at the front side and the rear side with the winch 492 as the center. The second pulleys 494 are arranged at the side of the upper rail 4221 of the second slide rail 422 closer to the center of the seat cushion.

The second pulleys 494 are arranged between the power blocker 495 and one of the left and right cushion side frames 411, 412 (second cushion side frame 412 on the right in this embodiment), and arranged so as to at least overlap the power blocker 495 and the one of the left and right cushion side frames 411, 412 (second cushion side frame 412 on the right in this embodiment) in the right-left direction.

The second pulleys 494 are supported at points on the side of one of the left and right cushion side frames 411, 412 (second cushion side frame 412 on the right in this embodiment), the side being closer to the center of the seat cushion.

The second pulleys 494 have second support shafts 494a that support the second pulleys 494 in the freely rotatable manner. The second support shafts 494a are arranged so as to slope.

Although not shown, on or near the seat, a switch(es) for making an input to slide the seat forward or rearward is provided. Operating the switch causes the lock mechanism 430 and the movement mechanism 490 to operate to slide the seat forward or rearward Operation of the seat slide structure thus configured will be described. Each control necessary for sliding the seat is performed by the ECU described above.

First, an occupant chooses whether to slide the seat forward or rearward by operating the switch. When receiving an input from the switch, the ECU controls the cable's power unit 435 of the lock mechanism 430 to pull the cable. This causes the press lever 432 to which the cable is hitched to rotate. As this takes place, the connecting pipe 433 rotates on its axis, and the other press lever 432 rotates in sync therewith.

Successively, the left and right press levers 432 press the press receiving parts 431c of the left and right lock bodies 431, so that the left and right lock bodies 431 rotate on their rotational shafts 431b. This pulls out the nails 431a of the lock bodies 431 from the lock holes 4210b, 4211b, 4220b, 4221b of the first and second slide rails 421, 422, thereby performing unlocking.

Pulling out the nails 431a of the lock bodies 431 from the lock holes 4210b, 4211b, 4220b, 4221b turns on the limit switch 436. When the limit switch 436 is turned on, the ECU causes the motor 496 to operate and consequently causes the power blocker 495 to operate to rotate the winch 492.

When the winch 492 starts rotating, the wire 491, which is wound around the winch 492, is expected to be wound up, but because the wire 491 passes through the pulley-attaching member(s) 4930 via the second pulley(s) 494 and the first pulley(s) 493, and both ends of the wire 491 are fixed to both ends of the lower rail 4220 of the second slide rail 422 in the length direction, the upper rail 4221 to which the pulley-attaching member(s) 4930 is integrally attached slides along the lower rail 4220 of the second slide rail 422. As this takes place, in the first slide rail 421, the upper rail 4211 slides along the lower rail 4210.

Thus, the seat can be made to slide forward or rearward.

When the seat slides to a position desired by the occupant, the occupant stops operating the switch. When operation on the switch stops, the cable's power unit 435 stops, and consequently the cable goes back to its initial position, and also the left and right press levers 432 rotate to go back to their initial positions.

As these take place, the lock bodies 431 also rotate to go back to their initial positions. However, the nails 431a of the lock bodies 431 may not be inserted into the lock holes 4210b, 4220b of the lower rails 4210, 4220 because the seat sliding is stopped at the occupant's desired position. In such a case, the ECU that detects that the limit switch 436 is still on although operation on the abovementioned switch is stopped causes the motor 496 to operate to slightly slide the seat forward or rearward. This inserts the nails 431a of the lock bodies 431 into their nearby lock holes 4210b, 4220b of the lower rails 4210, 4220, thereby performing locking.

Inserting the nails 431a of the lock bodies 431 into their nearby lock holes 4210b, 4220b of the lower rails 4210, 4220 turns off the limit switch 436. Then, the ECU stops the motor 496 and consequently stops the power blocker 495 to stop the winch 492 from rotating.

Thus, the seat can be stopped at a position desired by the occupant.

The wire 491 repeats the above actions, and hence may sag with age. To deal with this, the seat slide structure may employ, as needed, a structure that prevents occurrence of such sagging.

Figure 55:
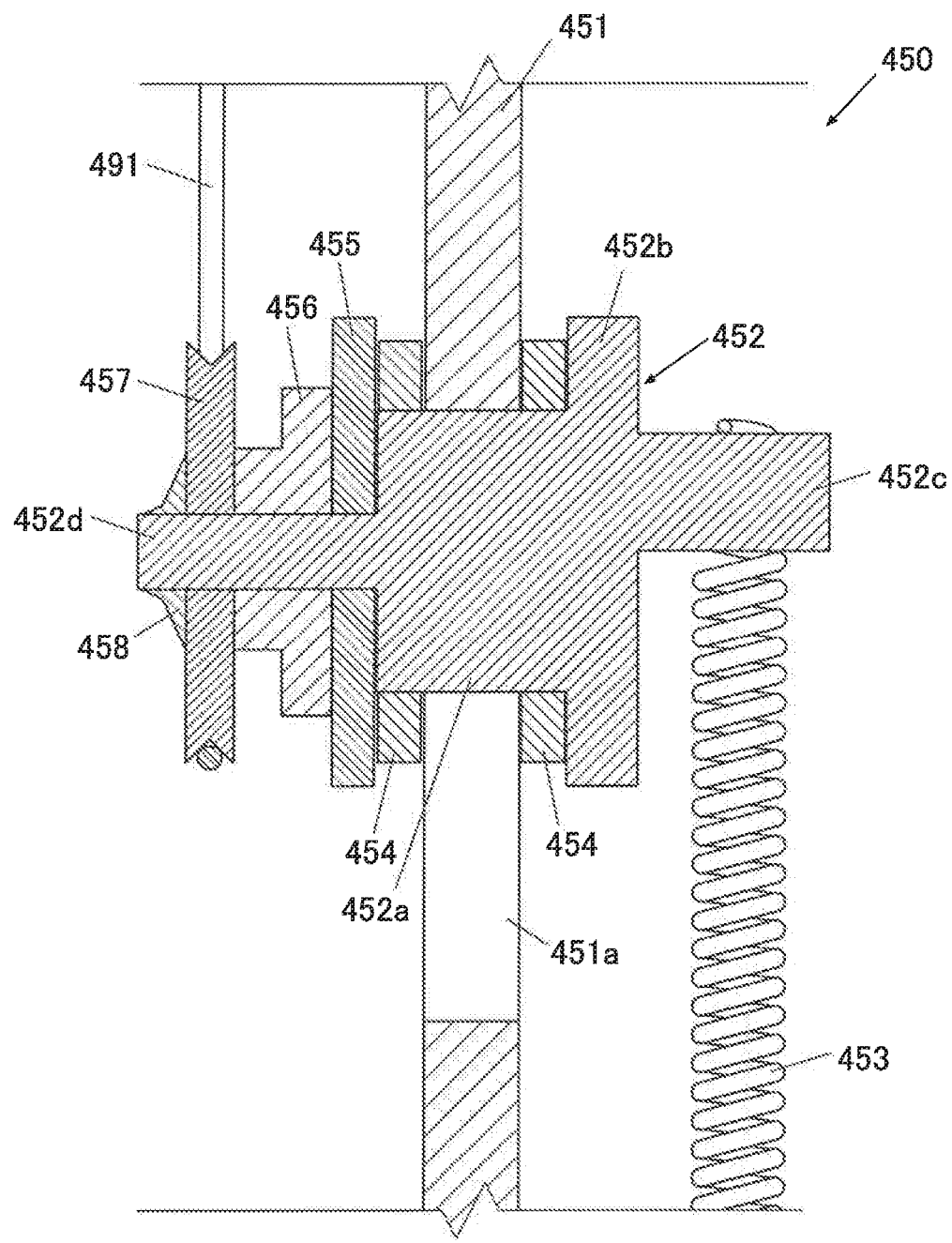
FIG. 55 is an illustration to explain an example of a wire sagging prevention structure according to the fourth embodiment.

A sagging prevention structure 450 shown in FIG. 55 is configured to prevent the sagging with a biasing member 453 pulling a step pin 452. The step pin 452 holds a pulley 457 in the freely rotatable manner. Around the pulley 457, the wire 491 passes. The sagging prevention structure 450 has a bracket 451, the step pin 452, the biasing member 453, washers 454, 455, a fastening member 456, the pulley 457, and a catch 458.

The bracket 451 is integrated with a part of the upper rail 4221 of the second slide rail 422, but may be integrated with the upper rail 4221. Alternatively, the upper rail 4221 may be processed properly to function as the bracket 451 of the sagging prevention structure 450.

In the bracket 451, a slit 451a is formed, and the step pin 452 passes through the slit 451a.

The step pin 452 has a body shaft 452a that passes through the slit 451a and is slidable along the slit 451a, a flange 452b integrated with one end of the body shaft 452a in the shaft direction, a hitching part 452c that projects from the one end of the body shaft 452a in the shaft direction (i.e. from the flange 452b) and to which the biasing member 453 is hitched, and a rotational shaft 452d that projects from the other end of the body shaft 452a in the shaft direction and around which the pulley 457 is provided so as to freely rotate.

The biasing member 453 is a tension spring, and one end thereof is hitched to the hitching part 452c of the step pin 452, and the other end thereof is hitched to a position (not shown) of the upper rail 4221 of the second slide rail 422.

The number of the washers 454 provided is two. The washers 454 are arranged such that the bracket 451 is interposed therebetween. The body shaft 452a of the step pin 452 passes through holes formed in the centers of the washers 454.

The washer 455 is provided on, of the step pin 452, the side where the rotational shaft 452d is provided. The rotational shaft 452d passes through a hole formed in the center of the washer 455.

The fastening member 456 is provided around the rotational shaft 452d of the step pin 452 on the outer side of the washer 455, and prevents the step pin 452 from coming off the slit 451a.

The pulley 457 is provided around the rotational shaft 452d of the step pin 452 on the outer side of the fastening member 456 so as to freely rotate. The wire 491 passes around the pulley 457, and pulls the step pin 452 in a direction opposite to a direction in which the biasing member 453 pulls the step pin 452.

The catch 458 that prevents the pulley 457 from coming off the rotational shaft 452d is provided on the outer side of the pulley 457.

According to the sagging prevention structure 450 thus configured, because the pulling direction of the wire 491 is the exact opposite to the pulling direction of the biasing member 453, when the wire 491 sags, the step pin 452 moves along the slit 451a by the pulling force of the biasing member 453. This brings the sagging wire 491 back to a stretched state, and hence can contribute to continuation of normal seat sliding performed by the seat slide structure.

Figure 56:
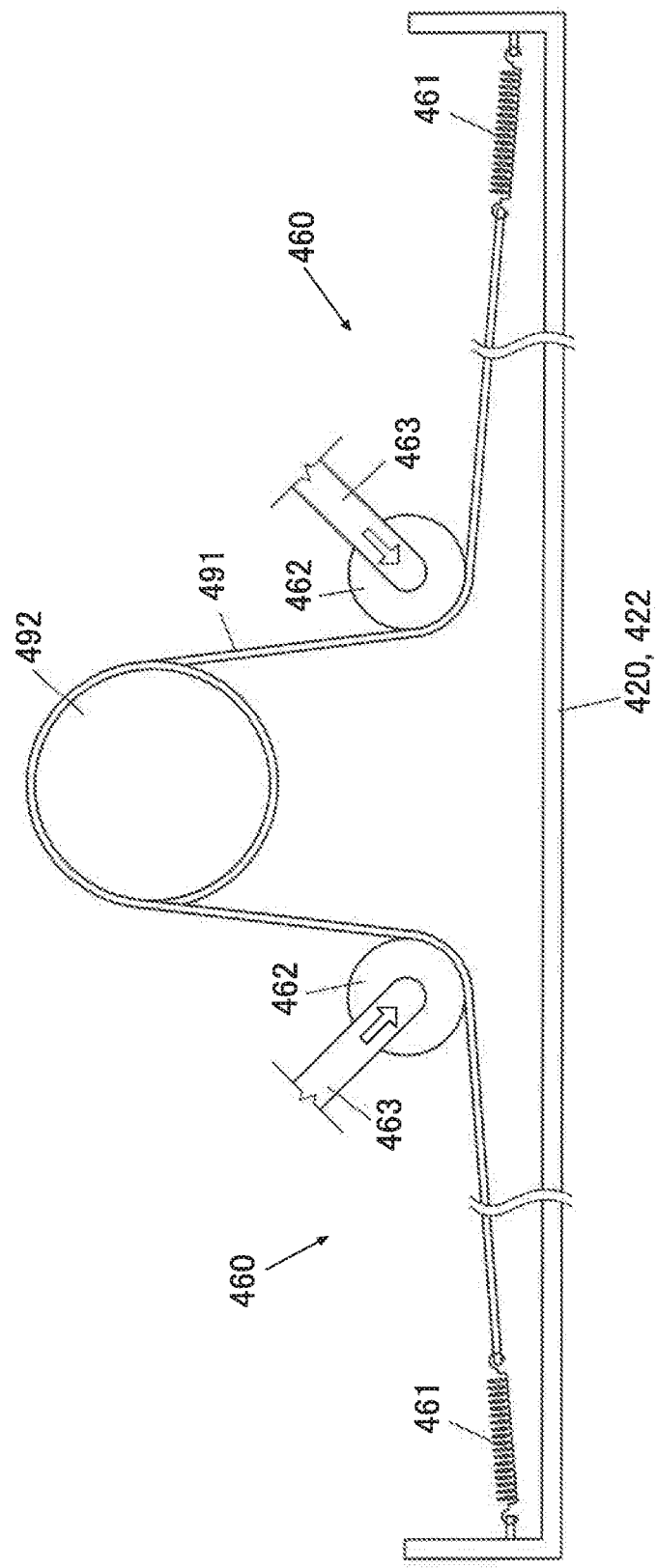
FIG. 56 is an illustration to explain another example of the wire sagging prevention structure according to the fourth embodiment.

A sagging prevention structure 460 shown in FIG. 56 has biasing members 461 provided at both ends of the wire 491, a pair of pulleys 462, and attachment members 463 to which biasing force to bias the pulleys 462 downward is applied.

The biasing members 461 are tension springs. One ends (outer-side ends) of the biasing members 461 are attached to the ends of the lower rail 4220 of the second slide rail 422, and the other ends (inner-side ends) thereof are hitched to the ends of the wire 491. Hence, the wire 491 is pulled by the biasing members 461 in its normal state.

Rotational shafts of the pulleys 462 are attached to the attachment members 463, and the attachment members 463 are attached to parts of the upper rail 4221, which is not shown in FIG. 56.

The attachment members 463 are biased by biasing members (not shown) in a direction to press the pulleys 462 against the wire 491.

According to the sagging prevention structure 460 thus configured, because the wire 491 is in the state of being pulled by the biasing members 461, and the pulleys 462 are in the state of being pressed against the wire 491, when the wire 491 sags, the wire 491 is pulled by the biasing members 461, and the pulleys 462 are pressed against the wire 491. This brings the sagging wire 491 back to the stretched state, and hence can contribute to continuation of normal seat sliding performed by the seat slide structure.

According to this embodiment, the first pulley(s) 493 around which the wire 491 passes and that is at least partly stored in the second slide rail 422 is arranged within the width of the second slide rail 422. Thus, the first pulleys 493 do not protrude much from the second slide rail 422 upward. This can restrain increase in seat size in the up-down direction.

Further, the first pulley(s) 493 is at least partly stored in the second slide rail 422 in the height direction of the second slide rail 422. Thus, the first pulleys 493 do not protrude much from the second slide rail 422 upward. This can restrain increase in seat size in the up-down direction.

Further, the first pulley(s) 493 includes the first support shaft(s) 493a that (i) supports the first pulley(s) 493 in the freely rotatable manner and (ii) is stored in the second slide rail 422 in the height direction of the second slide rail 422. Thus, the first pulleys 493 can be at least partly stored in the second slide rail 422.

Further, the first pulley(s) 493 is entirely stored in the second slide rail 422 in the height direction of the second slide rail 422. Thus, the first pulleys 493 do not protrude from the second slide rail 422 upward. This can restrain increase in seat size in the up-down direction.

Further, the second pulley(s) 494 of the movement mechanism 490 is arranged at the side of the second slide rail 422 closer to the center of the seat cushion. Thus, the second pulleys 494 do not protrude much from the seat sideward. This can restrain increase in seat size in the right-left direction.

Further, the first support shaft(s) 493a that supports the first pulley(s) 493 in the freely rotatable manner and the second support shaft (s) 494a that supports the second pulley(s) 494 in the freely rotatable manner are arranged so as to slope. Hence, the first pulleys 493 and the second pulleys 494 do not take a large width. This can restrain increase in seat size in the up-down direction and/or the right-left direction.

Further, the first pulley 493 is provided at each of the front end and the rear end of the upper rail 4221 of the second slide rail 422 as the front-side first pulley 493 and the rear-side first pulley 493, and the first support shaft 493 is supported at each of the front end and the rear end of the upper rail 4221 by double holding. This can enhance support stiffness of the first support shafts 493a.

Further, the front-side first pulley 493 is arranged in front of the lock body(ies) 431. Thus, the front-side first pulley 493 and the lock bodies 431 are not overlapped. This makes it more likely that the lock bodies 431 operates normally, and also can restrain increase in seat size.

Further, the front-side first pulley 493 is arranged in front of the connecting member 415 that is put over the front ends of the left cushion side frame 411 and the right cushion side frame 412, thereby connecting the left cushion side frame 411 and the right cushion side frame 412 to one another. Thus, the front-side first pulley 493 and the connecting member 415 are not overlapped. Hence, the connecting member 415 hardly gets in the way of making the wire 491 pass around the front-side first pulley 493.

Further, the power blocker 495 includes the main shaft 4951a through which power is transmitted from the motor 496 as the power source to the winch 492, and the front-side first pulley 493 is arranged in front of the main shaft 4951a. Thus, the front-side first pulley 493 and the main shaft 4951a of the power blocker 495 are not overlapped. This makes it more likely that the power blocker 495 operates normally, and also can restrain increase in seat size.

Further, the second pulley(s) 494 is supported at a point(s) on the side of one of the left cushion side frame 411 and the right cushion side frame 412, the side being closer to the center of the seat cushion. Thus, the second pulleys 494 do not protrude much from the seat sideward. This can restrain increase in seat size in the right-left direction.

Further, the second pulley(s) 494 is arranged between the power blocker 495 and the one of the left cushion side frame 411 and the right cushion side frame 412, and arranged so as to at least overlap the power blocker 495 and the one of the left cushion side frame 411 and the right cushion side frame 412 in the right-left direction. Thus, the second pulleys 494 can be arranged in a limited space between the power blocker 495 and the one of the left cushion side frame 411 and the right cushion side frame 412. This eliminates a need to ensure a large space for the second pulleys 494 to be arranged, and hence can contribute to restraining increase in seat size.

Further, the winch 492 is arranged between the first slide rail 421 and the second slide rail 422, and between the power blocker 495 and one of the left cushion side frame 411 and the right cushion side frame 412. Thus, the winch 492 can be arranged so as not to protrude from the first slide rail 421 and the second slide rail 422 outward, and also can be arranged in a limited space between the power blocker 495 and one of the left cushion side frame 411 and the right cushion side frame 412. This can contribute to restraining increase in seat size.

Further, of the power blocker 495, the main shaft 4951*a* that projects sideward from the winch 492 is supported by the one of the left cushion side frame 411 and the right cushion side frame 412. This can enhance support stiffness of the main shaft 4951*a* that projects sideward from the winch 492.

The embodiments disclosed herein are not intended to limit the present invention but are merely examples in every respect. The scope of the present invention should be interpreted not by the embodiments above but by the scope of claims below, and is intended to include equivalents in meaning of the scope of claims and any changes within the scope of claims.

What is claimed is:

1. A seat slide structure comprising:
    a cushion frame that forms a framework of a seat cushion, the seat cushion supporting a femoral region and buttocks of a person;
    a slide rail that is connected to a lower end of the cushion frame and includes:
        a lower rail, and
        an upper rail that is connected to the cushion frame and configured to be slideable along the lower rail;
    a movement mechanism that slides the cushion frame along a length direction of the slide rail and includes:
        a lead screw that is provided in parallel with the slide rail and supported by the upper rail,
        a gear part that transmits power from a power source to the lead screw to slide the lead screw and the upper rail along the lower rail, and
        a shake absorber that allows the cushion frame and the lead screw to move relative to one another in a moving direction of the upper rail along the lower rail; and
    a lock mechanism that includes a lock body engageable with the slide rail and configured to place or lift a restriction on movement of the slide rail.

2. The seat slide structure according to claim 1, wherein the shake absorber is configured to form a space for the cushion frame and the lead screw to perform the relative movement.

3. The seat slide structure according to claim 2, wherein in the space, a biasing member that biases the cushion frame along a length direction of the lead screw is provided.

4. The seat slide structure according to claim 2, further comprising, at each of both ends of the lead screw in a length direction of the lead screw, a stopper that limits a movement distance of the lead screw with respect to the gear part and ensures the space in the shake absorber is provided.

5. The seat slide structure according to claim 1, wherein the shake absorber includes a U-shaped holding bracket that includes a pair of projecting holders (i) that project to the lead screw and (ii) through which an end of the lead screw passes.

6. The seat slide structure according to claim 1, wherein the shake absorber is one of two shake absorbers, the two shake absorbers being provided at each of a front end and a rear end of the lead screw in a length direction of the lead screw as a front-side shake absorber and a rear-side shake absorber, respectively.

7. The seat slide structure according to claim 6, wherein the power source is a motor fixed to the lower rail, and
    a shaft of the motor is arranged behind the front-side shake absorber when the cushion frame reaches a forefront of the slide rail, and arranged in front of the rear-side shake absorber when the cushion frame reaches a rearmost position of the slide rail.

8. The seat slide structure according to claim 7, wherein the movement mechanism includes a motor-attaching bracket that fixes the motor to the lower rail, and
    a front end of the motor-attaching bracket is at a same position in a front-rear direction as the front-side shake absorber when the cushion frame reaches the rearmost position of the slide rail.

9. The seat slide structure according to claim 7, wherein the shaft of the motor is arranged lower than the front-side shake absorber and the rear-side shake absorber.

10. The seat slide structure according to claim 6, wherein the cushion frame includes:
    a left cushion side frame and a right cushion side frame that are provided so as to leave a space in between; and
    a connecting member that is put over front ends of the left cushion side frame and the right cushion side frame, thereby connecting the left cushion side frame and the right cushion side frame to one another, and
    the front-side shake absorber is arranged in front of the connecting member.

11. The seat slide structure according to claim 10, wherein the front-side shake absorber is arranged lower than the connecting member.

12. The seat slide structure according to claim 1, comprising a cover that covers the shake absorber.

13. The seat slide structure according to claim 1, wherein the movement mechanism includes a support bracket that (i) supports the lead screw and the shake absorber, (ii) is connected to the cushion frame, and (iii) extends in a direction parallel to a length direction of the lead screw, and
    the lead screw is arranged under the support bracket.

* * * * *